United States Patent
Gunji et al.

(10) Patent No.: US 11,647,267 B2
(45) Date of Patent: May 9, 2023

(54) IMAGE PICKUP APPARATUS HAVING EXTENDIBILITY

(71) Applicant: CANON KABUSHIKI KAISHA, Tokyo (JP)

(72) Inventors: Manami Gunji, Kanagawa (JP); Takeshi Hamada, Tokyo (JP); Takao Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/496,951

(22) Filed: Oct. 8, 2021

(65) Prior Publication Data

US 2022/0124225 A1    Apr. 21, 2022

(30) Foreign Application Priority Data

Oct. 16, 2020  (JP) .............................. JP2020-174795

(51) Int. Cl.
| | |
|---|---|
| *H04N 23/51* | (2023.01) |
| *G03B 17/12* | (2021.01) |
| *G03B 17/55* | (2021.01) |
| *G03B 17/56* | (2021.01) |
| *H04N 23/54* | (2023.01) |

(52) U.S. Cl.
CPC ............ *H04N 23/51* (2023.01); *G03B 17/12* (2013.01); *G03B 17/55* (2013.01); *G03B 17/563* (2013.01); *H04N 23/54* (2023.01)

(58) Field of Classification Search
None
See application file for complete search history.

(56) References Cited

U.S. PATENT DOCUMENTS

| | | | | |
|---|---|---|---|---|
| D719,601 S | * | 12/2014 | Richardson | .................. D16/218 |
| 2011/0123189 A1 | * | 5/2011 | Saito | ....................... G03B 17/02 |
| | | | | 396/535 |
| 2018/0263104 A1 | | 9/2018 | Hamada et al. | |
| 2018/0278817 A1 | * | 9/2018 | Shimizu | .................... G02B 7/14 |
| 2018/0338069 A1 | * | 11/2018 | Hu | ........................ H04N 5/2252 |

FOREIGN PATENT DOCUMENTS

| | | |
|---|---|---|
| CN | 111031223 A | 4/2020 |
| DE | 102014218932 B | 2/2016 |
| EP | 0079428 A | 5/1983 |
| JP | 2002-131829 A | 5/2002 |

OTHER PUBLICATIONS

The above patent document was cited in a European Search Report dated Mar. 14, 2022, which is enclosed, that issued in the corresponding European Patent Application No. 21201849.3.

* cited by examiner

*Primary Examiner* — Rodney E Fuller
(74) *Attorney, Agent, or Firm* — Cowan, Liebowitz & Latman, P.C.

(57) ABSTRACT

An image pickup apparatus having extendibility. The image pickup apparatus includes a front case that forms an apparatus appearance, a rear case that forms the apparatus appearance with the front case, and panel members. At least one of the front case and the rear case has arms that extend in a direction approximately parallel to an optical axis of the image pickup apparatus and that are united with at least one of the front case and the rear case. The front case and the rear case are connected through the arms. The panel members are fixed to the front case and the rear case so as to cover openings formed in a state where the front case and the rear case are connected through the arms.

31 Claims, 66 Drawing Sheets

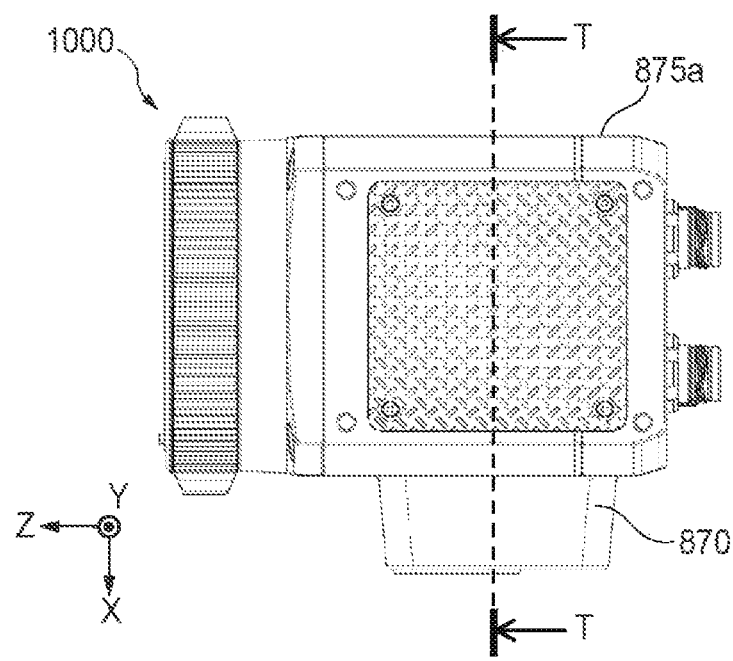
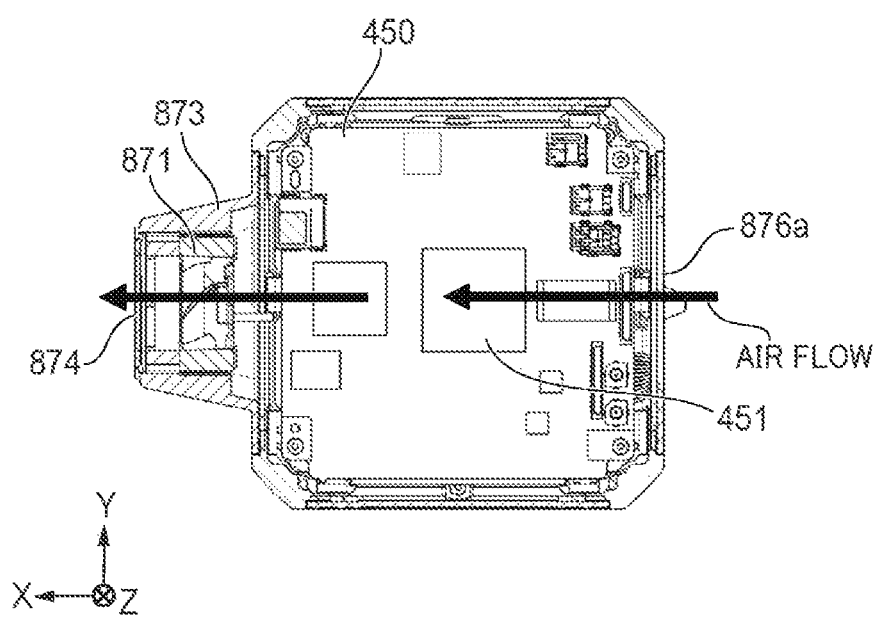

IMAGE PICKUP APPARATUS HAVING EXTENDIBILITY

BACKGROUND OF THE INVENTION

Field of the Invention

The present invention relates to an image pickup apparatus having extendibility.

Description of the Related Art

An appearance of an industrial camera is configured to arrange intermediate parts between a front case and a rear case in many cases. Moreover, an industrial camera is used by attaching extension modules, such as a cooling fan and a heat dissipation fin, according to a use case in many cases. Accordingly, when a user attaches a desired extension module, an intermediate part may be replaced or newly produced in accordance with the extension module. As a result, a problem of increasing a cost occurs.

Regarding this problem, Japanese Laid-Open Patent Publication (Kokai) No. 2002-131829 (JP 2002-131829A) proposes an image pickup apparatus (camera) of which an external appearance consists of a front case, a rear case, side brackets, an upper case, and a lower case. In this image pickup apparatus, the side brackets are fastened to the front case and rear case, openings are formed between the front case and the rear case, and the upper case and lower case are attachable to and detachable from the side brackets.

However, since the side brackets are fastened to the front case and rear case in the image pickup apparatus described in the above-mentioned publication, new side brackets must be newly produced when the image pickup apparatus is extended in an optical axis direction.

SUMMARY OF THE INVENTION

The present invention provides an image pickup apparatus having extendibility.

Accordingly, a first aspect of the present invention provides an image pickup apparatus including a front case that forms an apparatus appearance, a rear case that forms the apparatus appearance with the front case, and a plurality of panel members, wherein at least one of the front case and the rear case has a plurality of arms that extend in a direction approximately parallel to an optical axis of the image pickup apparatus and that are united with at least one of the front case and the rear case, wherein the front case and the rear case are connected through the plurality of arms, and wherein the plurality of panel members are fixed to the front case and the rear case so as to cover a plurality of openings formed in a state where the front case and the rear case are connected through the arms.

According to the present invention, the image pickup apparatus having extendibility is provided cheaply.

Further features of the present invention will become apparent from the following description of exemplary embodiments with reference to the attached drawings.

BRIEF DESCRIPTION OF THE DRAWINGS

FIG. 53A is a top view showing the state in FIG. 51A and FIG. 53B is a sectional view taken along a line T-T in FIG. 53A.

DESCRIPTION OF THE EMBODIMENTS

Figure 1A:
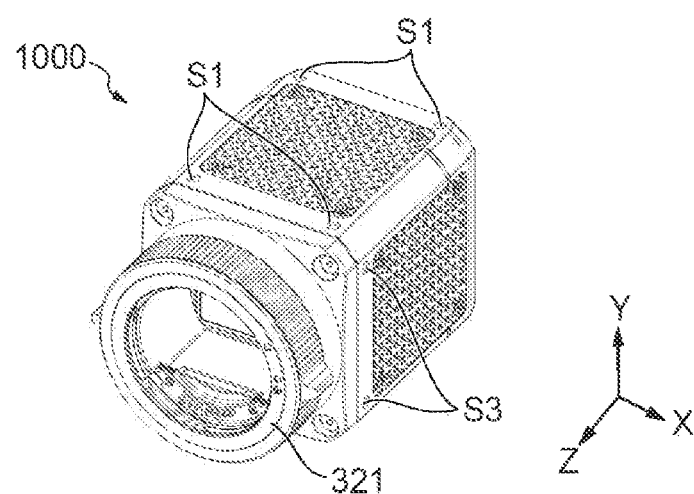
FIG. 1A, FIG. 1B, and FIG. 1C are perspective views showing an image pickup apparatus and an image pickup system according to a first embodiment.

Hereafter, embodiments according to the present invention will be described in detail by referring to the drawings. In the following description, a front-side perspective view means a view showing a target viewed from its slanting front side, and a back-side perspective view means a view showing a target viewed from its slanting back side. It should be noted that the same expression is used for an exploded perspective view.

Figure 1B:
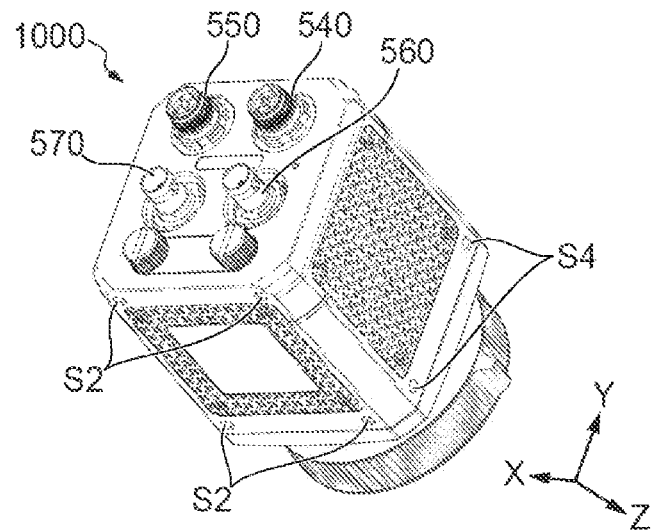
Figure 1C:
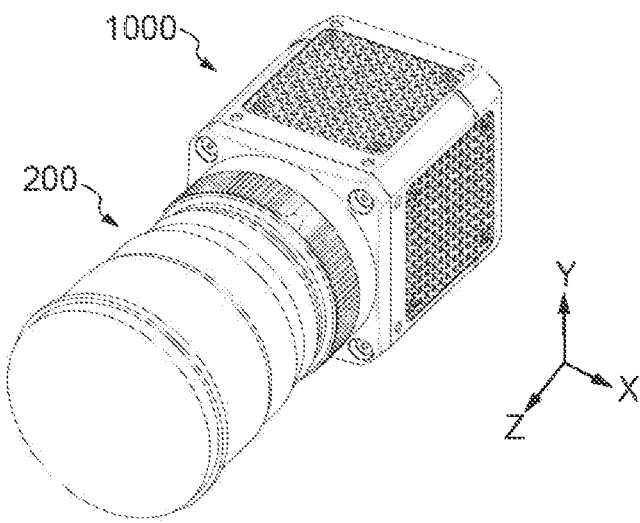

A first embodiment will be described. FIG. 1A and FIG. 1B are a front-side perspective view and a back-side perspective view showing an image pickup apparatus 1000 according to the first embodiment. FIG. 1C is a perspective view showing an external appearance of an image pickup system in which a first lens barrel 200 (what is called an interchangeable lens) is attached to the image pickup apparatus 1000.

An orthogonal coordinate system is defined as shown in FIG. 1A, FIG. 1B, and FIG. 1C for convenience of description. A Z-direction is parallel to an image-pickup optical axis (hereinafter referred to as an "optical axis") of the image pickup apparatus 1000. An X-direction is a width direction of the image pickup apparatus 1000 that intersects perpendicularly with the Z-direction. A Y-direction is a height direction of the image pickup apparatus 1000 that intersects perpendicularly with both the Z-direction and X-direction. In the Z-direction, the direction directed to an object as an image-pickup target is a positive direction (+Z-direction) and the counter direction is a negative direction (−Z-direction). In the X-direction, the rightward direction when the image pickup apparatus 1000 is viewed from the +Z side is a positive direction (+X-direction) and the counter direction (leftward direction) is a negative direction (−X-direction). In the Y-direction, the upward direction when the X-direction and Z-direction are parallel to a horizontal plane is a positive direction (+Y-direction) and the counter direction (downward direction) is a negative direction (−Y-direction). It should be noted that the front side, back side, right side, left side, upper side, and lower side of the image pickup apparatus 1000 are respectively defined as the +Z side, −Z side, +X side, −X side, +Y side, and −Y side.

A body-side mount surface 321 that enables attachment and detachment (replacement) of the first lens barrel 200 is provided in the front of the image pickup apparatus 1000. Upper mounting internal threads S1, lower mounting internal threads S2, right mounting internal threads S3, and left mounting internal threads S4 for fixing the image pickup apparatus 1000 to a housing (not shown) are respectively provided in the upper surface, lower surface, right surface, and left surface of the image pickup apparatus 1000.

The upper mounting internal threads S1 and the lower mounting internal threads S2 are provided in respective four corners of the upper surface and lower surface of the image pickup apparatus 1000. The right mounting internal threads S3 and the left mounting internal threads S4 are provided in respective two corners of the right surface and left surface on the side of the body-side mount surface 321 of the image pickup apparatus 1000.

A first interface connector 540, second interface connector 550, third interface connector 560, and fourth interface connector 570, which are used for power supply, signal output, etc., are provided in the back surface of the image pickup apparatus 1000.

Figure 2A:
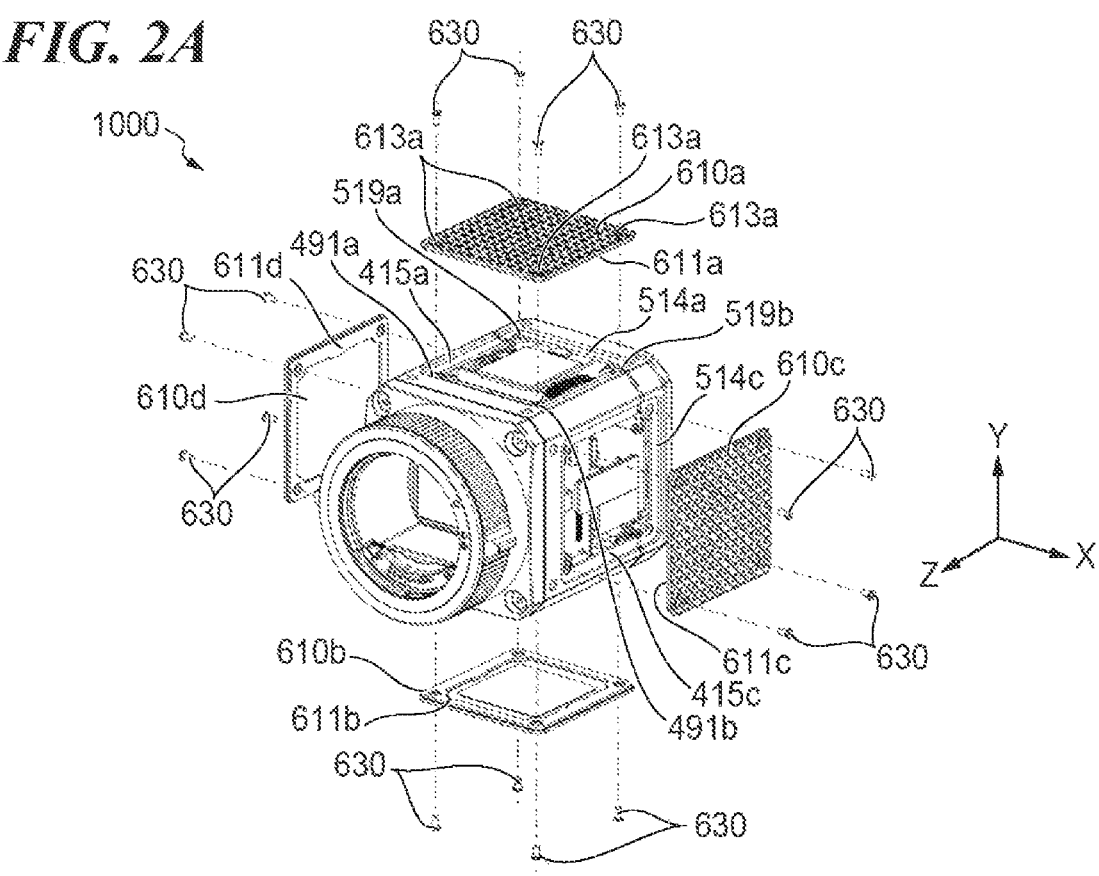
FIG. 2A and FIG. 2B are exploded perspective views showing the image pickup apparatus.
Figure 2B:
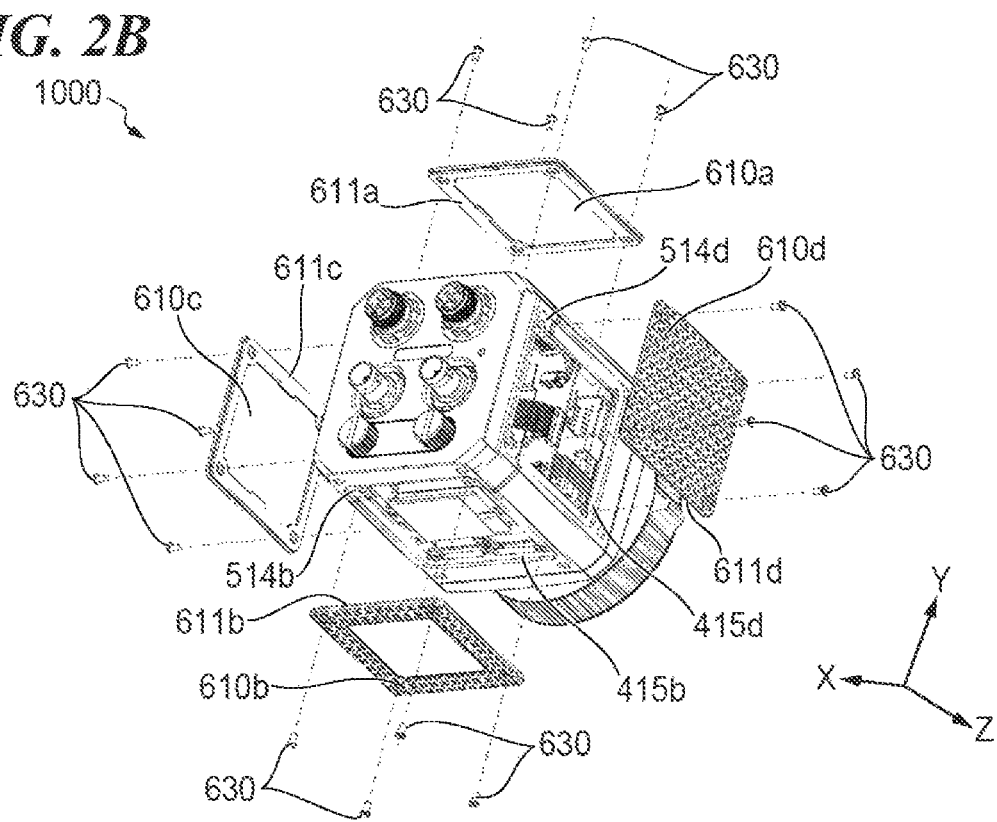

FIG. 2A and FIG. 2B are a front-side exploded perspective view and a back-side exploded perspective view showing the image pickup apparatus 1000. The image pickup apparatus 1000 has a body frame as a main body. Side panels (panel members) 610a and 610b are respectively attached to the upper surface and lower surface of the body frame with fixing screws 630. Similarly, side panels 610c and 610d are respectively attached to the right surface and left surface of the body frame with fixing screw 630. It should be noted that the side panels 610a through 610d are members that constitute the external appearance of the image pickup apparatus 1000. Details of the configuration and attachment to the body frame will be mentioned later.

Figure 3A:
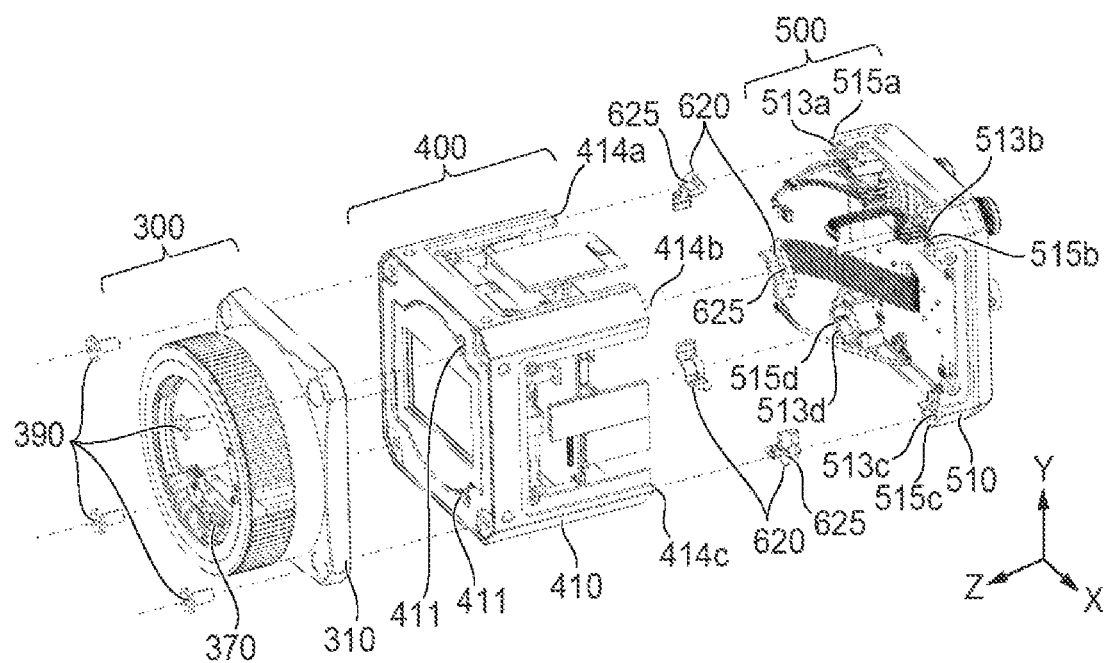
FIG. 3A and FIG. 3B are exploded perspective views showing a body frame of the image pickup apparatus.
Figure 3B:
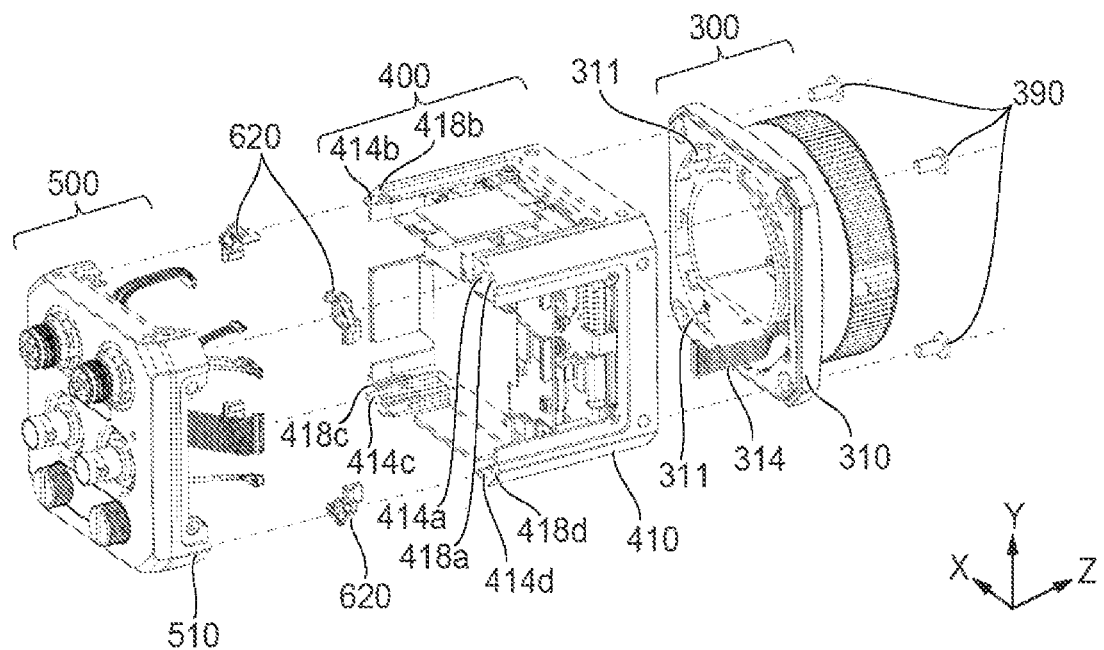

FIG. 3A and FIG. 3B are a front-side exploded perspective view and back-side exploded perspective view showing the body frame of the image pickup apparatus 1000. The body frame of the image pickup apparatus 1000 is constituted by connecting a first mount module 300, a front module 400, and a rear module 500 from the front side (+Z side) to the back side (−Z side) in this order.

The first mount module 300 is provided with a mount base 310 and a fixed mount member 320 (see FIG. 12A) that has the body-side mount surface 321 that enables attachment and detachment of the first lens barrel 200. Positioning bosses (positioning sections) 311 for positioning the first mount module 300 to the front module 400 are provided in the back surface (surface facing the front module 400) of the mount base 310. It should be noted that the first mount module 300 is an example of a module that is attachable to and detachable from the front side of the front module 400. Another module may be attached to the front side of the front module 400. Details of the configuration of the first mount module 300 will be mentioned later.

A main substrate 450 (second substrate, see FIG. 19) and an image sensor 425 (see FIG. 20A) are provided inside the front module 400. Moreover, the front module 400 has a front case 410 that constitutes an external appearance. Positioning holes 411 into which the positioning bosses 311 are fitted are provided in the front surface (surface facing the mount base 310) of the front case 410. The first mount module 300 is fastened (connected) to the front module 400 from the +Z side with fixing screws 390 in a state where the positioning bosses 311 of the mount base 310 are fitted into the positioning holes 411 of the front case 410.

Sealing members 620 for securing waterproofness are arranged between the front module 400 and the rear module 500. All the interfaces of the image pickup apparatus 1000 are collected to the rear module 500. Accordingly, change to other interfaces is available by replacing the rear module 500. It should be noted that details of the configuration that enables attachment and detachment of the rear module 500 to the front module 400 will be mentioned later.

The rear module 500 has a rear case 510 that forms an external appearance. The first interface connector 540 etc. are arranged in the rear case 510. It should be noted that details of the modules that constitute the body frame will be mentioned later.

Figure 4A:
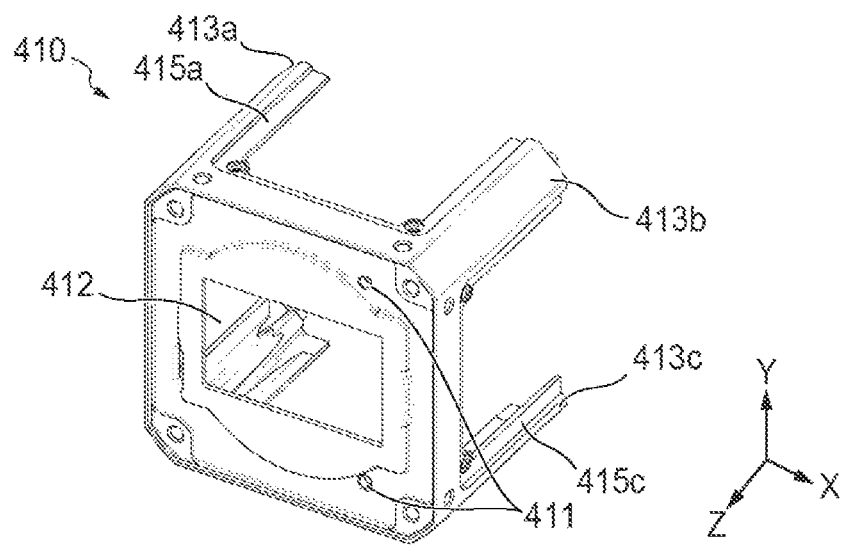
FIG. 4A and FIG. 4B are perspective views showing a front case that constitutes the body frame of the image pickup apparatus.
Figure 4B:
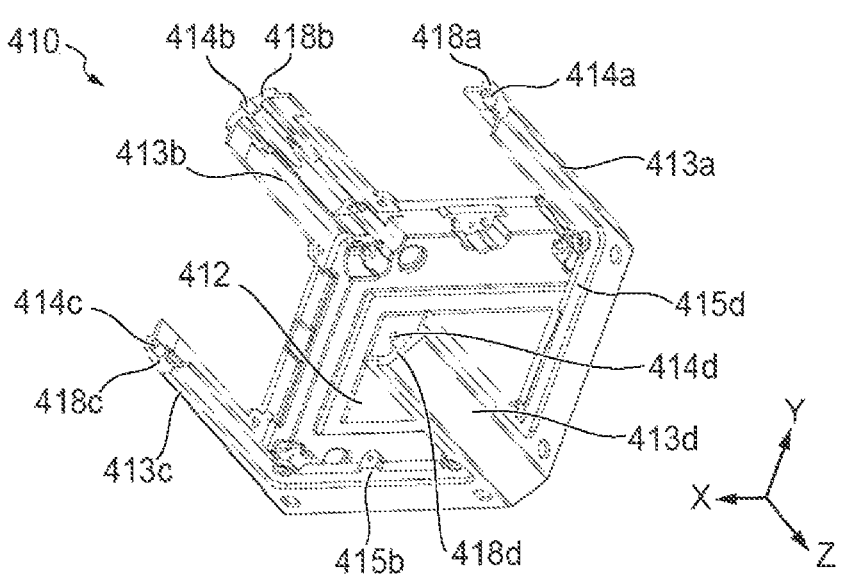

Next, the parts that constitute the external appearance will be described. FIG. 4A and FIG. 4B are a front-side perspective view and a back-side perspective view showing the front case 410 that constitutes the front module 400.

An approximately rectangular opening 412 as a light guide that guides incident light passed through the first lens barrel 200 to the image sensor is provided in the front case 410. Moreover, the front case 410 has four arms 413a, 413b, 413c, and 413d prolonged in the −Z-direction in parallel to the Z-direction. Front ends of the arms 413a through 413d function as support parts 418a, 418b, 418c, and 418d in which positioning bosses (positioning sections) 414a, 414b, 414c, and 414d are formed, respectively. Furthermore, concave portions 415a, 415b, 415c, and 415d are respectively provided in the upper surface, lower surface, right surface, and left surface of the front case 410.

Figure 4C:
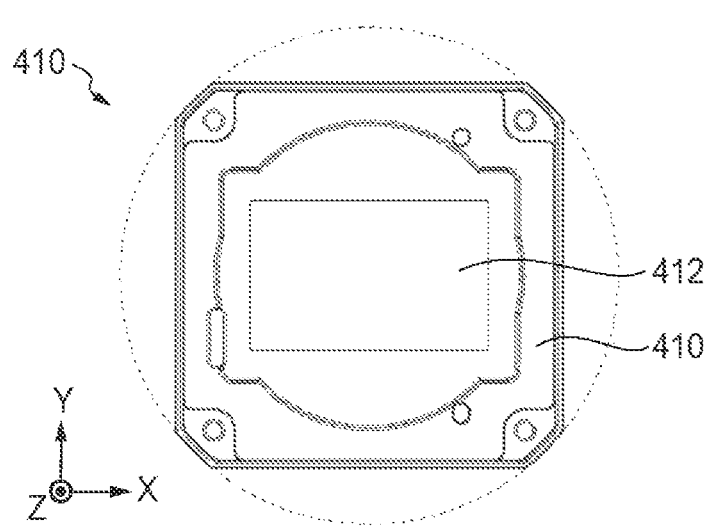
FIG. 4C is a front view showing the front case.

FIG. 4C is a front view showing the front case 410. The front case 410 is formed in a shape inscribed inside a broken-line circle when the front case 410 is viewed from the front side (in a front view). The external parts of the arms 413a through 413d of the front case 410 exhibit arcs inscribed inside the circle around an optical axis in the front view.

Figure 5A:
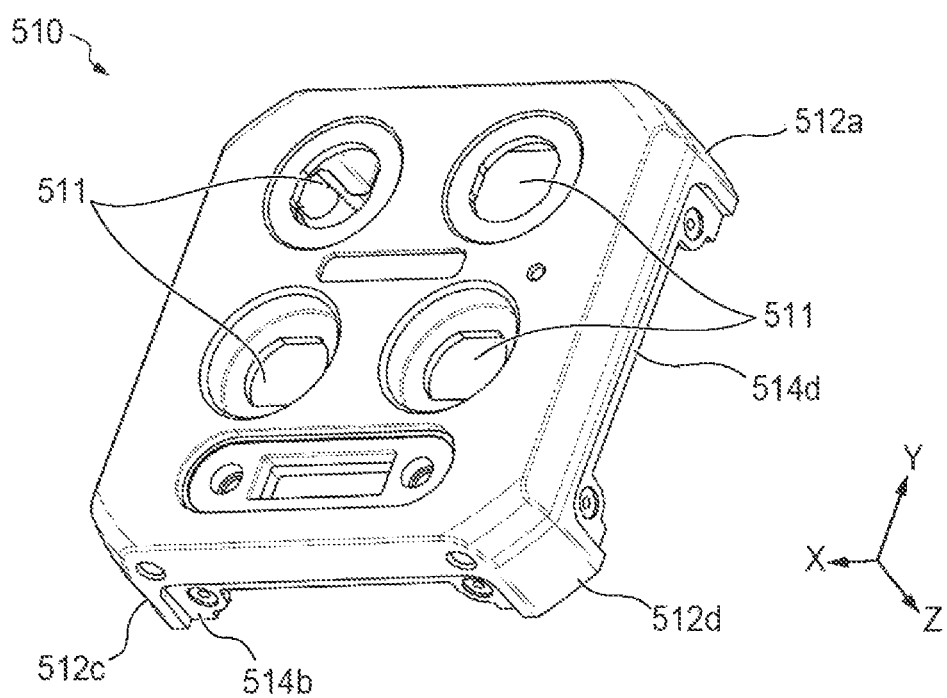
FIG. 5A and FIG. 5B are perspective views showing a rear case that constitutes the body frame of the image pickup apparatus.
Figure 5B:
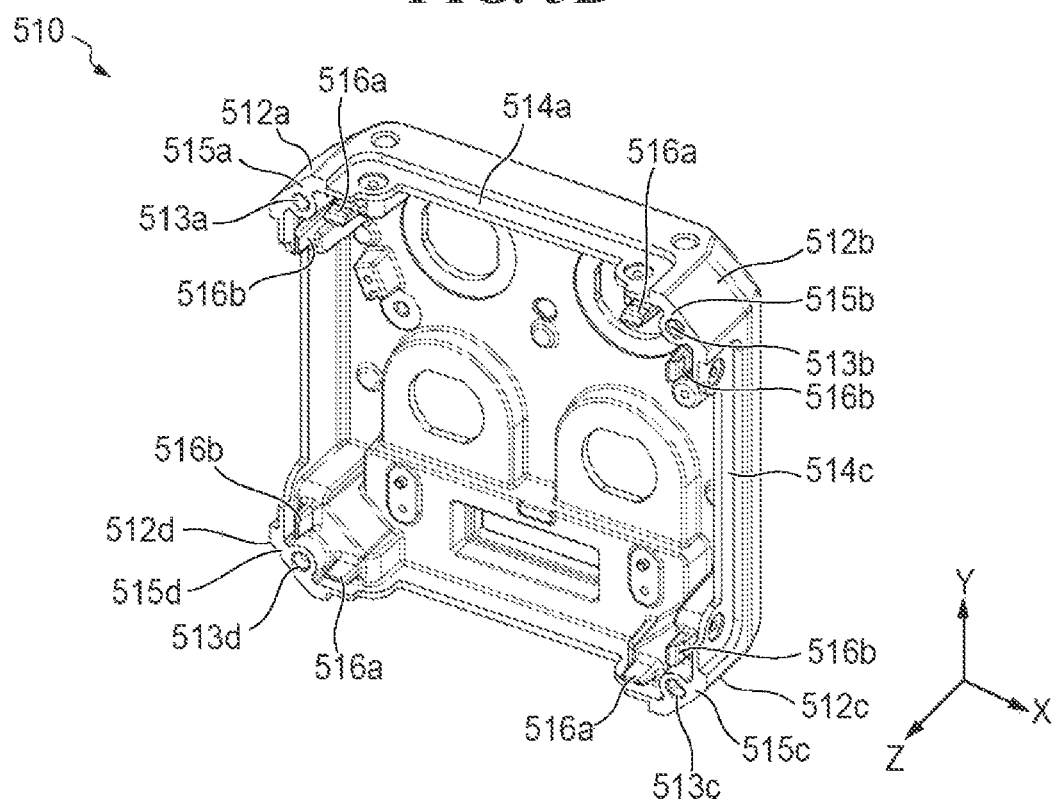

FIG. 5A and FIG. 5B are the back-side perspective view and front-side perspective view showing the rear case 510 that constitutes the rear module 500. The rear case 510 has four holes 511 into which the first interface connector 540 etc. are fitted. Moreover, concave portions 514a, 514b, 514c, and 514d are provided in the upper surface, lower surface, right surface, and left surface of the rear case 510, respectively. The rear case 510 has four arms 512a, 512b, 512c, and 512d prolonged in the +Z-direction in parallel to the Z-direction. Front ends of the arms 512a through 512d function as pressing parts 515a, 515b, 515c, and 515d in which positioning holes 513a, 513b, 513c, and 513d are formed, respectively.

The rear case 510 is positioned to the front case 410 by fitting the positioning bosses 414a through 414d of the front case 410 into the positioning holes 513a through 513d of the rear case 510, respectively. The external parts of the arms 512a through 512d of the rear case 510 exhibit arcs inscribed inside the same circle in the front view as with the arms 413a through 413d.

Figure 6A:
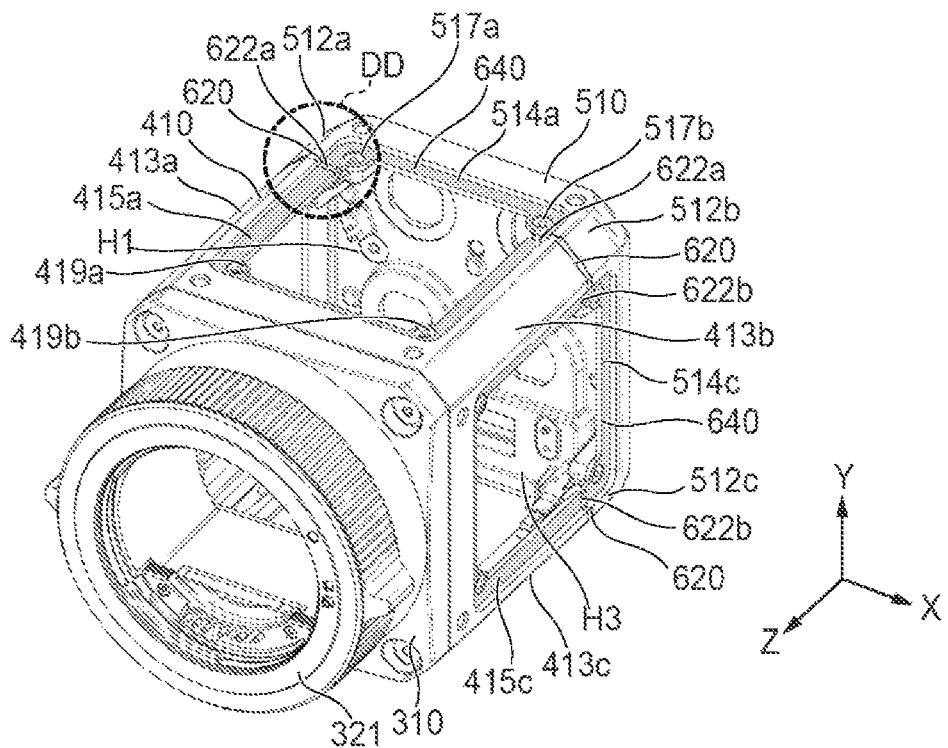
FIG. 6A and FIG. 6B are perspective views showing a state where a mount base, the front case, the rear case, and sealing members, which constitute the body frame of the image pickup apparatus, have been assembled.
Figure 6B:
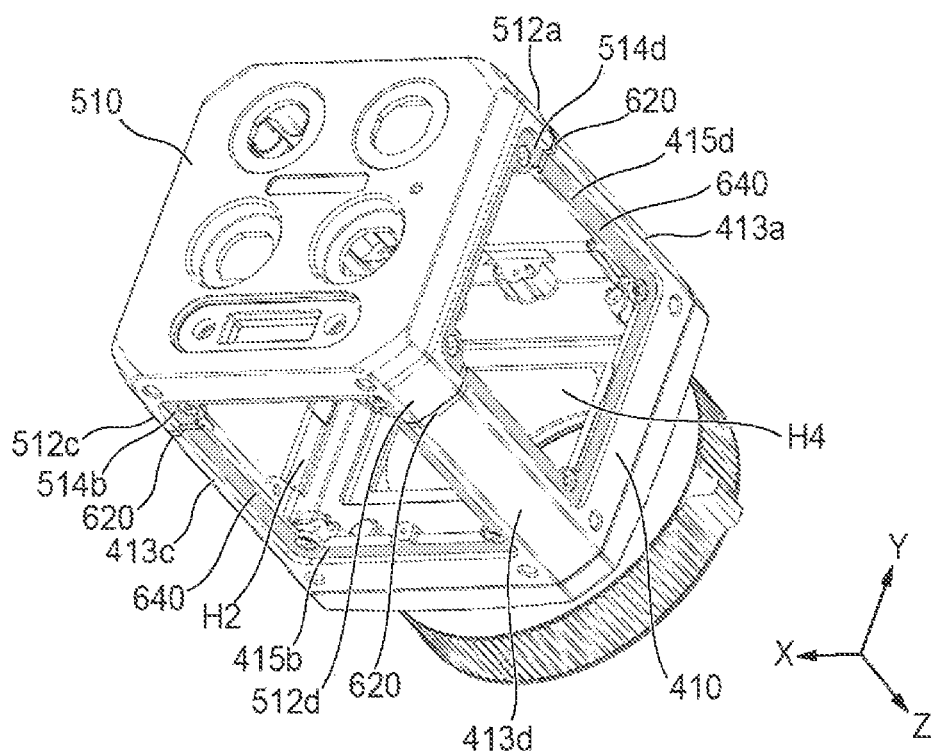

FIG. 6A and FIG. 6B are a front-side perspective view and a rear-side perspective view showing a state where the mount base 310, front case 410, rear case 510, and sealing members 620 have been assembled. The front case 410 and the rear case 510 are connected while interposing the sealing members 620 therebetween. As a result, an upper opening H1, a lower opening H2, a right opening H3, and a left opening H4 are formed by the arms 413a through 413d of the front case 410, the arms 512a through 512d of the rear case 510, and second pressing surfaces 622a and 622b of the sealing members 620.

The arms 413a through 413d of the front case 410, the arms 512a through 512d of the rear case 510, and external curved parts 626 (see FIG. 7A) of the sealing members 620 exhibit the approximately same arc shapes. Accordingly, the concave portion 415a of the front case 410, the concave portion 514a of the rear case 510, and the second pressing surfaces 622a and 622b of the sealing members 620 corresponding to these concave portions form the approximately same plane. In the same manner, the concave portions 415b through 415d, the concave portions 514b through 514d, and the second pressing surfaces 622a and 622b of the sealing member 620 corresponding to these concave portions form the approximately same planes, respectively.

In the following description, four concave portions respectively formed by the concave portions 415a through 415d of the front case 410, the concave portions 514a through 514d of the rear case 510, and the second pressing surfaces 622a and 622b of the sealing members 620 are referred to as square-frame concave portions 640.

The upper opening H1, lower opening H2, right opening H3, and left opening H4 have the same shape, and accordingly, the side panels 610a through 610d also have the same shape. As shown in FIG. 2A and FIG. 2B, the upper opening H1, lower opening H2, right opening H3, and left opening H4 are respectively covered with the side panels 610a through 610d. The side panels 610a through 610d are fitted in the square-frame concave portions 640 and are attached, respectively. For example, the fixing screws 630 are screwed to internal threads 491a and 491b of the front case 410 and internal threads 519a and 519b of the rear case 510 through insert holes 613a of the side panel 610a. Thereby, the side panel 610a occludes the upper opening H1 and is fastened to the front case 410 and rear case 510 so as to connect the front case 410 and the rear case 510. The side panels 610b through 610d fasten the front case 410 and rear case 510 as with the side panel 610a, accordingly descriptions are omitted.

It should be noted that the depth of the square-frame concave portions 640 is designed so that the side panels 610a through 610d will not project from the surfaces of the front case 410 and rear case 510 in the state where the side panels 610a through 610d are attached to the body frame of the image pickup apparatus 1000. Moreover, the internal threads 491a and 491b are respectively provided at centers of abutting concave parts 419a and 419b provided in the front case 410. And the internal threads 519a and 519b are respectively provided at centers of abutting concave parts 517a and 517b provided in the rear case 510. The abutting concave parts 419a and 419b and the abutting concave parts 517a and 517b will be mentioned later by referring to FIG. 6A, FIG. 6B, FIG. 10A, and FIG. 10B.

Incidentally, although the arms are provided in both the front case 410 and the rear case 510 in this embodiment, the arms may be provided in one of the front case 410 and rear case 510. Moreover, two arms may be provided in each of the front case 410 and rear case 510. The number of the arms provided in the front case 410 and rear case 510 is not limited to four, it should be two or more.

Figure 7A:
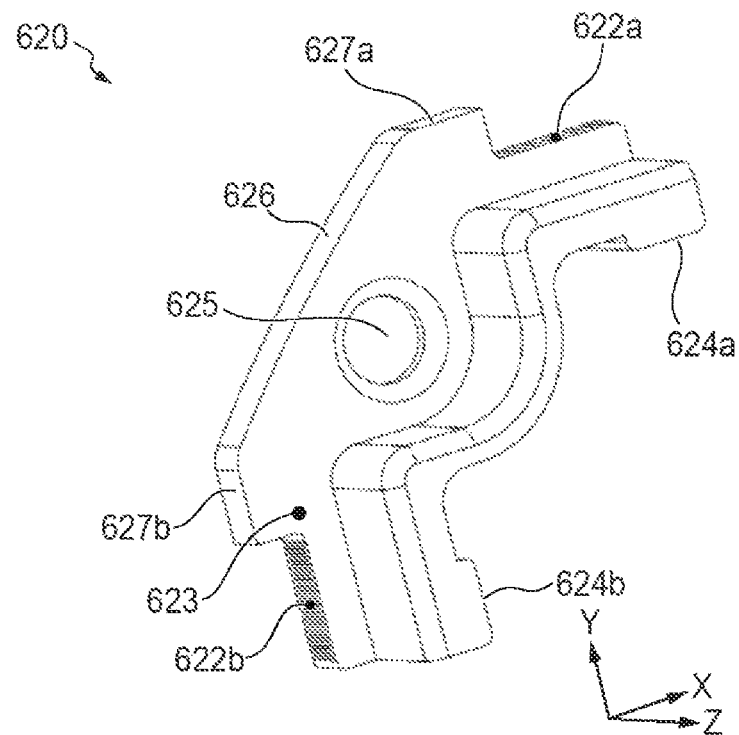
FIG. 7A and FIG. 7B are perspective views showing a sealing member that constitutes the body frame of the image pickup apparatus.
Figure 7B:
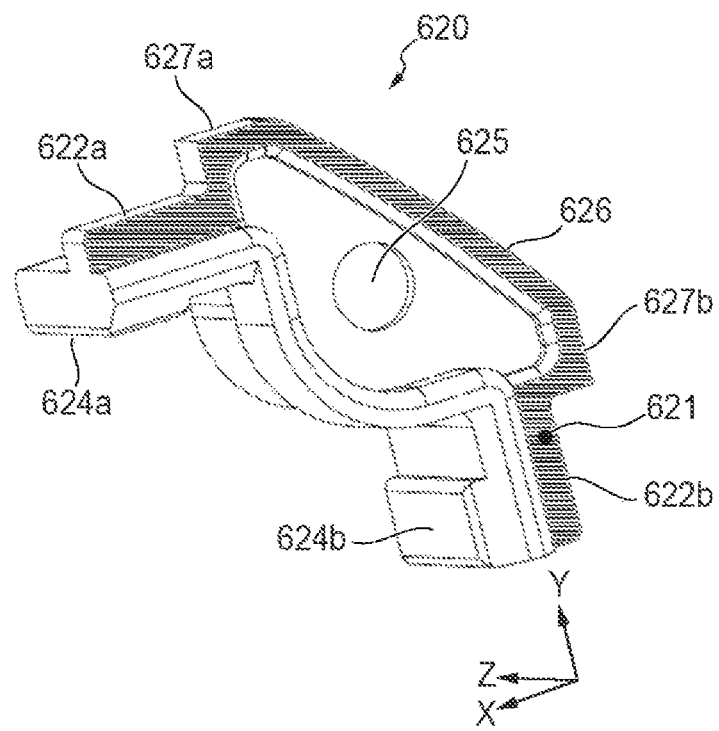

Next, the waterproof structure in the connection part between the front case 410 and the rear case 510, i.e., the waterproof structure using the sealing members 620 will be described. FIG. 7A and FIG. 7B are a front-side perspective view and a back-side perspective view showing the sealing member 620. As mentioned above, the sealing members 620 are clamped by the arms 413a through 413d of the front case 410 and the arms 512a through 512d of the rear case 510 in the Z-direction. The four sealing members 620 provided in the image pickup apparatus 1000 are the same components. FIG. 7A and FIG. 7B show the sealing member 620 arranged between the arms 413a and 512a of the image pickup apparatus 1000 for convenience of description as shown by the coordinate axes.

A positioning hole 625 that has a shape corresponding to the positioning boss 414a of the front case 410 is formed in the central part of the sealing member 620. Then, the first pressing surface 621 (a hatching section in FIG. 7B) is provided in the back side (−Z side) among surfaces that intersect perpendicularly with a center axis of the positioning hole 625. And a first support part 623 is provided in the opposite front side (+Z side).

Moreover, the sealing member 620 has the external curved part 626 and the two external flat parts 627a and 627b that expose to the external appearance when the image pickup apparatus 1000 is assembled. The two external flat parts 627a and 627b are extended from the respective ends of the external curved part 626 and approximately intersect perpendicularly to each other. Furthermore, the sealing member 620 has the second pressing surfaces 622a and 622b (hatching sections in FIG. 7A) that are respectively parallel to the external flat parts 627a and 627b. In the sealing member 620, the second support part 624a is provided in the opposite side of the second pressing surface 622a in the Y-direction, and the second support part 624b is provided in the opposite side of the second pressing surface 622b in the X-direction.

Figure 8A:
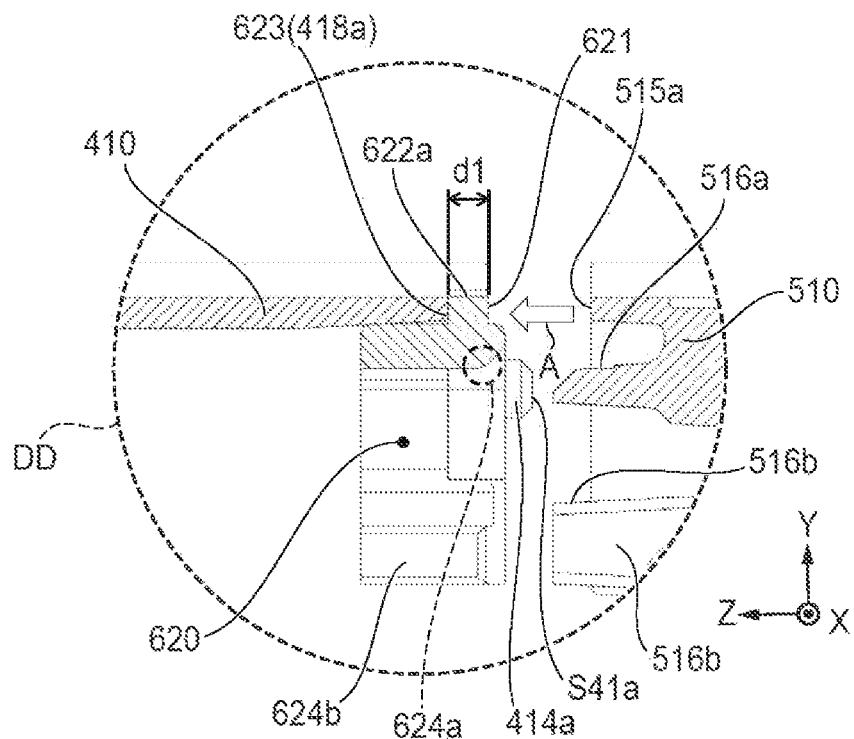
FIG. 8A and FIG. 8B are YZ sectional views showing a section DD in FIG. 6A.
Figure 8B:
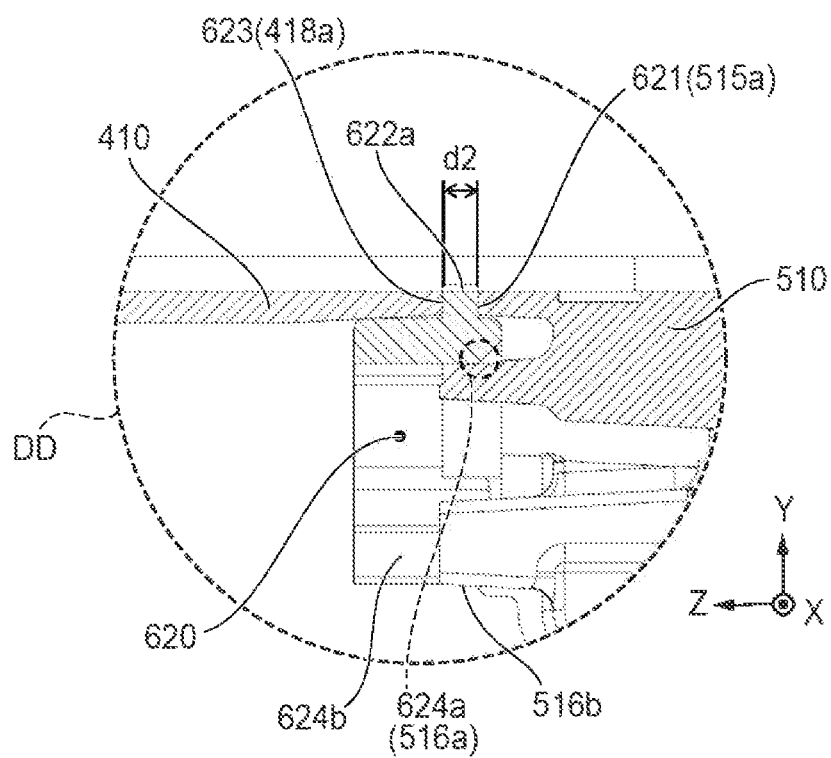

FIG. 8A and FIG. 8B are YZ sectional views (views showing sections that intersect perpendicularly with the X-direction) of a section DD in FIG. 6A. FIG. 8A and FIG. 8B show states before and after compression of the sealing member 620 in the Z-direction with the front case 410 and the rear case 510. Since the four connection parts between the front case 410 and the rear case 510 through the sealing members 620 have the same configuration, only the section DD shown in FIG. 6A is described and the descriptions about the other connection parts are omitted.

The positioning boss 414a provided at the front end of the arm 413a of the front case 410 is inserted in the positioning hole 625 of the sealing member 620. Thereby, the sealing member 620 is held by the front case 410 in the state where the first support part 623 contacts the support part 418a of the front case 410. In the state where the sealing member 620 is not compressed in the Z-direction, a thickness in the Z-direction of the vicinity of the first pressing surface 621 of the sealing member 620 is d1.

The rear case 510 is pushed from the rear to the front of the sealing member 620 (the +Z-direction from the −Z side)

as shown by an arrow A in FIG. 8A so that the positioning boss 414a will be inserted into the positioning hole 513a (see FIG. 3A). In this way, the front case 410 and the rear case 510 are connected. It should be noted that the front case 410 and the rear case 510 are simultaneously connected at the four connection parts in effect by pushing the front case 410 and the rear case 510 in the Z-direction. As a result, the first pressing surface 621 is compressed so as to move in the +Z-direction and the sealing member 620 exhibits the state shown in FIG. 8B. A thickness in the Z-direction of the vicinity of the first pressing surface 621 of the sealing member 620 is d2 in the state where the sealing member 620 is compressed in the Z-direction. The thickness d2 is less than the thickness d1.

Figure 9:
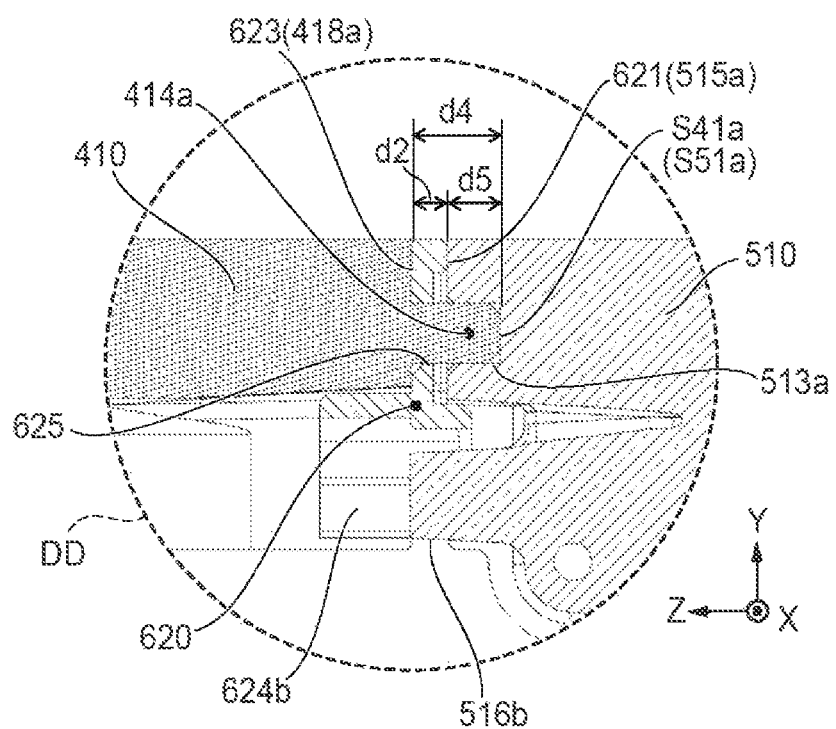
FIG. 9 is another YZ sectional view showing the Section DD in FIG. 6A.

FIG. 9 is a YZ sectional view of the section DD shown in FIG. 6A and shows the section in the position including a center axis of the positioning boss 414a. It should be noted that FIG. 9 is shown in the state where the sealing member 620 is compressed in the Z-direction as well as FIG. 8B.

The sealing member 620 is clamped between the pressing part 515a of the rear case 510 and the support part 418a of the front case 410 in the state where the positioning boss 414a is inserted into the positioning hole 625. At the same time, the positioning boss 414a is inserted into the positioning hole 513a of the rear case 510 and an end face 541a of the positioning boss 414a abuts to a bottom face 551a of the positioning hole 513a. Accordingly, the thickness d2 in the Z-direction of the vicinity of the first pressing surface 621 in the state where the sealing member 620 is compressed is determined by the difference between a height d4 of the positioning boss 414a and a depth d5 of the positioning hole 513a, and the relationship of "d2=d4−d5" is satisfied. In this way, the sealing member 620 is compressed by "d1−d2" in the Z-direction.

In the body frame of the image pickup apparatus 1000, the sealing member 620 plays a role that prevents occurrence of a gap in the Z-direction at the connection part between the support part 418a of the front case 410 and the pressing part 515a of the rear case 510. Thereby, water infiltration into the inside of the image pickup apparatus 1000 (body frame) from the outside through the connection part is prevented.

It should be noted that the second support part 624a of the sealing member 620 and the support part 516a of the rear case 510 are contacted or are approached with minute clearance in the Y-direction. Moreover, the second support part 624b of the sealing member 620 and the support part 516b of the rear case 510 are contacted or are approached with minute clearance also in the X-direction. In this way, the configuration that doubly prevents the water infiltration into the inside of the image pickup apparatus 1000 from the outside is employed.

Figure 10A:
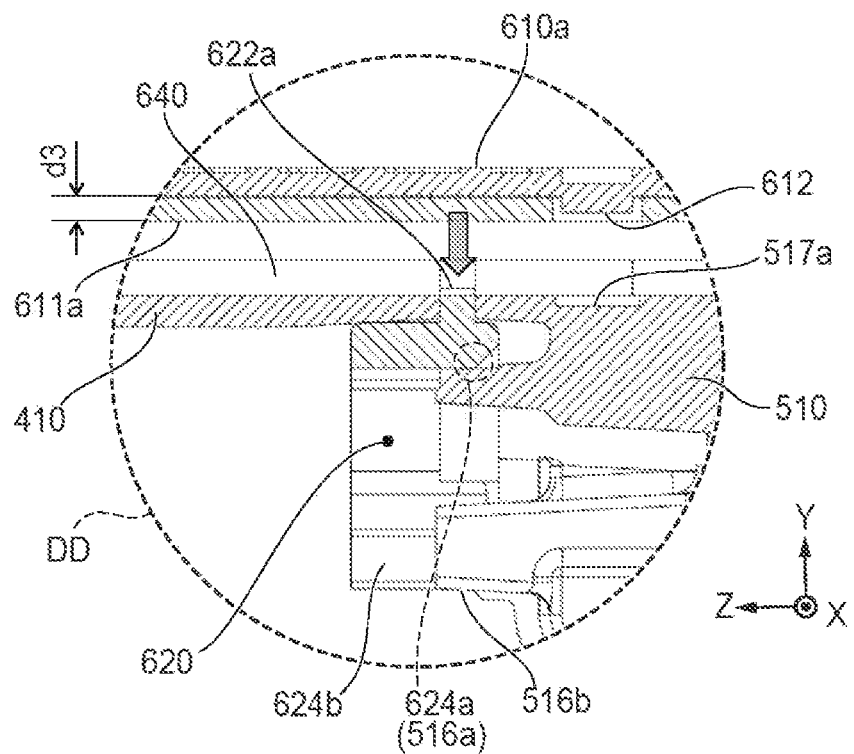
FIG. 10A and FIG. 10B are sectional views showing states before and after attachment of a side panel to the state in FIG. 8B.
Figure 10B:
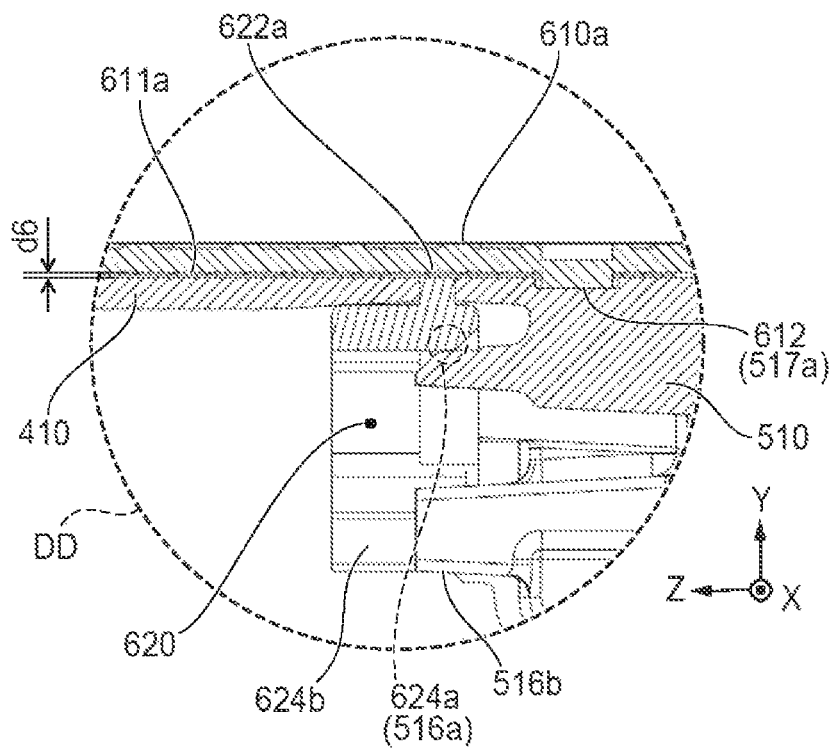

Next, a waterproof structure in the attachment parts of the side panels 610a through 610d to the body frame will be described. FIG. 10A and FIG. 10B are sectional views showing states before and after attachment of the side panel 610a to the state in FIG. 8B. Since the states before and after attachment of the side panels 610b through 610d to the body frame are the same as the states before and after attachment of the side panel 610a to the body frame, drawings and descriptions are omitted.

As shown in FIG. 2B, a panel sealing member 611a is pasted on the back surface (an opposite surface to the external appearance surface when the side panel 610a is attached to the image pickup apparatus 1000) of the side panel 610a. Then, the panel sealing member 611a is a sheet-like cushion member that has a waterproof function and is formed in an approximately square framed shape so as to cover the square-frame concave portion 640.

As shown in FIG. 10A, an abutting convex part 612 is provided in the position that is fastened by the fixing screw 630 (not shown in FIG. 10A and FIG. 10B) of the side panel 610a. It should be noted that the abutting convex parts 612 are provided in other three positions that are fastened by the fixing screws 630 of the side panel 610a. Then, the panel sealing member 611a has a through hole in the position corresponding to the abutting convex part 612. The through hole is shaped in accordance with the shape of the abutting convex part 612. Accordingly, the abutting convex part 612 is exposed to external appearance in the state where the side panel 610a is detached from the body frame and where the panel sealing member 611a is pasted on the side panel 610a.

The side panel 610a is fitted to the square-frame concave portion 640 formed in the upper surface of the body frame of the image pickup apparatus 1000 from the outside of the image pickup apparatus 1000 so as to be pushed downwardly (the −Y-direction). The thickness of the panel sealing member 611a in this state (before fastening by the fixing screws 630) is d3 that is the same as the thickness before fitting.

The side panel 610a is fastened and fixed to the body frame in the state where the abutting convex part 612 abuts to the abutting concave part 517a of the rear case 510 as shown in FIG. 10B by screwing the fixing screws 630 after fitting to the square-frame concave portion 640. Thereby, the panel sealing member 611a is compressed in the Y-direction and its thickness becomes d6. That is, the panel sealing member 611a is clamped between the square-frame concave portion 640 and the side panel 610a and is compressed in the Y-direction by "d3−d4". It should be noted that the other three abutting convex parts 612 respectively abut to the abutting concave part 517b of the rear case 510, and the abutting concave parts 419a and 419b of the front case 410.

Since the side panel 610a applies a downward load (the −Y-direction) to the second pressing surface 622a of the sealing member 620, the sealing member 620, which is an elastic member, is pushed in in the same direction and tries to be retracted. However, since the second support part 624a provided in the surface opposite to the second pressing surface 622a abuts to the support part 516a of the rear case 510, the second pressing surface 622a is pushed back in the +Y-direction. This avoids occurrence of a gap between the panel sealing member 611a and the second pressing surface 622a. That is, the panel sealing member 611a covers whole circumference of the square-frame concave portion 640 and sticks to the bottom surface of the square-frame concave portion 640 without a gap.

The panel sealing members 611b, 611c, and 611d are respectively pasted on the side panels 610b, 610c, and 610d. Since waterproof structures of the side panels 610b, 610c, and 610d are the same as the waterproof structure of the side panel 610a, their descriptions are omitted.

In this way, the image pickup apparatus 1000 achieves the waterproof structures over the upper opening H1, the lower opening H2, the right opening H3, and the left opening H4 (see FIG. 6A and FIG. 6B) that are formed on the four surfaces of the body frame by the side panels 610a through 610d.

Figure 11A:
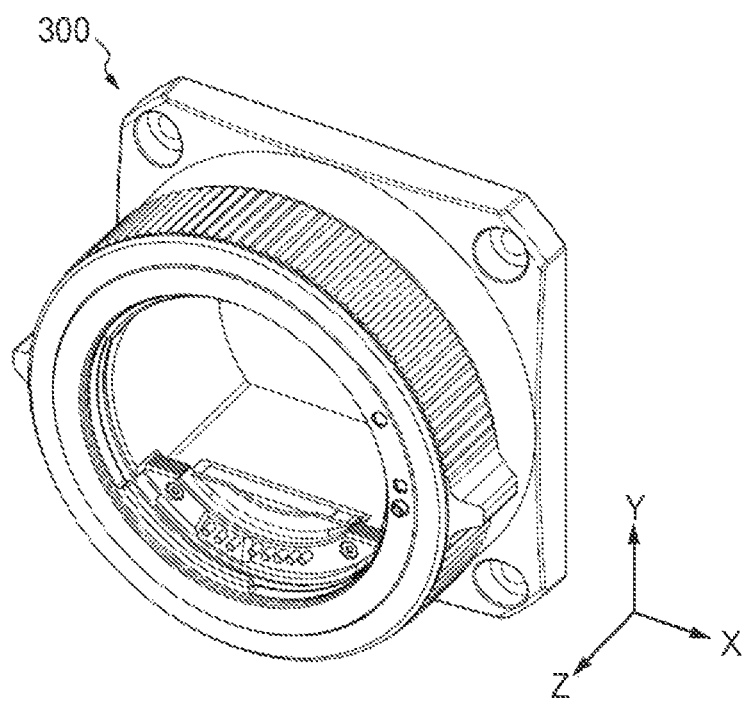
FIG. 11A and FIG. 11B are perspective views showing a first mount module that constitutes the image pickup apparatus.
Figure 11B:
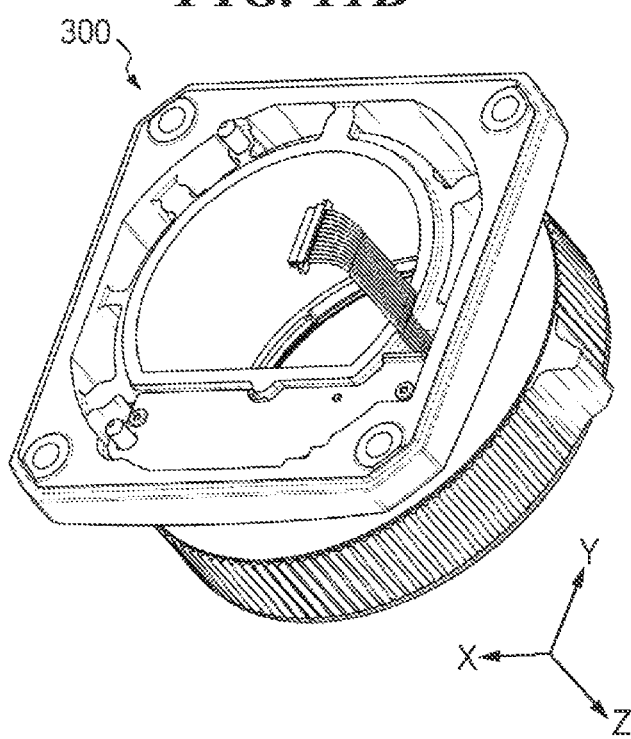
Figure 12A:
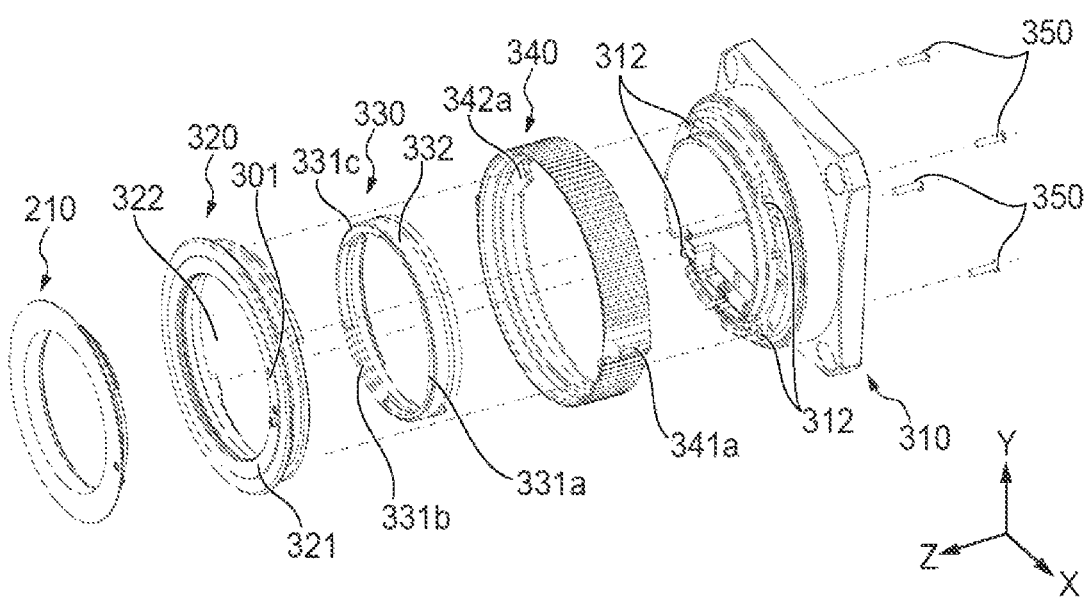
FIG. 12A and FIG. 12B are exploded perspective views showing a principal part of the first mount module.
Figure 12B:
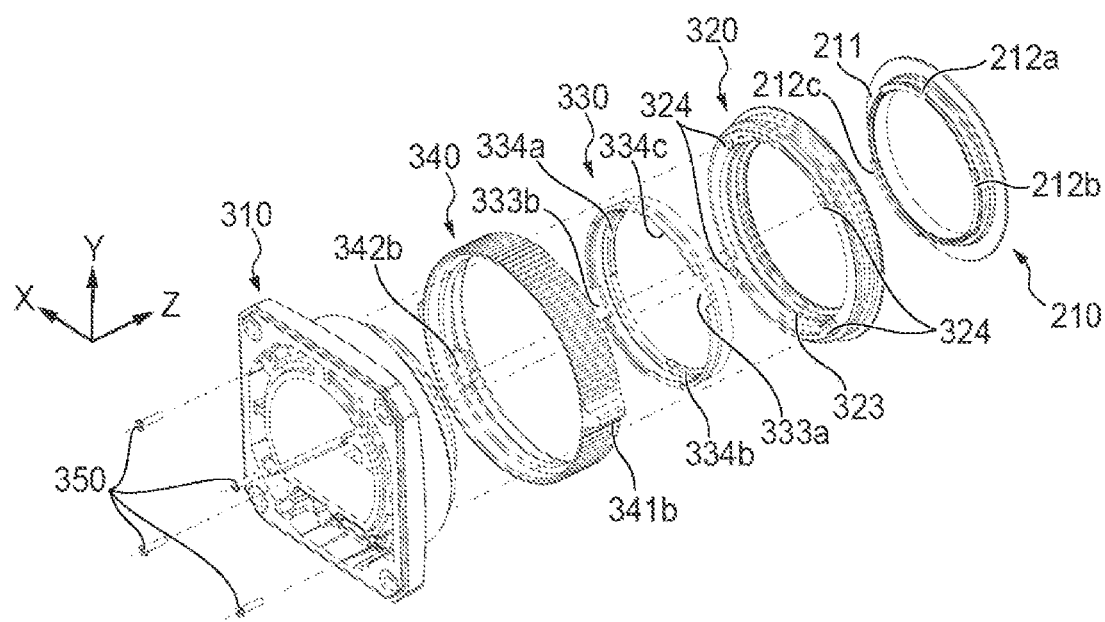
Figure 13:
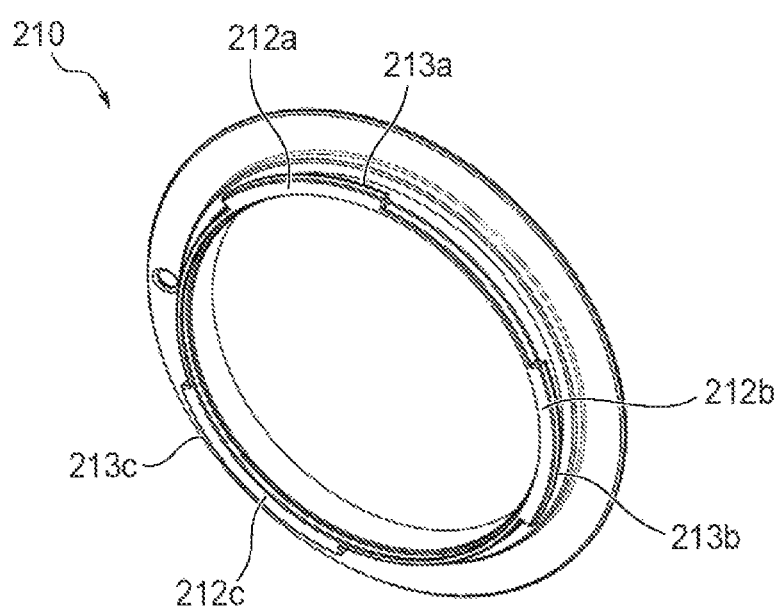
FIG. 13 is a perspective view showing a mount member of a first interchangeable lens.

Next, the configuration of the first mount module 300 will be described. FIG. 11A and FIG. 11B are a front-side perspective view and a back-side perspective view showing the first mount module 300. FIG. 12A and FIG. 12B are a front-side exploded perspective view and a back-side exploded perspective view showing the principal part of the first mount module 300 together with a mount member 210 of the first lens barrel 200. FIG. 13 is a back-side perspective view showing the mount member 210.

The first lens barrel 200 of which the external appearance is shown in FIG. 1C is provided with the mount member 210 that has a structure in accordance with the conventional bayonet type lens mount. The mount member 210 has a lens-side mount surface 211 and bayonet claws 212a, 212b, and 212c as shown in FIG. 12B. The bayonet claws 212a, 212b, and 212c respectively have bayonet-claw contact surfaces 213a, 213b, and 213c as shown in FIG. 13.

The first mount module 300 is provided with the mount base 310, the fixed mount member 320, a movable mount member 330, and an operation ring 340. Through holes 312 are provided in the mount base 310. The fixed mount member 320 has the body-side mount surface 321, an opening 322, a first thread 323, and internal threads 324. The movable mount member 330 has claws 331a, 331b, and 331c, a second thread 332, and grooves 333a and 333b. The operation ring 340 has knobs 341a and 341b and convex parts 342a and 342b.

The body-side mount surface 321 abuts to the lens-side mount surface 211 of the first lens barrel 200 when the first lens barrel 200 is attached. The bayonet claws 212a, 212b, and 212c of the first lens barrel 200 are inserted into the opening 322. The first threaded part 323 is formed as an internal thread around an optical axis that is parallel to the Z-direction and passes the center of the opening 322. The fixed mount member 320 is fixed to the mount base 310 by inserting the fixing screws 350 from the back side (−Z side) of the mount base 310 through the through holes 312 of the mount base 310 and by fastening the fixing screws 350 to the internal threads 324 of the fixed mount member 320.

The claws 331a, 331b, and 331c of the movable mount member 330 respectively have claw contact surfaces 334a, 334b, and 334c that abut to the bayonet-claw contact surfaces 213a, 213b, and 213c of the bayonet claws 212a, 212b, and 212c of the mount member 210. The second thread 332 is formed as an external thread that is screwed to the first threaded 323 of the fixed mount member 320.

The operation ring 340 is arranged between the mount base 310 and the fixed mount member 320 and is positioned by engaging the convex parts 342a and 342b of the operation ring 340 with the grooves 333a and 333b of the movable mount member 330.

Figure 14A:
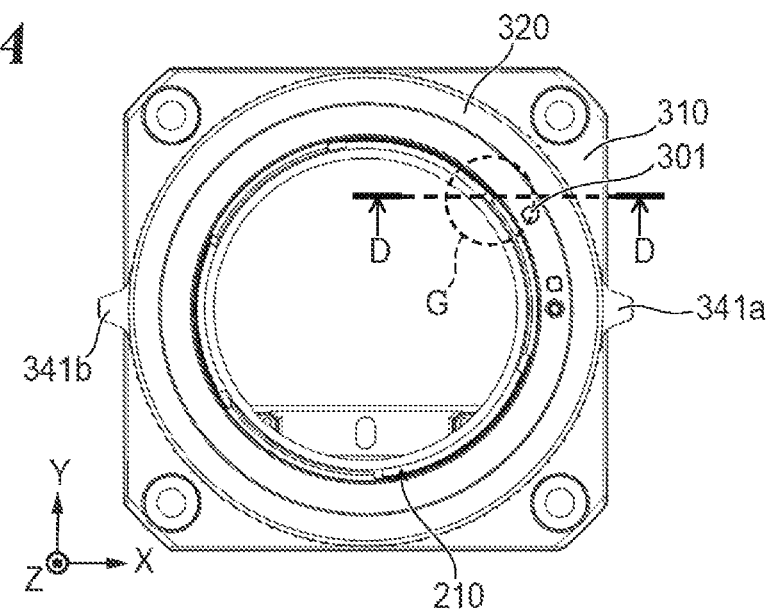
FIG. 14A, FIG. 14B, and FIG. 14C are front views showing positional relationships between a movable mount member of the first mount module and bayonet claws of the first interchangeable lens.
Figure 14B:
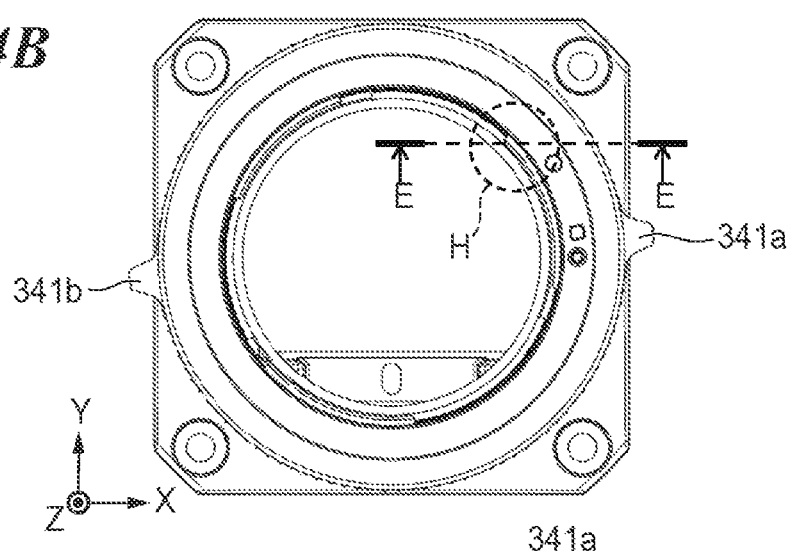
Figure 14C:
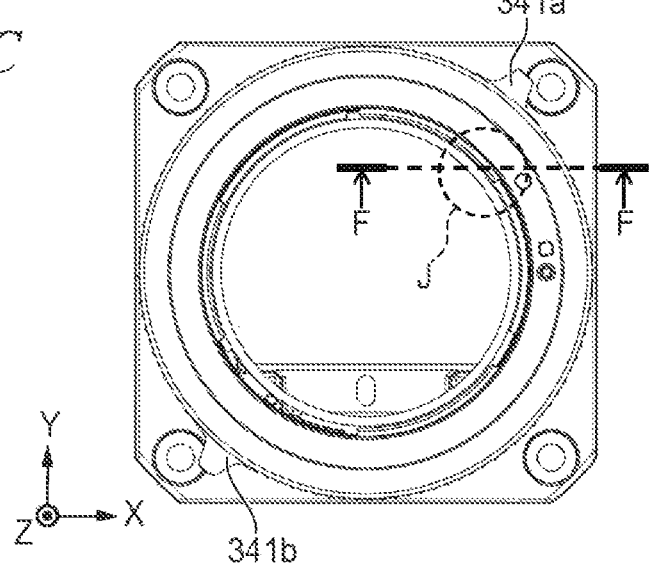
Figure 15A:
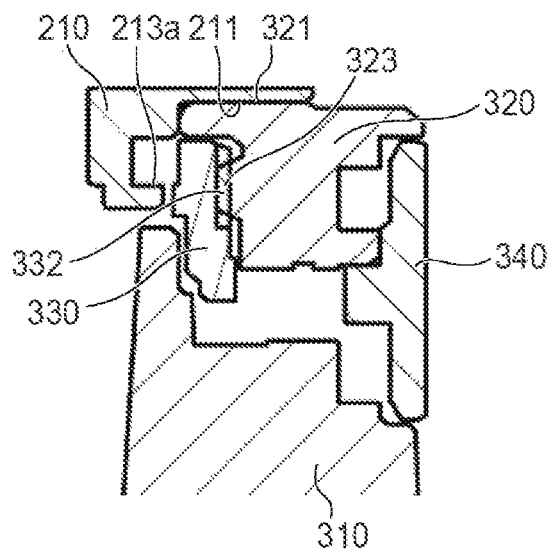
FIG. 15A, FIG. 15B, and FIG. 15C are sectional views respectively taken along a line D-D in FIG. 14A, a line E-E in FIG. 14B, and a line F-F in FIG. 14C.
Figure 15B:
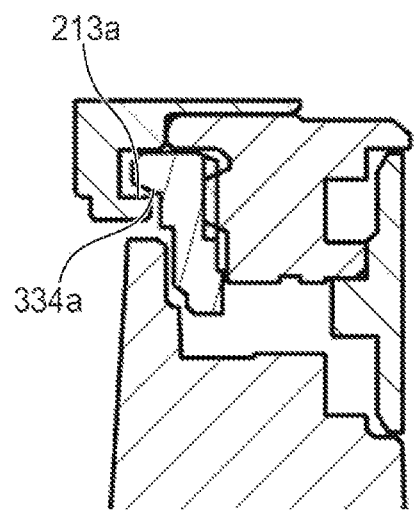
Figure 15C:
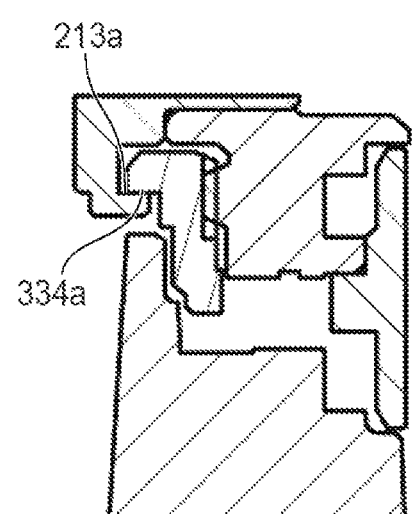
Figure 16A:
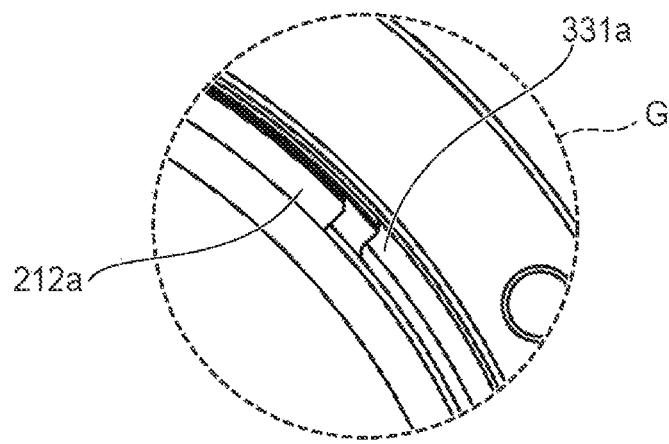
FIG. 16A, FIG. 16B, and FIG. 16C are enlarged views respectively showing a section G in FIG. 14A, a section H in FIG. 14B, and a section J in FIG. 14C.
Figure 16B:
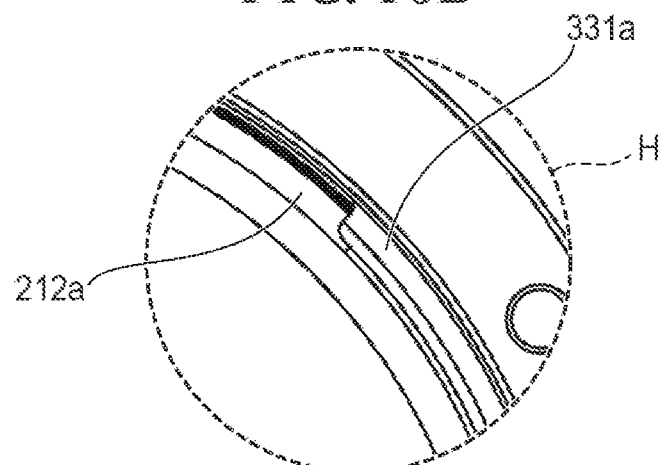
Figure 16C:
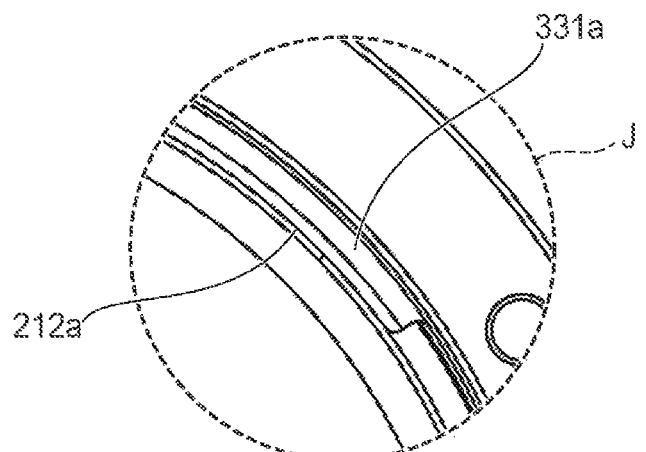

FIG. 14A, FIG. 14B, and FIG. 14C are front views showing positional relationships between the bayonet claws 212a, 212b, and 212c of the first lens barrel 200 and the claws 331a, 331b, and 331c of the movable mount member 330. FIG. 15A is a sectional view taken along a line D-D shown in FIG. 14A, FIG. 15B is a sectional view taken along a line E-E shown in FIG. 14B, and FIG. 15C is a sectional view taken along a line F-F shown in FIG. 14C. FIG. 16A is an enlarged view showing a section G shown in FIG. 14A, FIG. 16B is an enlarged view showing a section H shown in FIG. 14B, and FIG. 16C is an enlarged view showing a section J shown in FIG. 14C.

FIG. 14A shows a state where the bayonet claws 212a, 212b, and 212c do not overlap with the claws 331a, 331b, and 331c on an optical-axis projection plane when they are projected to the optical-axis projection plane and where the first lens barrel 200 is attachable to and detachable from the image pickup apparatus 1000. It should be noted that "on an optical-axis projection plane" means "on a projection plane viewed in the optical axis direction (on the XY plane viewed from the +Z side to the −Z side). That is, FIG. 14A shows a state where the mount member 210 of the first lens barrel 200 is dropped into the first mount module 300 of the image pickup apparatus 1000. In this state, the bayonet claws 212a through 212c of the first lens barrel 200 are inserted into the opening 322 of the fixed mount member 320, and the lens-side mount surface 211 of the mount member 210 is abutting to the body-side mount surface 321 of the fixed mount member 320.

FIG. 14B shows a state where the movable mount member 330 is rotated counterclockwise around the optical axis when viewed from the front side of the image pickup apparatus 1000 to a position where the claws 331a through 331c begin to overlap with the bayonet claws 212a through 212c on the optical-axis projection plane. In a transition process from the state in FIG. 14A to the state in FIG. 14B, the claws 331a through 331c of the movable mount member 330 are moving toward the mount base 310 along the optical axis direction. It should be noted that the claws 331a through 331c do not engage with the bayonet claws 212a through 212c in the state in FIG. 14B.

FIG. 14C shows a state where the operation to rotate the movable mount member 330 counterclockwise around the optical axis when viewed from the front side of the image pickup apparatus 1000 is completed and where the first lens barrel 200 is strongly attached to the image pickup apparatus 1000. In this state, the bayonet claws 212a through 212c of the first lens barrel 200 wholly overlap with the claws 331a through 331c of the movable mount member 330 on the optical-axis projection plane, and the claw contact surfaces 334a through 334c respectively abut to the bayonet-claw contact surfaces 213a through 213c.

The knobs 341a and 341b provided in the operation ring 340 are shaped so as not to protrude from the image pickup apparatus 1000 on the optical-axis projection plane in the state where the first lens barrel 200 is attached. This reduces unintentional external force acting to the knobs 341a and 341b in the state where the first lens barrel 200 is attached.

A procedure of attaching the first lens barrel 200 to the image pickup apparatus 1000 is as follows. First, a user aligns an index (not shown) provided in the first lens barrel 200 with an index 301 (see FIG. 14A) provided in the fixed mount member 320 and abuts the lens-side mount surface 211 of the first lens barrel 200 to the body-side mount surface 321 of the fixed mount member 320. Thereby, the state in FIG. 14A is achieved. Next, the user grips the two knobs 341a and 341b and rotates the operation ring 340 counterclockwise when viewed from the +Z side so that the bayonet claws 212a through 212c will overlap with the claws 331a through 331c on the optical-axis projection plane as shown in FIG. 14B.

After that, the user grips the two knobs 341a and 341b and further rotates the operation ring 340 counterclockwise when viewed from the +Z side, so that the claw contact surfaces 334a through 334c abut to the bayonet-claw contact surfaces 213a through 213c. Thereby, the first lens barrel 200 is fixed to the first mount module 300 as shown in FIG. 14C. When detaching the first lens barrel 200 from the image pickup apparatus 1000, the user may conversely perform the above-mentioned attachment operation of the first lens barrel 200 and its description is omitted.

Figure 17A:
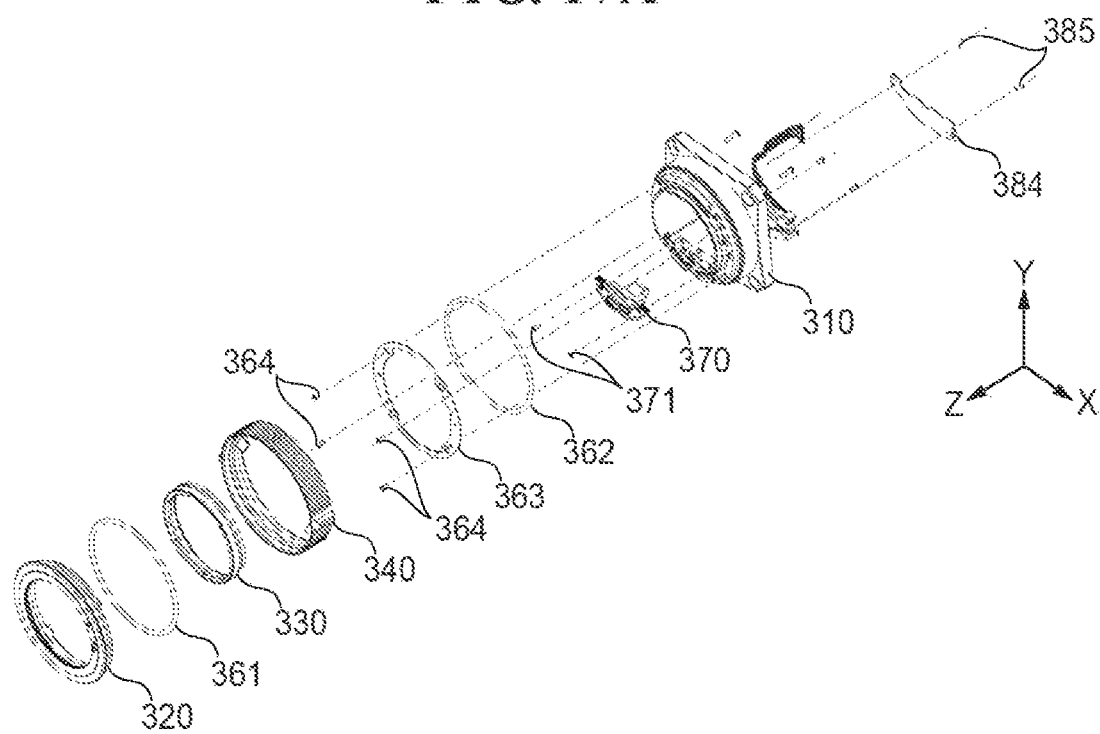
FIG. 17A and FIG. 17B are exploded perspective views showing the first mount module.
Figure 17B:
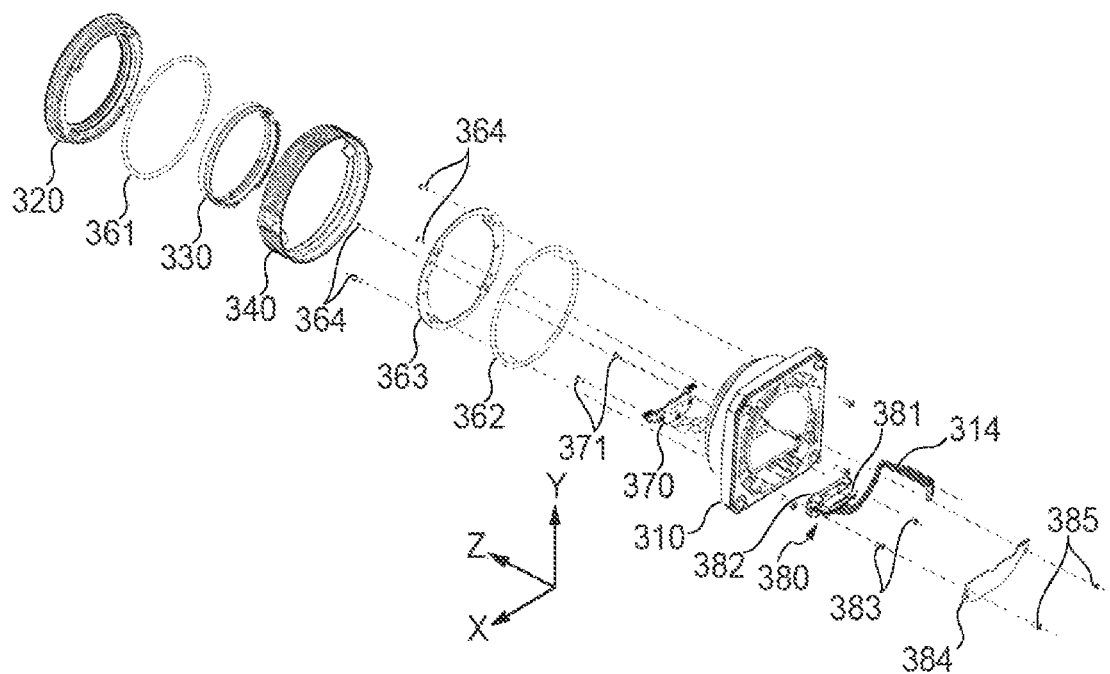

Next, the configuration and waterproof structure of the first mount module 300 will be described in detail. FIG. 17A and FIG. 17B are a front-side exploded perspective view and a back-side exploded perspective view showing the first mount module 300.

The first mount module 300 is provided with the mount base 310, the fixed mount member 320, the movable mount member 330, and the operation ring 340 as mentioned above. The first mount module 300 is further provided with a first O-ring 361, a second O-ring 362, a metal plate member 363, fixing screws 364, an electrical communication contact unit 370, and a rotation detection unit 380.

The first O-ring 361 is arranged between the fixed mount member 320 and the operation ring 340. The metal plate member 363 is fixed to the mount base 310 with the fixing screws 364. The second O-ring 362 is arranged between the metal plate member 363 and the mount base 310. Although the metal plate member 363 and the mount base 310 are configures as separate members in this embodiment, they may be configured as a single member. When the first lens barrel 200 is attached to the first mount module 300, the electrical communication contact unit 370 contacts and conducts an electrical communication contact unit of the first lens barrel 200. Thereby, communication between the image pickup apparatus 1000 and the first lens barrel 200 becomes available through the contact members.

The rotation detection unit 380 is provided with a rotation sensor 381, a support metal plate 382, and a communication cable 314. The rotation sensor 381 is fixed to the support metal plate 382, and the support metal plate 382 is fastened to the mount base 310 with fixing screws 383. The rotation sensor 381 detects attachment of the first lens barrel 200 to the image pickup apparatus 1000 and switches ON and OFF of the electrical communication contact unit 370. The communication cable 314 is connected to the main substrate 450 provided in the front module 400 and enables communication between the rotation sensor 381 and the main substrate 450. A cover 384 is fixed to the mount base 310 with fixing screws 385 and regulates routing of the communication cable 314.

Figure 18A:
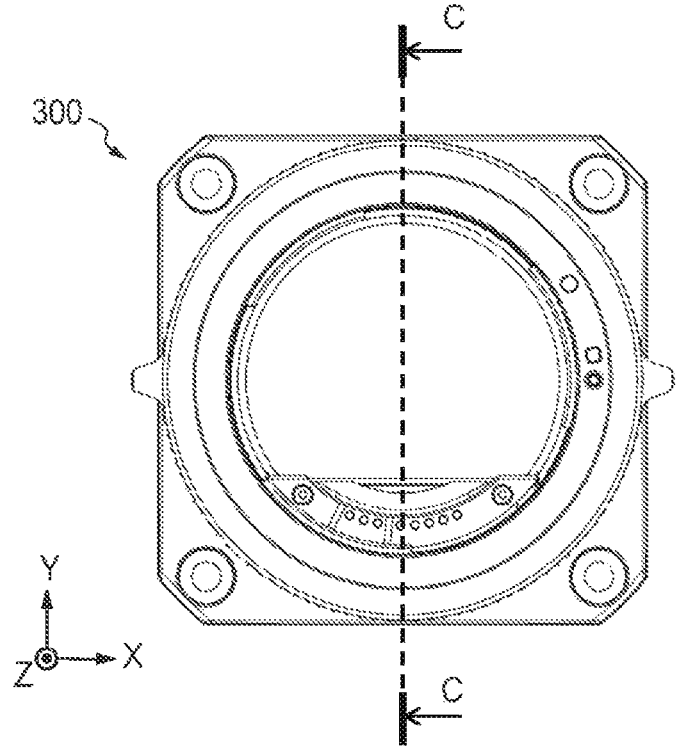
FIG. 18A is a front view showing the first mount module and FIG. 18B is a sectional view taken along a line C-C in FIG. 18A.
Figure 18B:
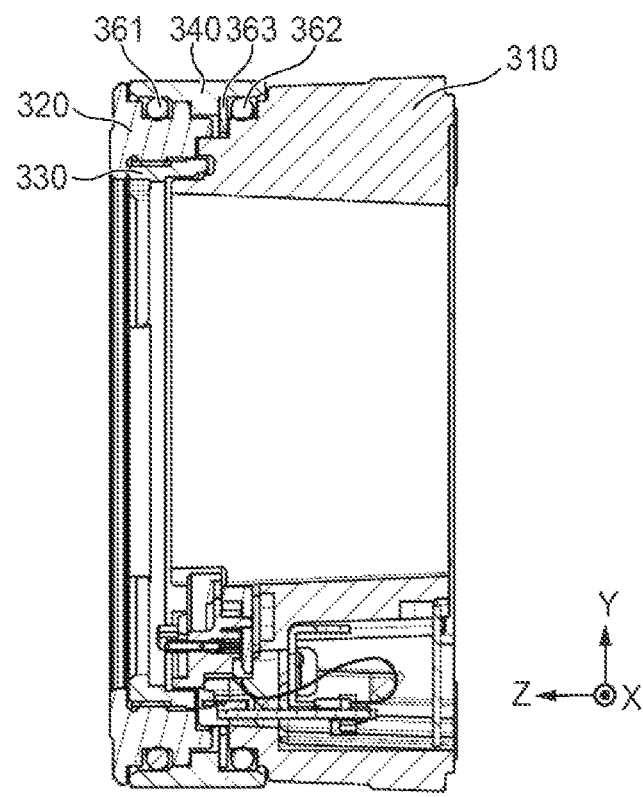

FIG. 18A is a front view showing the first mount module 300, and FIG. 18B is a sectional view taken along a line C-C shown in FIG. 18A. In the first mount module 300, the first O-ring 361 is arranged between the fixed mount member 320 and the operation ring 340 so that a gap will not appear between the fixed mount member 320 and the operation ring 340. Similarly, the second O-ring 362 is arranged between the mount base 310 and the operation ring 340 so that a gap will not appear between the mount base 310 and the operation ring 340. In this way, infiltration of water and dust into the inside of the first mount module 300 from the outside is prevented.

Figure 19:
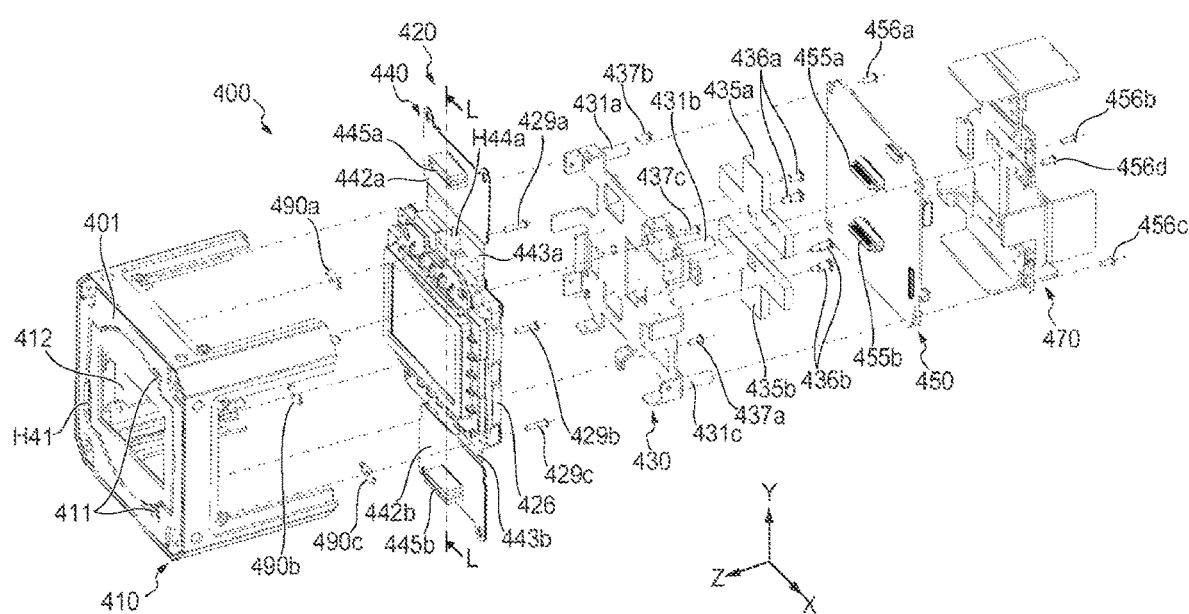
FIG. 19 is an exploded perspective view showing a front module that constitutes the image pickup apparatus.

Next, the configuration of the front module 400 will be described. FIG. 19 is a front-side exploded perspective view showing the front module 400. The front module 400 is provided with the front case 410, washers 490a, 490b, and 490c, an image pickup module 420, a substrate holder 430, elastic members 435a and 435b, the main substrate 450, and a heat sink unit 470 that are arranged in this order from the front side (+Z side) to the rear side (−Z side).

The two positioning holes 411 are provided in upper and lower sides of the front surface of the front case 410. The first mount module 300 is positioned to the front case 410 by inserting the two positioning bosses 311 of the first mount module 300 into the two positioning holes 411. In this way, the first mount module 300 is in the state positioned to the front case 410 and is fixed by the four fixing screws 390 from the front (see FIG. 3A).

As mentioned above by referring to FIG. 4A, the opening 412 for guiding incident light to the image sensor 425 is provided in the central part of the front surface of the front case 410. Moreover, the front case 410 has a communication cable insert hole H41 through which the communication cable 314 (see FIG. 3B and FIG. 17B) connected to the electrical communication contact unit 370 of the first mount module 300 is wired to the inside of the image pickup apparatus 1000. When the communication cable 314 is connected to a connector (not shown) implemented in the main substrate 450, electric connection between the electrical communication contact unit 370 and the main substrate 450 is established.

An elastic member 401 that is shaped so as to avoid the positioning holes 411, communication cable insert hole H41, and opening 412 is pasted on the front surface of the front case 410 with a double-stick tape. The elastic member 401 is a sheet-like cushion member that has a waterproof function. Since the elastic member 401 is clamped between the front case 410 and the first mount module 300 in the compressed state, infiltration of water and dust into the inside of the image pickup apparatus 1000 through the boundary between the front case 410 and the first mount modules 300 is prevented.

The image pickup module 420 is provided with a sensor substrate 440 (first substrate) that has flexible parts 443a and 443b arranged at upper and lower sides (Y-direction) and a sensor plate 426 to which the image sensor 425 adheres. The image pickup module 420 is fixed to the front case 410 with sensor-plate fixing screws 429a, 429b, and 429c. The sensor substrate 440 has auxiliary rigid parts 442a and 442b to which first B-to-B connectors 445a and 445b are respectively implemented in the upper side (+Y side) and the lower side (−Y side).

Figure 25A:
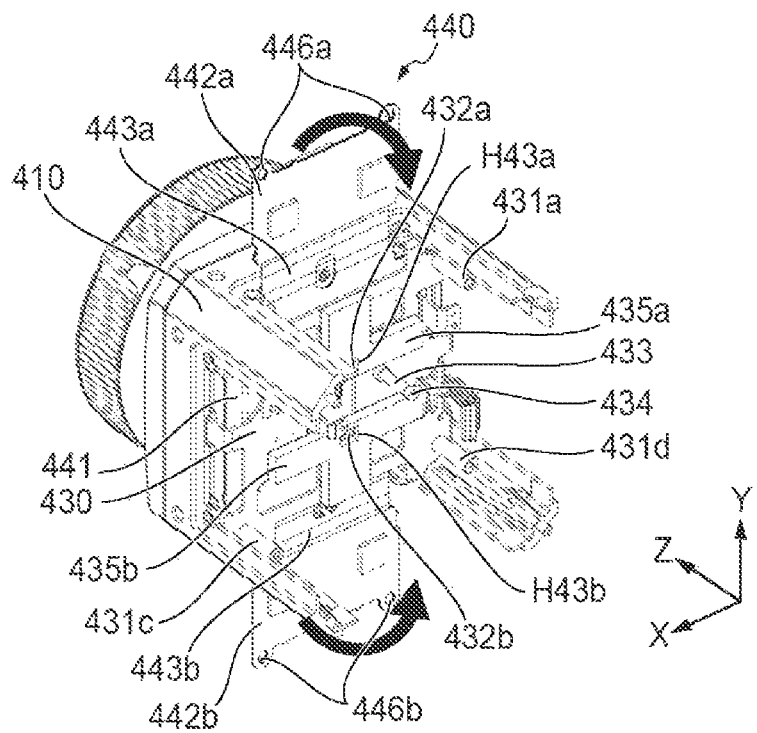
FIG. 25A and FIG. 25B are perspective views showing the state where the image pickup module is attached to the front case.

The washers 490a through 490c are arranged between the front case 410 and the sensor plate 426 and are used for flange back adjustment and tilt adjustment of the image sensor 425 during assembling of the image pickup apparatus 1000. The substrate holder 430 is a frame member (a metal plate) that holds the auxiliary rigid parts 442a and 442b of the sensor substrate 440 and the main substrate 450 and is fastened and fixed to the front case 410 with substrate holder fixing screws 437a, 437b, and 437c. Substrate support members 431a, 431b, 431c, and 431d prolonged to the back side (−Z side) are respectively provided in the four corners of the substrate holder 430 by caulking. The member 431d is shown in FIG. 25A. The substrate support members 431a through 431d are formed in the same shape that has an internal thread (not shown) at a back surface (the surface on the −Z side).

Main-substrate fixing screws 456b, 456c, and 456d are inserted through the main substrate 450 and the heat sink unit 470, a main-substrate fixing screw 456a is inserted through the main substrate 450, and the screws are respectively screwed to the internal threads of the substrate support members 431a through 431d. Thereby, the main substrate 450 and the heat sink unit 470 are fastened to the substrate holder 430. The elastic members 435a and 435b are cushion members of the same shape and are adhered to the substrate holder 430.

Second B-to-B connectors 455a and 455b implemented in the main substrate 450 are respectively connected to the first B-to-B connectors 445a and 445b implemented in the sensor substrate 440. Communication becomes available between the sensor substrate 440 and the main substrate 450 by connecting the first B-to-B connectors 445a and 445b with the second B-to-B connectors 455a and 455b, respectively. The details of the connection between the sensor substrate 440 and the main substrate 450 will be mentioned later.

The heat sink unit 470 is a metal plate unit for radiating heat that occurs in the main substrate 450. The heat sink unit 470 is fastened to the substrate support members 431a through 431*d* with the main-substrate fixing screws 456*b* through 456*d* as mentioned above by interposing the main substrate 450.

Figure 20A:
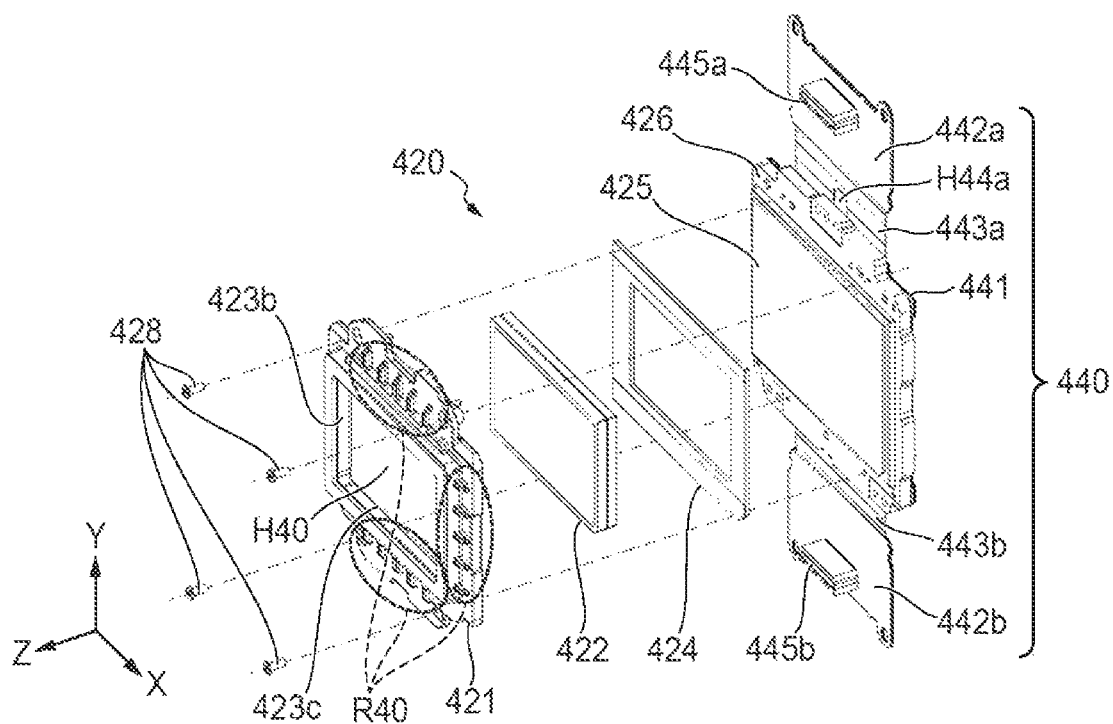
FIG. 20A and FIG. 20B are exploded perspective views showing an image pickup module that constitutes the front module.
Figure 20B:
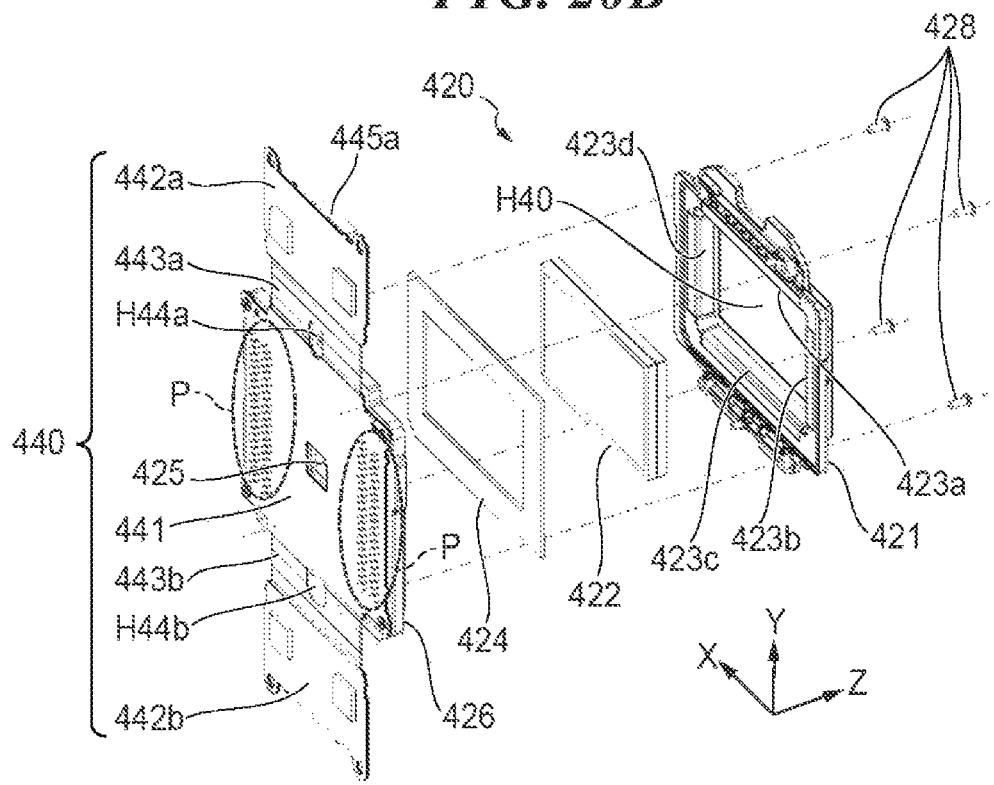

FIG. 20A and FIG. 20B are a front-side exploded perspective view and a back-side exploded perspective view showing the image pickup module 420. The image pickup module 420 is provided with an optical element 422, a holding member 421, the image sensor 425, the sensor plate 426, and the sensor substrate 440. The optical element 422 is a low pass filter that has a three layer structure consisting of two crystal birefringent plates of which phases differ by 90 degrees and a depolarization plate arranged therebetween, for example. The holding member 421 holds the optical element 422.

The sensor substrate 440 is a rigid flexible substrate. The sensor substrate 440 has a main rigid part 441 and auxiliary rigid parts 442*a* and 442*b* that branch from the main rigid part 441 in the vertical direction through flexible parts 443*a* and 443*b*. The auxiliary rigid parts 442*a* and 442*b* are electrically connected to the main rigid part 441 through the flexible parts 443*a* and 443*b*, respectively. Moreover, the flexible parts 443*a* and 443*b* can be bent by at least 180 degrees while keeping the electrical connections between the main rigid part 441 and the auxiliary rigid parts 442*a* and 442*b*. The flexible part 443*a* has an opening H44*a* through which the sensor-plate fixing screw 429*a* (see FIG. 19) is insertable. The flexible part 443*b* has an opening H44*b* through which the substrate holder fixing screw 437*a* (see FIG. 19) is insertable.

The first B-to-B connectors 445*a* and 445*b* that are connectable to the second B-to-B connectors 455*a* and 455*b* implemented in the front surface of the main substrate 450 are respectively implemented in the auxiliary rigid parts 442*a* and 442*b*. The first B-to-B connectors 445*a* and 445*b* are respectively implemented in the auxiliary rigid parts 442*a* and 442*b* so as to face the front side (+Z-direction) when the flexible parts 443*a* and 443*b* are not bent. When the flexible parts 443*a* and 443*b* are bent and the auxiliary rigid parts 442*a* and 442*b* are arranged behind the main rigid part 441 (−Z side), the first B-to-B connectors 445*a* and 445*b* face the back side (−Z-direction). Furthermore, the details will be mentioned later by referring to FIG. 25.

The image sensor 425 is fixed to a front central part of the sensor plate 426 with ultraviolet curing adhesive etc. A plurality of holes corresponding to the number and sizes of contact pins P of the image sensor 425 are provided in the main rigid part 441 of the sensor substrate 440. All the contact pins P are inserted through an opening (not shown) provided in the sensor plate 426 and the holes provided in the main rigid part 441 and are projected to the back side (−Z side) of the sensor substrate 440. Moreover, the contact pins P are soldered to lands (not shown) provided in the sensor substrate 440, respectively, and the image sensor 425 is electrically connected to the sensor substrate 440.

The holding member 421 has an approximately rectangular opening H40 that stores the optical element 422 and guides incident light to the image sensor 425. The holding member 421 is fastened to the sensor plate 426 from the front side with the holding-member fixing screws 428 while storing the optical element 422 and a dustproof sheet 424 behind the optical element 422 (−Z side). Heat dissipation ribs R40 are provided in the front surface (+Z side) of the holding member 421. The heat dissipation ribs R40 do not only function as heat dissipation fins that diffuse heat of the image sensor 425 transferred through the sensor plate 426 so as to reduce a temperature of the image sensor 425, but also play a role of improving rigidity of the image pickup module 420.

Figure 21:
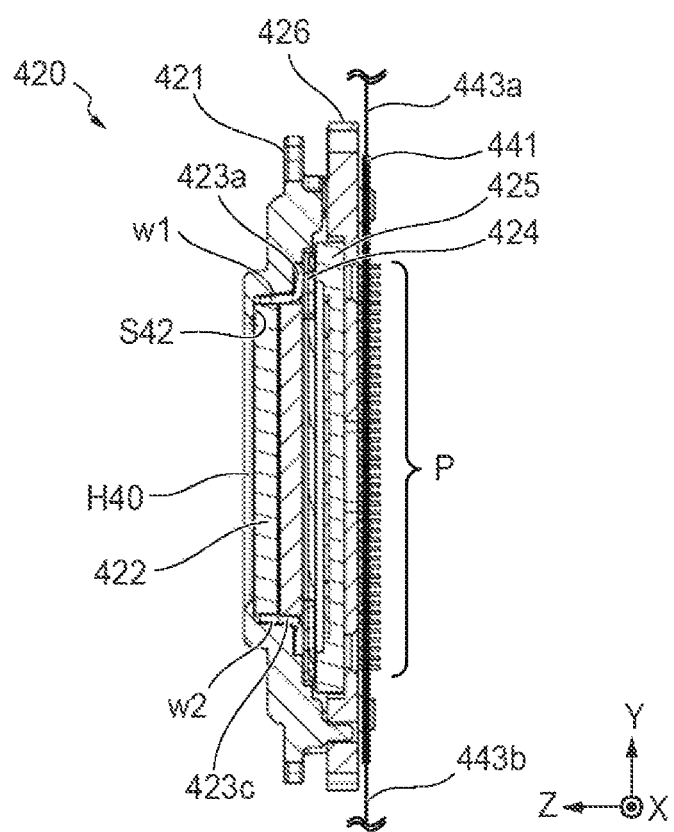
FIG. 21 is a sectional view taken along a line L-L in FIG. 19.

FIG. 21 is a sectional view taken along a line L-L show in FIG. 19. It should be noted that the auxiliary rigid parts 442*a* and 442*b* are not shown in FIG. 21. The holding member 421 has an abutting surface S42 that is a contact surface to the front surface of the optical element 422 so as to intersect with the optical axis (Z-direction) approximately perpendicularly. Moreover, side walls w1 and w2 extended from the abutting surface S42 toward the back side (−Z-direction) are provided in the upper and lower sides (±Y-directions) of the opening H40 in the holding member 421. It should be noted that side walls extended from the abutting surface S42 toward the approximately back side are provided in the right and left positions (±X-directions) of the opening H40.

Elastic members 423*a* and 423*c* are bent so that sectional shapes will become approximately L shapes and are pasted to the holding member 421 so as to cover the side walls w1 and w2. Elastic members 423*b* and 423*d* (see FIG. 20A and FIG. 20B) are pasted to the holding member 421 so as to cover the right and left side walls. In this way, the optical element 422 is held by the holding member 421 in a state where its front surface abuts to the abutting surface S42 and its four sides that intersect perpendicularly with the abutting surface S42 are surrounded by the elastic members 423*a* through 423*d*.

A dustproof sheet 424 is arranged between the holding member 421 and the image sensor 425 so as to prevent occurrence of a gap. The dustproof sheet 424 has an approximately rectangular opening that guides the incident light in its center portion. It should be noted that the dustproof sheet 424 is arranged so as to overlap with the holding member at least partially 421, the optical element 422, and the image sensor 425 on the optical-axis projection plane. Moreover, as mentioned above, the holding member 421 is integrated (assembled) as the image pickup module 420 by being fixed to the sensor plate 426 with the four holding-member fixing screws 428. Accordingly, the optical element 422 is energized in the +Z-direction with the dustproof sheet 424 in the image pickup module 420 and is held by being pressed by the abutting surface S42. From this, the image sensor 425 is sealed with the holding member 421, the optical element 422, the dustproof sheet 424, and the sensor plate 426. Accordingly, infiltration of water and dust into the image sensor 425 from the outside of the image pickup module 420 is prevented.

In the image pickup module 420, since the image sensor 425 is in a sealed state, adhesion of dust to the image sensor 425 is prevented even during the flange back adjustment. Moreover, the optical element 422 is held in a state where it is energized to the abutting surface S42 as a whole in the forward direction (+Z-direction) by the dustproof sheet 424 and its sides are surrounded by the elastic members 423*a* through 423*d*. Accordingly, even if a strong impact is applied to the image pickup apparatus 1000 when it is dropped or hit erroneously, breakage of the optical element 422 is prevented because the dustproof sheet 424 and the elastic members 423*a* through 423*d* function as dampers that absorb an impact.

In order to obtain a static image or a moving image of desired image quality with the image pickup apparatus 1000, it is important to adjust the distance (i.e., a flange back) between the body-side mount surface 321 and the image sensor 425 in the optical axis direction in accordance with the lens used. Accordingly, next, the flange back adjustment method will be described.

Figure 22:
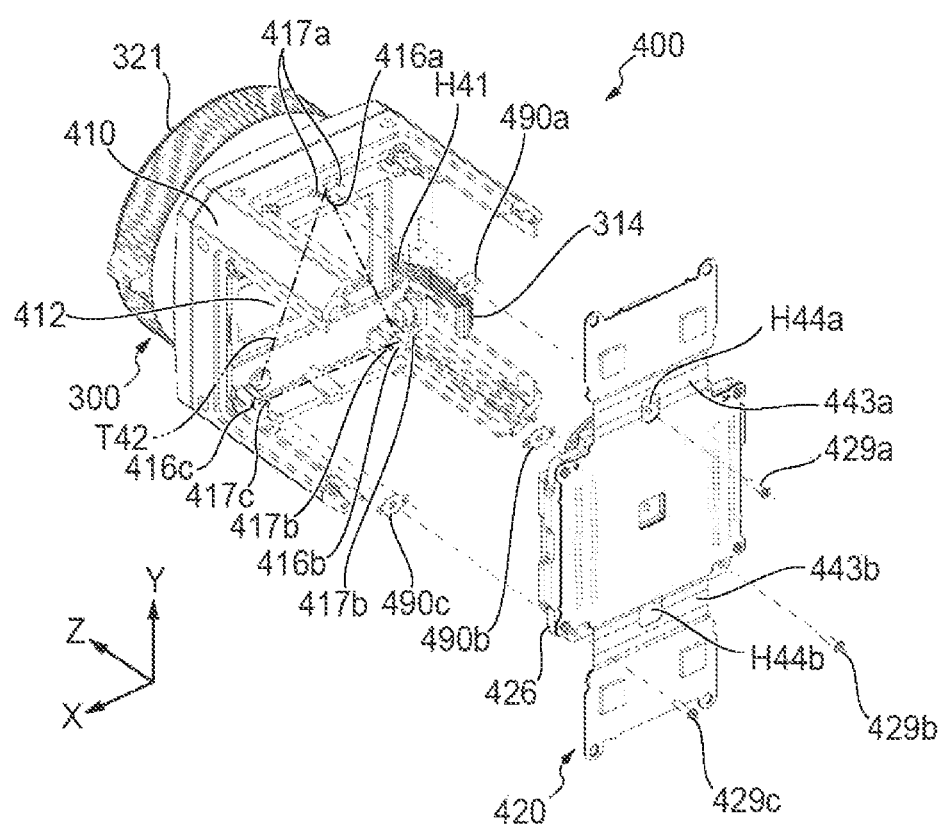
FIG. 22 is an exploded perspective view showing the front module in a state where the first mount module is attached.

FIG. 22 is a back-side exploded perspective view showing the state where the front module 400 is equipped with the first mount module 300. In the front case 410, washer contact surfaces 416*a*, 416*b*, and 416*c* that are parallel to the body-side mount surface 321 are provided in three places including an upper part, a lower right part, and a lower left part of the outer side of the opening 412, respectively. Pairs of washer positioning bosses 417*a*, 417*b*, and 417*c* are respectively provided in the washer contact surfaces 416*a*, 416*b*, and 416*c*. During the flange back adjustment, the washers 490*a* through 490*c* of a predetermined number are inserted between each of the washer contact surfaces 416*a* through 416*c* and the sensor plate 426. Although each of the washers 490*a* through 490*c* is simplified and is shown as a single washer in FIG. 22, several washers of which thicknesses differ are used if needed during the actual flange back adjustment.

Figure 23A:
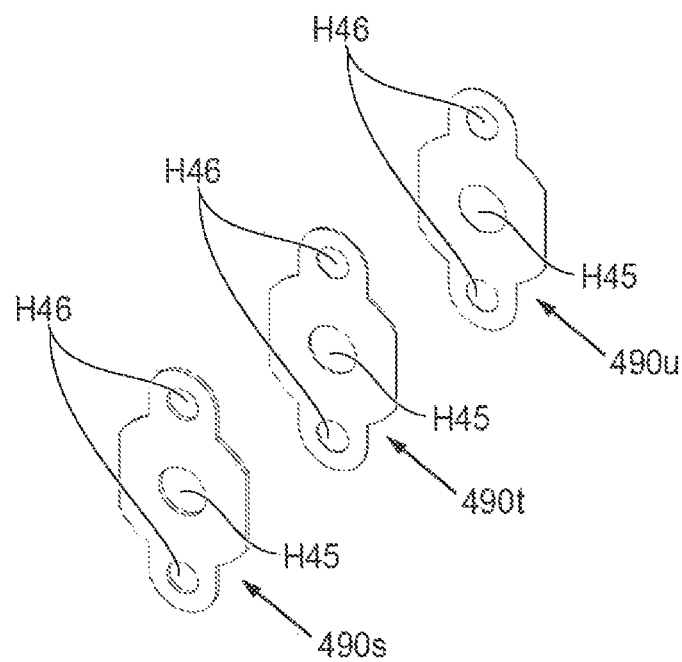
FIG. 23A and FIG. 23B are a perspective view and a side view showing washers that are used in the front module.
Figure 23B:
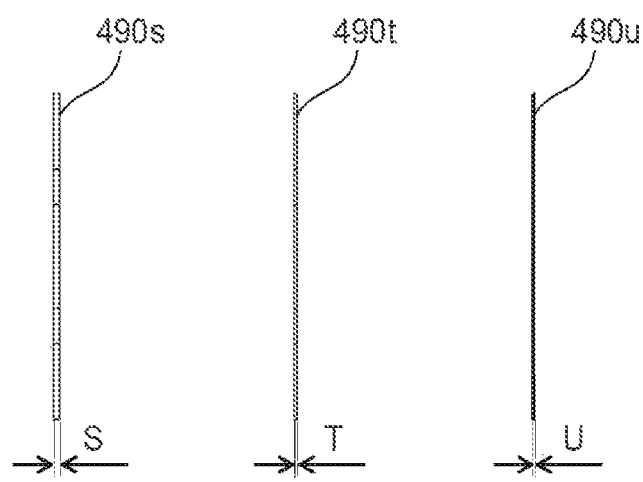

FIG. 23A is a perspective view showing washers 490*s*, 490*t*, and 490*u* of which thicknesses differ. FIG. 23B is a side view showing the washers 490*s* through 490*u*. The washers 490*s* through 490*u* differ only in thickness (thicknesses S, T, U). Then, a pair of positioning openings H46 that are shaped corresponding to the washer positioning bosses 417*a*, 417*b*, and 417*c* are formed in each of the washers 490*s* through 490*u*. Moreover, each of the washers 490*s* through 490*u* has a screw insertion hole H45 formed between the pair of positioning openings H46. It should be noted that washers of which thicknesses differ are not restricted to three kinds of the washers 490*s* through 490*u*. They may be two kinds, four kinds, or more.

The washers 490*a* through 490*c* are positioned to the front case 410 by inserting the washer positioning bosses 417*a* through 417*c* through the positioning openings H46. Then, the sensor plate 426 is positioned to the front case 410 from the back side (−Z side) and is fastened with the sensor-plate fixing screws 429*a* through 429*c*. At this time, the sensor-plate fixing screws 429*a* through 429*c* are inserted through the screw insertion holes H45 of the washers 490*a* through 490*c*. In this way, the washers 490*a* through 490*c* are respectively inserted between the washer contact surfaces 416*a* through 416*c* of the front case 410 and the sensor plate 426. During the flange back adjustment, the flange back is finely adjusted by selecting the thicknesses and the numbers of the washers 490*a* through 490*c* on the basis of size variation of each component leading to flange back deviation.

In this embodiment, as shown in FIG. 22, the washer contact surfaces 416*a* through 416*c* are provided in vertices of a triangle T42 (shown by an alternate long and two short dashes line) that overlaps with the opening 412 and the image sensor 425 in a wide region on the optical-axis projection plane. Thereby, the tilt of the image pickup surface of the image sensor 425 to the body-side mount surface 321 can be also adjusted by adjusting the flange back according to the above-mentioned method.

The tilt adjustment aims the state where the image pickup surface perpendicularly intersects the optical axis. In order to improve a resolution of the tilt adjustment of the image pickup surface by changing the thicknesses and the numbers of the washers 490*a* through 490*c*, the washer contact surfaces 416*a* through 416*c* are preferably provided in the positions where the triangle T42 becomes as large as possible. This enables highly accurate tilt adjustment. In this image pickup apparatus, the flexible part 443*a* has the opening H44*a* at the position that overlaps with the washer contact surface 416*a* on the optical-axis projection plane, and the sensor-plate fixing screw 429*a* is inserted through the opening H44*a*. Thereby, a triangle identical to the triangle T42 is formed also in the positional relationship of the sensor-plate fixing screws 429*a* through 429*c*, which achieves a configuration in which components are arranged efficiently.

It should be noted that the image sensor 425 is one of the heat generating elements which generate heat by operation. The image sensor 425 is adhered on the sensor plate 426, and the holding member 421 is fastened to the sensor plate 426 with the screws. Then, the sensor plate 426 is fastened to the front case 410 that forms the exterior of the image pickup apparatus 1000 as mentioned above. Accordingly, heat generated by the image sensor 425 is diffused to the holding member 421 and is transferred to the front case 410 through the sensor plate 426. Finally, the heat is radiated to outside air. In this way, the heat generated by the image sensor 425 is efficiently diffused to the front case 410 and is radiated to outside air. From a viewpoint of obtaining a high heat dissipation performance, it is preferable to use material that has a high heat conductivity, such as an aluminum alloy, for the holding member 421 and the sensor plate 426.

Figure 24:
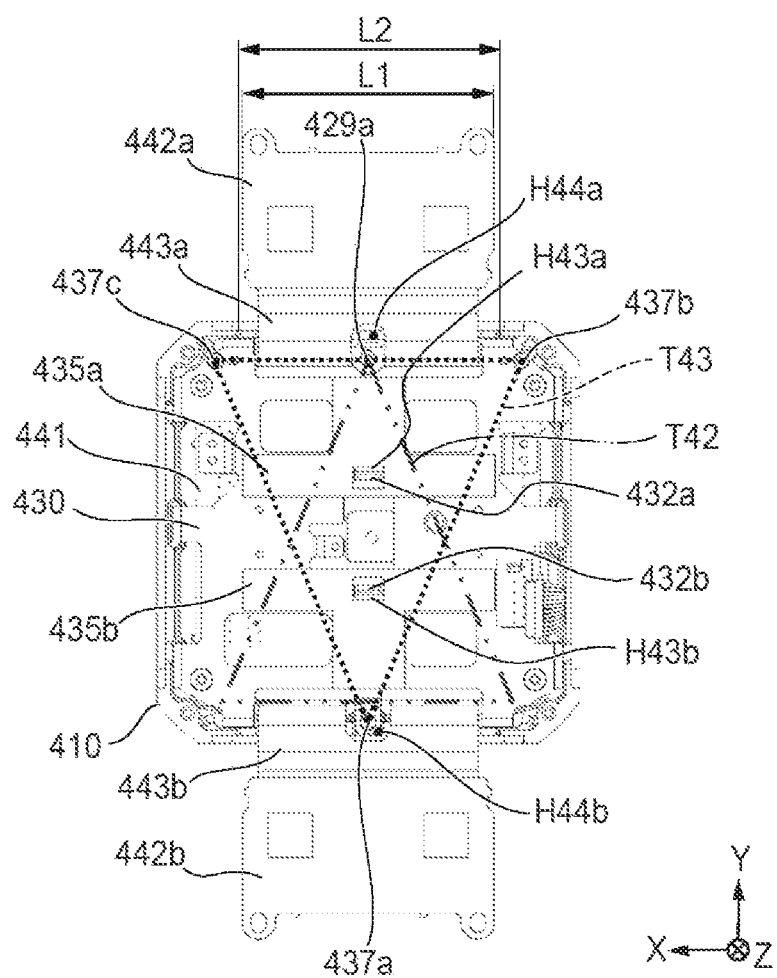
FIG. 24 is a back view showing a state where the image pickup module is attached to the front case.

Next, an electric connection method between the sensor substrate 440 and the main substrate 450 will be described. FIG. 24 is a back view showing the state where the image pickup module 420 is attached to the front case 410.

After the flange back adjustment, the substrate holder 430 is fastened to the front case 410 with the substrate holder fixing screws 437*a* through 437*c*. The substrate holder fixing screw 437*a* is arranged at the position that overlaps with the flexible part 443*b* on the optical-axis projection plane, is inserted through the opening H44*b* provided in the flexible part 443*b* and is screwed to the front case 410. Then, the substrate holder fixing screws 437*a* through 437*c* are arranged so that a triangle T43 (shown by a broken line) formed by connecting these setting places with line segments will become approximately symmetrical to the above-mentioned triangle T42 (shown by the alternate long and two short dashes line) in the Y-direction. In this way, the screw fastening parts are efficiently arranged to the front case 410 by arranging the sensor-plate fixing screws 429*a* through 429*c* and the substrate holder fixing screws 437*a* through 437*c* so as to form the two triangles T42 and T43. As a result, the miniaturization of the image pickup apparatus 1000 is achievable.

Figure 25B:
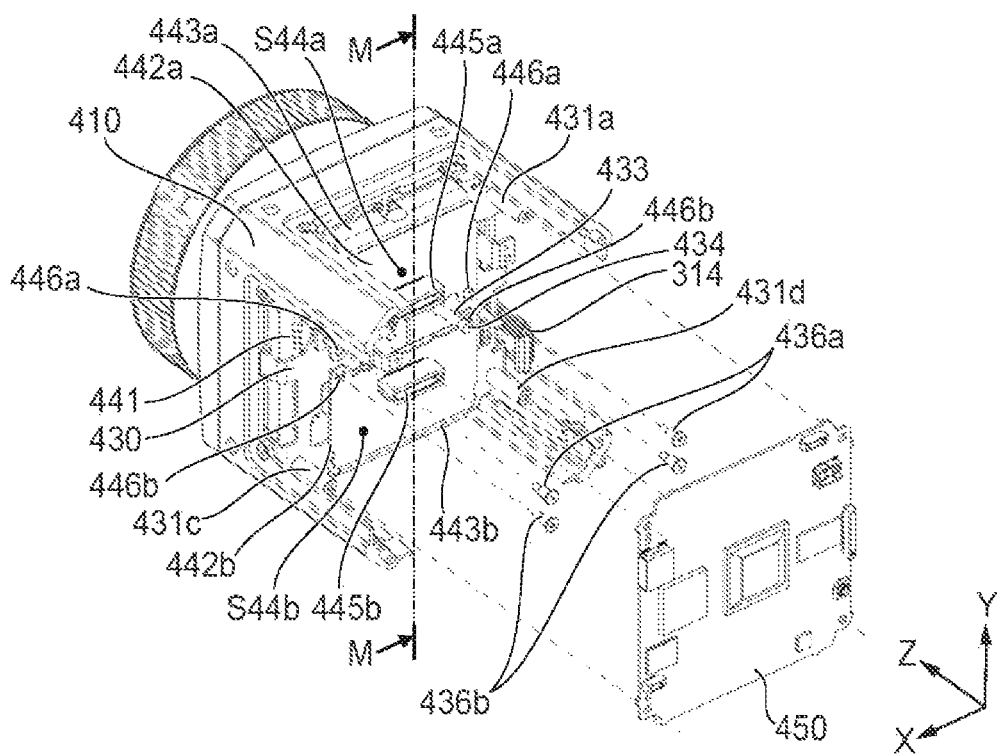

FIG. 25A and FIG. 25B are back-side perspective views showing the state where the image pickup module 420 is attached to the front case 410. In more detail, FIG. 25A shows a state before bending the flexible parts 443*a* and 443*b*, and FIG. 25B shows a state after bending the flexible parts 443*a* and 443*b*. The main substrate 450 electrically connected to the sensor substrate 440 is also shown in FIG. 25B. An image processing chip that processes the digital image data output from the image sensor 425, a CPU that controls the entire camera, and a memory device like a DRAM used when the image processing chip and the CPU perform processes are mounted on the main substrate 450.

As mentioned above, the sensor substrate 440 is a rigid flexible substrate and is available to arrange the auxiliary rigid parts 442*a* and 442*b* behind the main rigid part 441 (−Z side) by folding back the flexible parts 443*a* and 443*b* by 180 degrees, respectively. The elastic members 435*a* and 435*b* of the same shape are attached to the back surface of the substrate holder 430 with double-stick tape (not shown). Openings H43*a* and H43*b* are respectively provided near the central parts of the elastic members 435a and 435b. Then, the elastic members 435a and 435b are pasted on the substrate holder 430 so that cut-and-raised parts 432a and 432b provided in two upper and lower sides near the center of the substrate holder 430 will be respectively inserted through the openings H43a and H43b.

A first pillar 433 provided with an elastic member 434 at its front end is provided in the central part of the substrate holder 430 by caulking so as to extend toward the back side (in the −Z-direction). During the flange back adjustment and immediately after that, the sensor substrate 440 is developed using the main rigid part 441 as a reference plane, and the auxiliary rigid parts 442a and 442b and the flexible parts 443a and 443b are partially protruded up and down from the contour of the image pickup apparatus 1000. As shown in FIG. 24, a maximum width L1 of the flexible part 443a and the auxiliary rigid part 442a is shorter than a width L2 of the opening 412 (not shown in FIG. 24) provided in the front case 410. Similarly, a maximum width of the flexible part 443b and the auxiliary rigid part 442b is shorter than a width of the opening 412.

The auxiliary rigid parts 442a and 442b are respectively arranged at the back side (−Z side) of the main rigid part 441 as shown in FIG. 25B by bending the flexible parts 443a and 443b by about 180 degrees in the direction of arrows shown in FIG. 25A. In this state, a pair of stepped screws 436a and 436b are respectively inserted through the stepped-screw insertion holes 446a and 446b respectively provided in the auxiliary rigid parts 442a and 442b from the back side (−Z side) and are screwed to the substrate holder 430.

Each of the pair of stepped-screw insertion holes 446a and 446b is an oblong hole of which a longitudinal direction matches the up-down direction (Y-direction) and has predetermined clearances to an underhead section diameter of the stepped screws 436a and 436b in both of the up-down direction (Y-direction) and the right-left direction (X-direction). Accordingly, the auxiliary rigid parts 442a and 442b are held in a state (floating state) where they are regulated in movements to the substrate holder 430 and are not fixed completely.

In the state where the flexible parts 443a and 443b are bent and the auxiliary rigid parts 442a and 442b are located at the back side of the main rigid part 441, the first B-to-B connectors 445a and 445b implemented in the auxiliary rigid parts 442a and 442b face to the back side of the image pickup apparatus 1000. Moreover, connector implementing surfaces S44a and S44b in which the first B-to-B connectors 445a and 445b are respectively implemented are arranged on the approximately same plane that intersects perpendicularly with the Z-direction.

In the meantime, the second B-to-B connectors 455a and 455b are provided in the same surface at the front side (+Z side) of the main substrate 450 (see FIG. 19). Accordingly, since the two first B-to-B connectors implemented in the sensor substrate 440 and the two second B-to-B connectors implemented in the main substrates 450 face mutually in the Z-direction, the two sets of B-to-B connectors are easily connected in the Z-direction. Specifically, the electric connection of the main substrate 450 and the sensor substrate 440 is achieved by connecting the second B-to-B connectors 455a and 455b to the first B-to-B connectors 445a and 445b, respectively.

The four B-to-B connectors are arranged so that the left-and-right direction (X-direction) of the image pickup apparatus 1000 will become the longitudinal direction. In this case, in order to absorb phase difference due to the implementations of the B-to-B connectors and to connect simultaneously the two sets of B-to-B connectors, the movable amount of the auxiliary rigid parts 442a and 442b in the up-down direction is needed to be larger than that in the right-left direction. Accordingly, in this embodiment, the pair of stepped-screw insertion holes 446a and 446b are formed as the oblong holes of which the longitudinal direction matches the up-down direction (Y-direction) as mentioned above. This enables simultaneous connection easily by absorbing implementation deviation of each of the B-to-B connectors without causing large twists of the auxiliary rigid parts 442a and 442b and the flexible parts 443a and 443b.

In this way, the main substrate 450 is provisionally fixed to the auxiliary rigid parts 442a and 442b of the sensor substrate 440 by fitting force that occurs by connecting the two sets of B-to-B connectors. Moreover, the four corners of the main substrate 450 are supported by the substrate support members 431a through 431d that are extended from the substrate holder 430. Furthermore, the main substrate 450 is fastened with the heat sink unit 470 using the main-substrate fixing screws 456a through 456d from the back side (−Z side). As a result, the main substrate 450 is fixed to the substrate holder 430 while keeping the connection of the two sets of B-to-B connectors.

When the main substrate 450 is connected to the sensor substrate 440, the main substrate 450 is arranged so as to be approximately parallel to the rigid parts (the main rigid part 441 and the auxiliary rigid parts 442a and 442b) of the sensor substrate 440. With this, the main substrate 450 is arranged so that the most part will overlap with the rigid parts on the optical-axis projection plane. Since the main substrate 450 and the sensor substrate 440 are arranged in this way, the projected area of the image pickup apparatus 1000 on the optical-axis projection plane becomes small, and the miniaturization of the image pickup apparatus 1000 is attained.

Figure 26A:
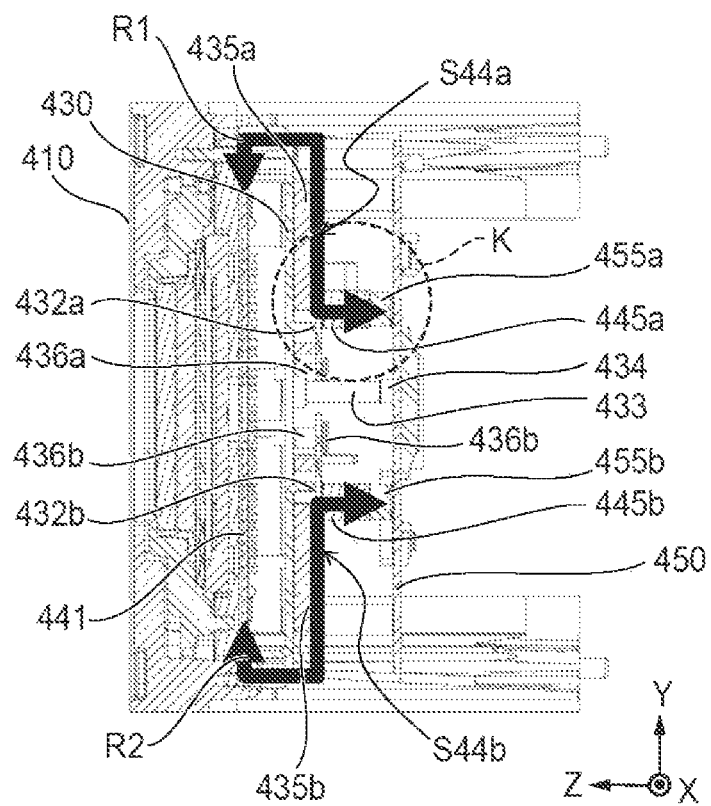
FIG. 26A is a sectional view taken along a line M-M in FIG. 25B

FIG. 26A is a sectional view taken along a line M-M shown in FIG. 25B. Although FIG. 25B shows the state where the main substrate 450 is not connected to the sensor substrate 440, FIG. 26A shows the state after connecting the main substrate 450 to the sensor substrate 440.

Generally, the number of poles that enable signal transmission between rigid part of a rigid flexible substrate depends on a width of a flexible part. The wider the width of the flexible part is, the more the number of poles can be. In this embodiment, the main rigid part 441 is connected to the main substrate 450 through the flexible parts 443a and 443b and the auxiliary rigid parts 442a and 442b. Accordingly, signal are transferred between the main rigid part 441 and the main substrate 450 through two transmission routes R1 and R2 shown by arrows in FIG. 26A. That is, since a wiring from the main rigid part 441 is branched (into two directions, specifically) and the auxiliary rigid parts 442a and 442b are provided, multipolar signals can be transferred without enlarging the sensor substrate 440.

Moreover, the sensor substrate 440 is approximately symmetrical in the up-down direction in the state where the auxiliary rigid parts 442a and 442b are developed to the main rigid part 441. Accordingly, signal transmission routes that connect the main rigid part 441 and the respective auxiliary rigid parts 442a and 442b can be designed as equal-length wiring structures. This enables reduction of timing deviation between a signal transmitted to the main substrate 450 from the main rigid part 441 through the auxiliary rigid part 442a and a signal transmitted to the main substrate 450 from the main rigid part 441 through the auxiliary rigid part 442b.

Figure 26B:
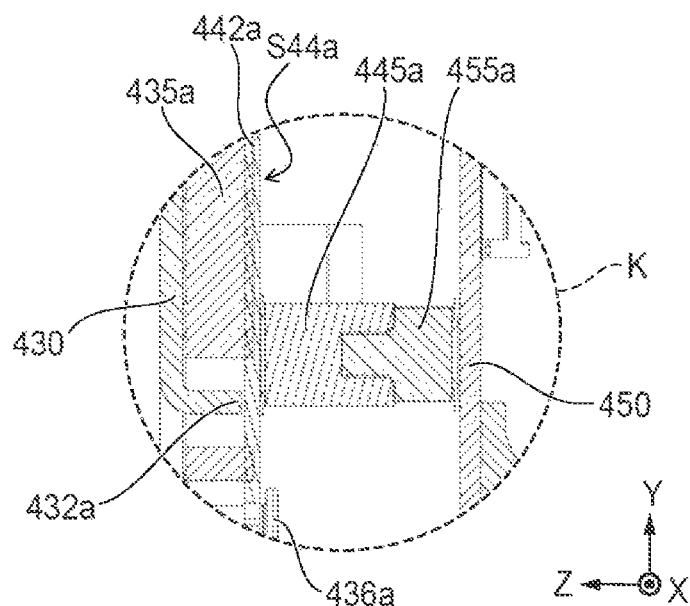
FIG. 26B is a partial enlargement view showing a section K in FIG. 26A.

FIG. 26B is an enlarged view showing a section K shown in FIG. 26A. The substrate holder 430 has the cut-and-raised part 432a extended in the −Z-direction on the front side (+Z side) of the first B-to-B connector 445a. The cut-and-raised part 432a plays the role that supports the auxiliary rigid part 442a from the +Z side when the fitting force in the +Z-direction is applied to the auxiliary rigid part 442a from the main substrate 450 at the time of fitting (connection) of the first B-to-B connector 445a and the second B-to-B connector 455a.

Moreover, the elastic member 435a is arranged between the substrate holder 430 and the auxiliary rigid part 442a. The elastic member 435a is held in a compressed state in the Z-direction because the auxiliary rigid part 442a is pressed in the +Z-direction by the main substrate 450 through the first and second B-to-B connectors 445a and 455a. Thereby, the auxiliary rigid part 442a is held by the substrate holder 430 through the elastic member 435a in the state where the first and second B-to-B connectors 445a and 455a are connected. Thereby, even if vibration or impact is applied to the image pickup apparatus 1000 from the outside, occurrence of a faulty connection between the first and second B-to-B connectors 445a and 455a can be reduced.

Although only the configuration near the first and second B-to-B connectors 445a and 455a is shown in FIG. 26B, the configuration near the first and second B-to-B connectors 445b and 455b is the same as that. Moreover, as shown in FIG. 26A, the first pillar 433 provided with the elastic member 434 at its front end is provided between the auxiliary rigid parts 442a and 442b. The elastic member 434 is compressed in the Z direction between the main substrate 450 and the first pillar 433 in the state where the sensor substrate 440 is connected to the main substrate 450. Accordingly, even if vibration or impact is applied to the image pickup apparatus 1000 from the outside, twist in the central portion of the main substrate 450 hardly occurs by the compressed elastic member 434. As a result, breakage of the main substrate 450 can be reduced.

Figure 27A:
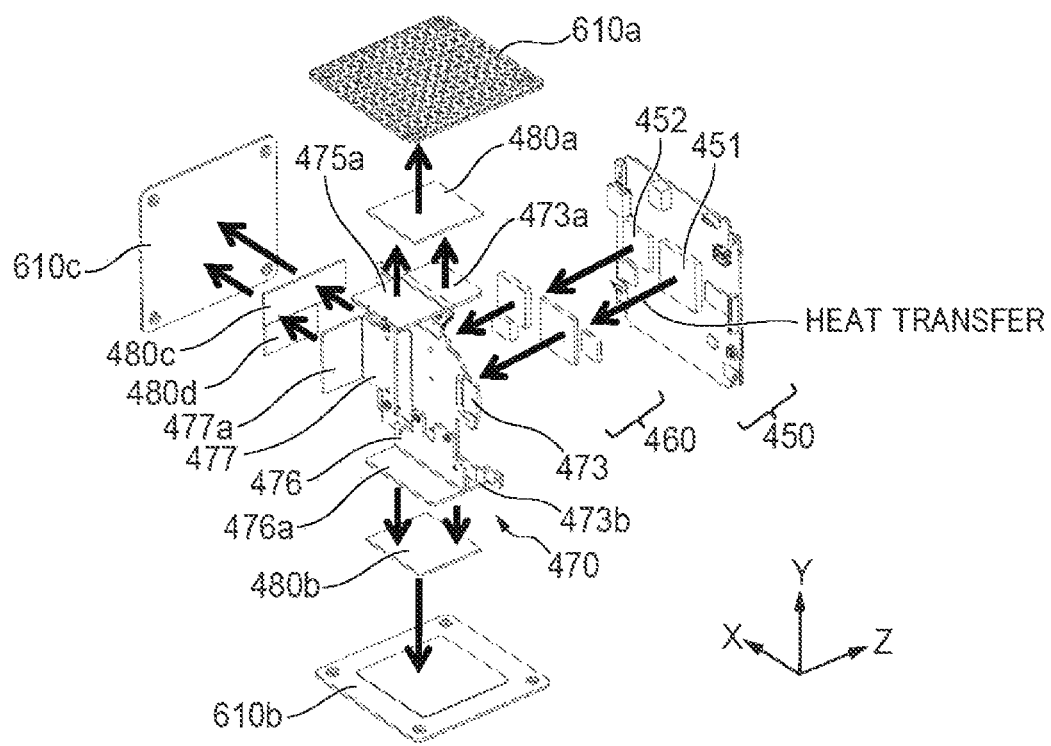
FIG. 27A and FIG. 27B are exploded perspective views showing a main substrate and neighboring components of the front module.
Figure 27B:
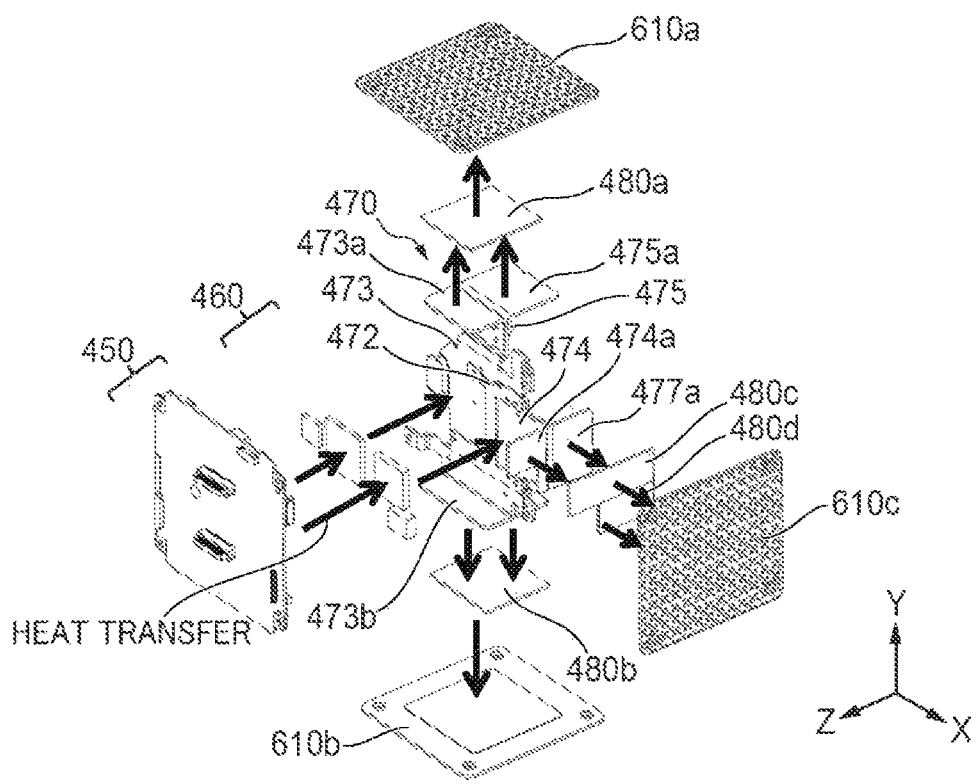

Next, the heat dissipation structure of the main substrate 450 will be described. FIG. 27A and FIG. 27B are a back-side exploded perspective view and a front-side exploded perspective view showing components near the main substrate 450. A heat dissipation system of the image pickup apparatus 1000 is constituted by the main substrate 450, heat dissipation rubbers 460, the heat sink unit 470, heat dissipation rubbers 480a, 480b, 480c, and 480d, and the side panels 610a through 610c. The heat dissipation rubbers 460 are arranged on the main heat generating elements implemented in the main substrate 450. Surface size and height of each of the heat dissipation rubbers are determined in accordance with a corresponding heat generating element. The heat dissipation rubbers 460 are compressed by the heat sink unit 470 and transmit the heat generated by the main heat generating elements to the heat sink unit 470.

Figure 28:
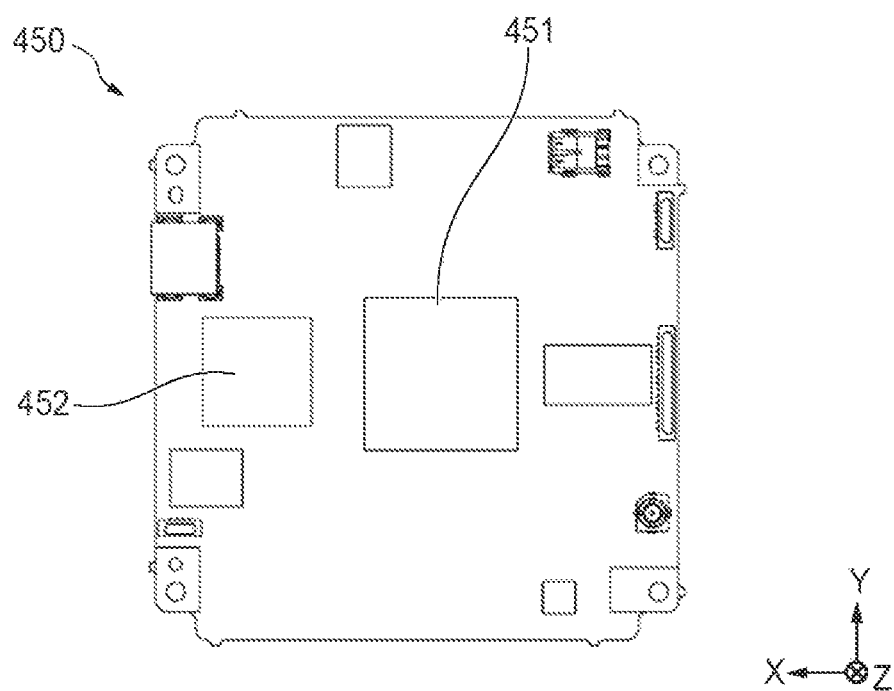
FIG. 28 is a back view showing the main substrate.
Figure 29A:
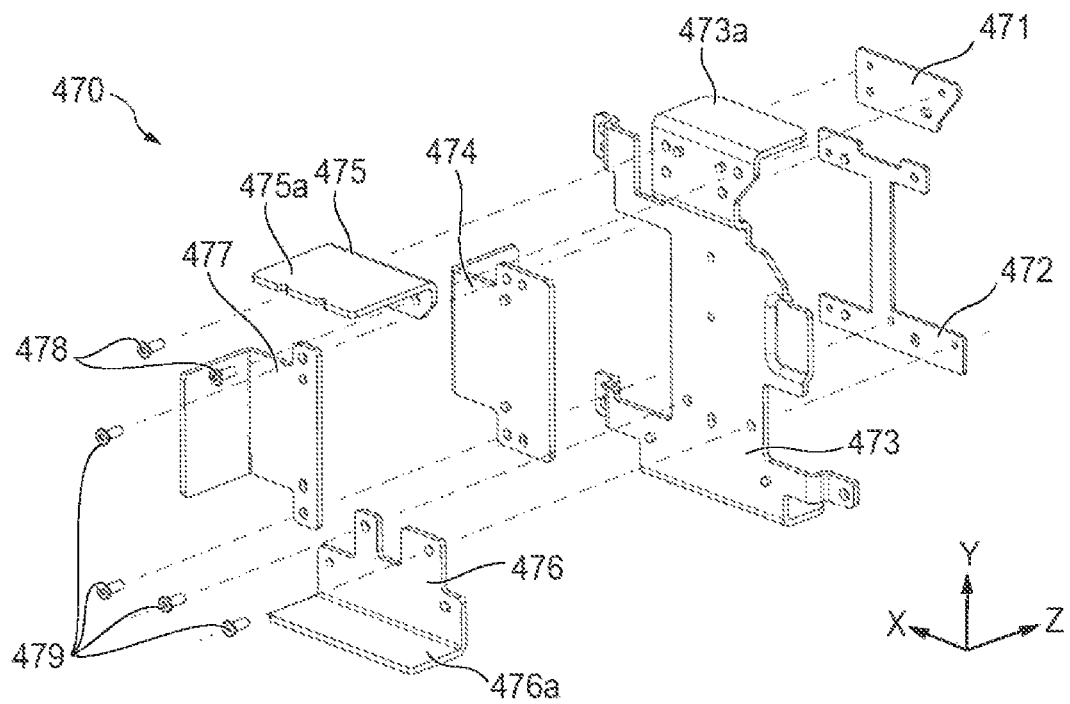
FIG. 29A and FIG. 29B are exploded perspective views showing a heat sink unit of the front module.
Figure 29B:
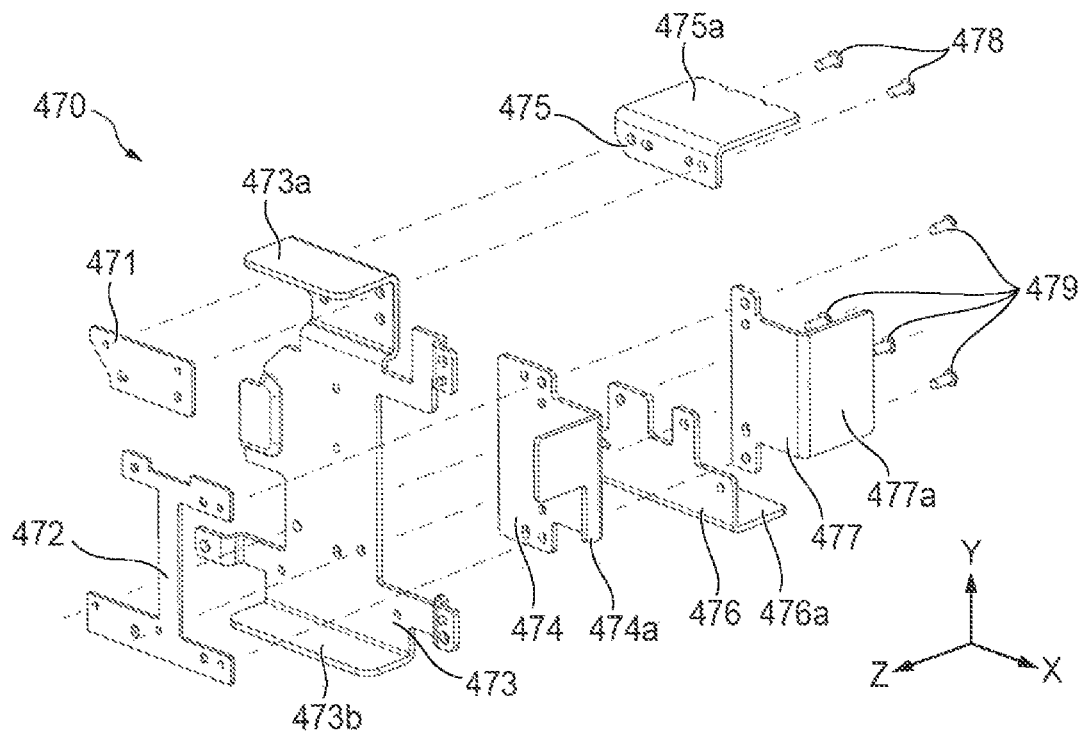
Figure 30:
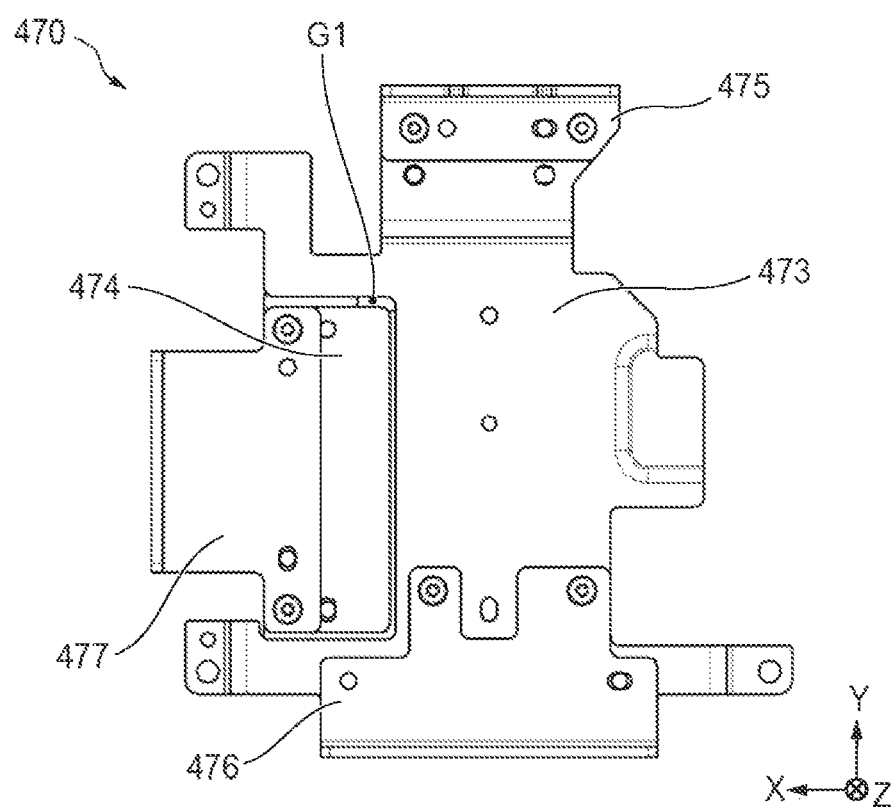
FIG. 30 is a back view showing the heat sink unit.

FIG. 28 is a back view showing the main substrate 450. Although the plurality of heat generating elements are implemented in the main substrate 450, the heat dissipation from a first heat generating element 451 and a second heat generating element 452 shown in FIG. 28 will be described. For example, the first heat generating element 451 is an image processing chip, and the second heat generating element is a memory device like a DRAM. FIG. 29A and FIG. 29B are a back-side exploded perspective view and a front-side exploded perspective view showing the heat sink unit 470. FIG. 30 is a back view showing the heat sink unit.

The heat sink unit 470 is provided with a support member 471, a heat insulator 472, a first main heat-sink metal plate 473, a second main heat-sink metal plate 474, a first auxiliary heat-sink metal plate 475, a second auxiliary heat-sink metal plate 476, and a third auxiliary heat-sink metal plate 477. The heat insulator 472 is made from resin or metal of which heat conductivity is small, such as stainless steel, for example. The first main heat-sink metal plate 473, second main heat-sink metal plate 474, first auxiliary heat-sink metal plate 475, second auxiliary heat-sink metal plate 476, and third auxiliary heat-sink metal plate 477 are made from metal of which heat conductivity is large, such as copper or aluminum alloy, for example.

The first main heat-sink metal plate 473 has a bending part 473a in the upper side and has a bending part 473b in the lower side. Both the bending parts 473a and 473b are parallel to an XZ plane and are prolonged in the +Z-direction. The second main heat-sink metal plate 474 has a bending part 474a in the right side. The bending part 474a is parallel to a YZ plane and is prolonged in the +Z-direction. The first auxiliary heat-sink metal plate 475 has a bending part 475a in the upper side. The bending part 475a is parallel to the XZ plane and is prolonged in the −Z-direction. The second auxiliary heat-sink metal plate 476 has a bending part 476a in the lower side. The bending part 476a is parallel to the XZ plane. The third auxiliary heat-sink metal plate 477 has a bending part 477a in the right side. The bending part 477a is parallel to the YZ plane.

As shown in FIG. 27A, the bending part 473a of the first main heat-sink metal plate 473 and the bending part 475a of the first auxiliary heat-sink metal plate 475 form the same plane. Moreover, the bending part 473b of the first main heat-sink metal plate 473 and the bending part 476a of the second auxiliary heat-sink metal plate 476 form the same plane. Furthermore, as shown in FIG. 27B, the bending part 474a of the second main heat-sink metal plate 474 and the bending part 477a of the third auxiliary heat-sink metal plate 477 form the same plane. Then, the heat dissipation rubbers 480a through 480d are respectively arranged at the planes formed by these bending parts.

The first main heat-sink metal plate 473 and first auxiliary heat-sink metal plate 475 are fastened to the support member 471 with fixing screws 478. The second main heat-sink metal plate 474, third auxiliary heat-sink metal plate 477, first main heat-sink metal plate 473, and second auxiliary heat-sink metal plate 476 are fastened to the heat insulator 472 with fixing screws 479. The fixing screws 478 and 479 are fastened towards the +Z side from the −Z side and can assemble the metal plates easily.

As shown in FIG. 30, the first main heat-sink metal plate 473 is formed in an approximately U-shaped. The second main heat-sink metal plate 474 is fastened to the heat insulator 472 so as to fit into a concave portion of the U-shaped of the first main heat-sink metal plate 473. The first main heat-sink metal plate 473 and second main heat-sink metal plate 474 are arranged on the same plane in the positions that do not overlap on the optical-axis projection plane. Moreover, the first main heat-sink metal plate 473 and second main heat-sink metal plate 474 are arranged by interposing a gap G1 and are not connected directly (they are not in contact). The heat insulator 472 has a shape that avoids the electronic parts implemented in the main substrate 450 and does not touch the heat dissipation rubbers 460.

A main radiation path of the main substrate 450 is as follows. That is, the heat generated by the heat generating elements implemented in the main substrate 450 is transferred to the heat sink unit 470 through the heat dissipation rubbers 460, is transferred to the side panels 610a through 610c as the exterior members through the heat dissipation rubbers 480a through 480d and is radiated to outside air. At this time, the heat generated by the first heat generating element 451 is transferred to the first main heat-sink metal plate 473, further is transferred to the first auxiliary heat-sink metal plate 475 and second auxiliary heat-sink metal plate 476 and is finally radiated to the outside air through the side panels 610a and 610b. Moreover, the heat generated by the second heat generating element 452 is transferred to the second main heat-sink metal plate 474, is transferred to the third auxiliary heat-sink metal plate 477 connected to the second main heat-sink metal plate 474 and is finally radiated to the outside air through the side panel 610c.

As mentioned above, the gap G1 is given between the first main heat-sink metal plate 473 and the second main heat-sink metal plate 474. Accordingly, heat is hardly transferred from the first main heat-sink metal plate 473 that radiates the heat generated by the first heat generating element 451 to the second main heat-sink metal plate 474 that radiates the heat generated by the second heat generating element 452.

In the description, a heat generation amount Q1 of the first heat generating element 451 shall be larger than a heat generation amount Q2 of the second heat generating element 452, and an operation guarantee temperature T1 of the first heat generating element 451 shall be higher than an operation guarantee temperature T2 of the second heat generating element 452. Even in this case, the heat generated by the first heat generating element 451 does not raise the temperature of the second heat generation element 452 beyond the operation guarantee temperature T2. This reduces occurrence of an operation failure resulting from the temperature rise of the heat generating element in use of the image pickup apparatus 1000.

Figure 31A:
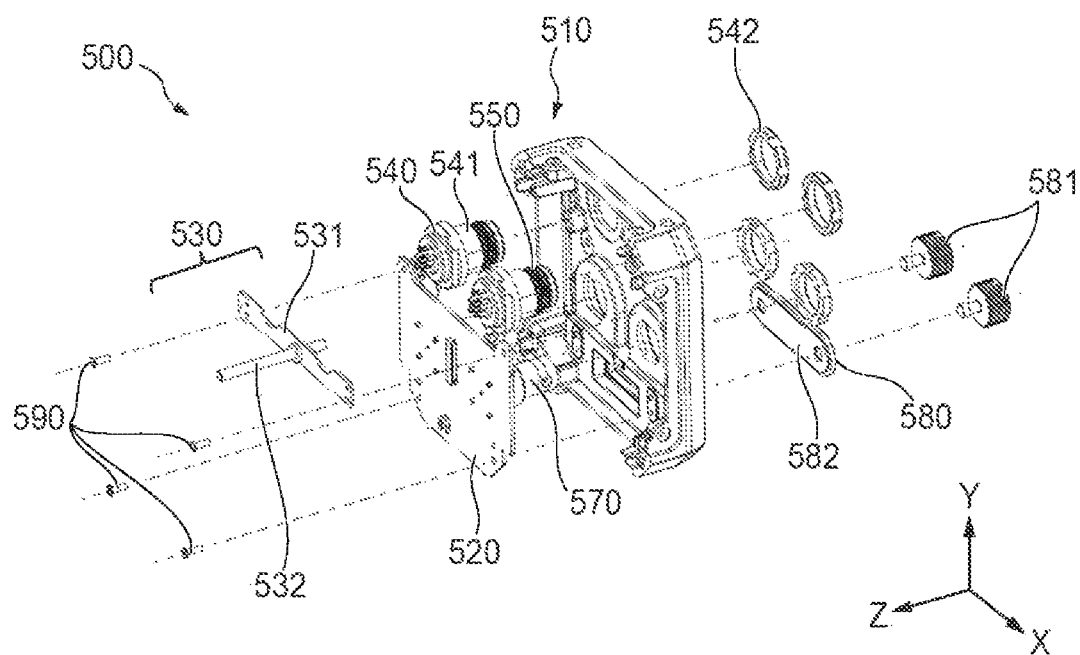
FIG. 31A and FIG. 31B are exploded perspective views showing a rear module that constitutes the image pickup apparatus.
Figure 31B:
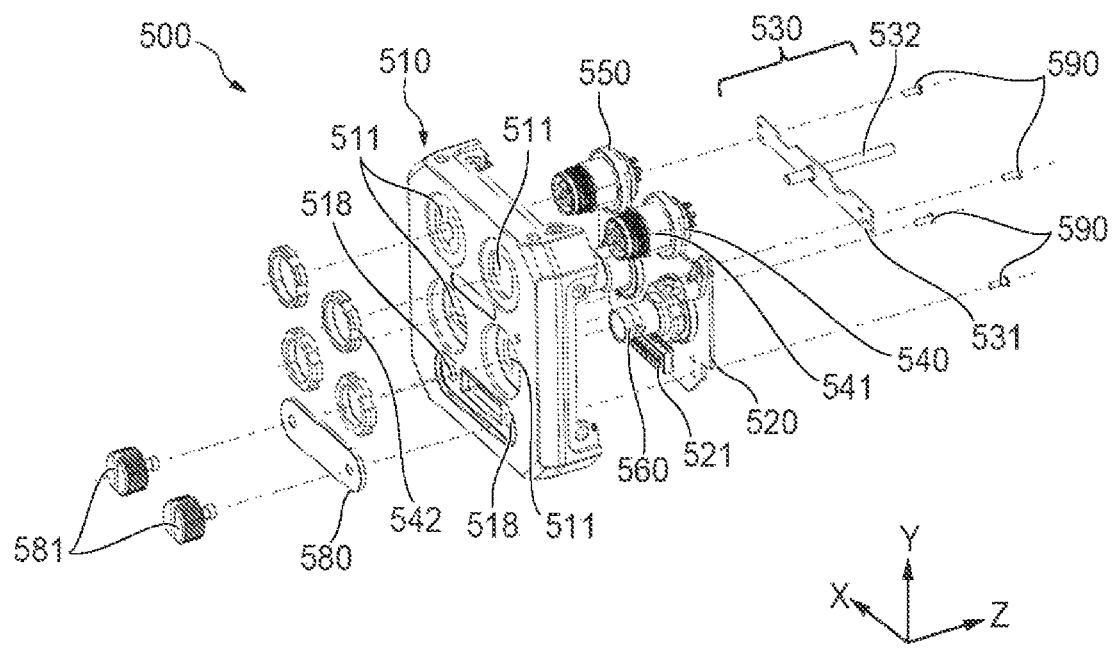

Next, the configuration of the rear module 500 will be described. FIG. 31A and FIG. 31B are a front-side exploded perspective view and a back-side exploded perspective view showing the rear module 500. The rear module 500 is provided with the rear case 510, an interface substrate 520, a pillar unit 530, the first interface connector 540, and the second interface connector 550. Moreover, the rear module 500 is provided with the third interface connector 560, the fourth interface connector 570, a cover 580, and hand screws 581.

Predetermined interface connectors are respectively engaged with holes 511 (four holes, specifically) formed in the rear case 510. The interface substrate 520 is fastened to the rear case 510 together with the pillar unit 530 with fixing screws 590. The pillar unit 530 has a metal plate 531 and a second pillar 532. The second pillar 532 is caulked to the metal plate 531.

The cover 580 is fixed to the rear case 510 by screwing the hand screws 581 to internal threads 518 provided in the rear case 510. Moreover, a sealing member 582 that has waterproofness is attached to the cover 580. The sealing member 582 is pressed to the cover 580 when the cover 580 is fixed to the rear case 510 with the hand screws 581. Since the sealing member 582 prevents occurrence of a gap between the rear case 510 and the cover 580, infiltration of water and dust into the inside of the image pickup apparatus 1000 through the boundary between the rear case 510 and the covers 580 is prevented.

The first interface connector 540 is a connector for supplying electric power to the image pickup apparatus 1000 from an external power source. The second interface connector 550 is a connector for controlling operations of the image pickup apparatus 1000, and a remote controller is connected thereto, for example. The third interface connector 560 is a connector for outputting an image to an external monitor etc. The fourth interface connector 570 is a connector for synchronizing an image pickup timing, a video-signal output timing, etc. with other image pickup apparatuses. The third interface connector 560 and fourth interface connector 570 are soldered to the interface substrate 520.

The first through fourth interface connectors 540 through 570 have the waterproof function and are respectively attached to the holes 511 using O-rings (not shown). For example, a thread 541 is provided in the first interface connector 540. When a nut 542 is screwed to the thread 541, the first interface connector 540 is fixed to the rear case 510. At this time, since the O-ring prevents occurrence of a gap between the rear case 510 and the first interface connector 540 when the O-ring is pressed to the rear case 510, infiltration of water and dust into the inside of the image pickup apparatus 1000 is prevented. The other three interface connectors are fixed to the rear case 510 as with the first interface connector 540.

Figure 32:
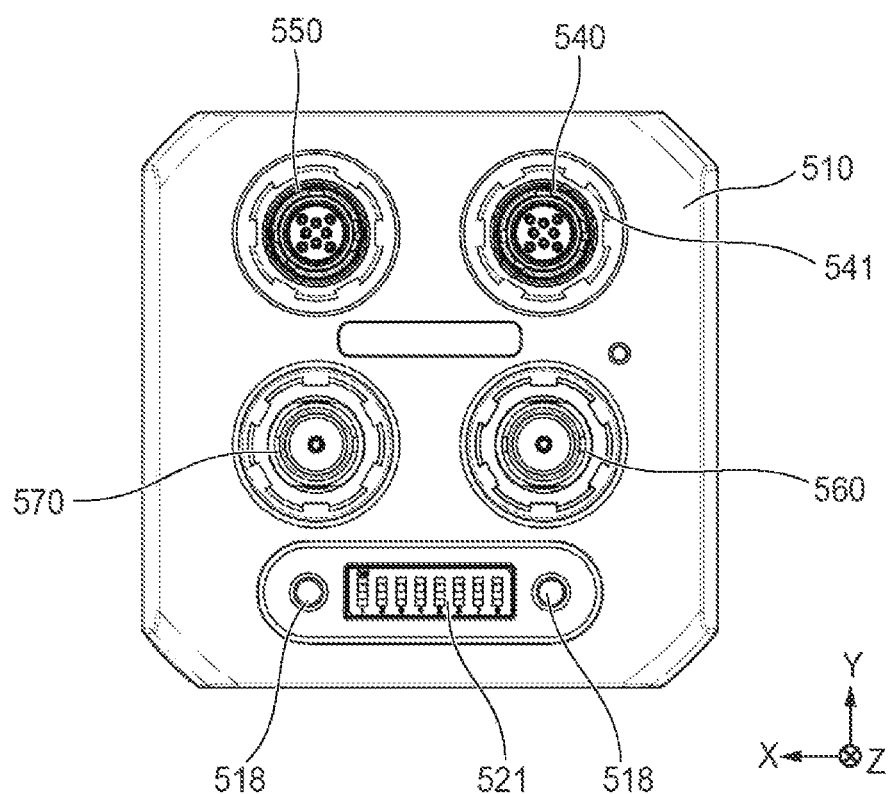
FIG. 32 is a back view of the rear module.

FIG. 32 is a back view showing a state where the cover 580 and the hand screws 581 are detached from the rear module 500. A switch unit 521 is provided in the interface substrate 520. When the cover 580 and the hand screws 581 are detached from the rear case 510, the switch unit 521 is exposed to the external appearance and can be operated. The switch unit 521 is an operating member for changing a frame rate, an output format, etc. about image pickup. However, the usage of the switch unit 521 is not restricted to these.

Next, a shock resistant structure of the image pickup apparatus 1000 (a shock resistant structure of the main substrate 450 contained by the image pickup apparatus 1000, specifically) will be described.

Figure 33A:
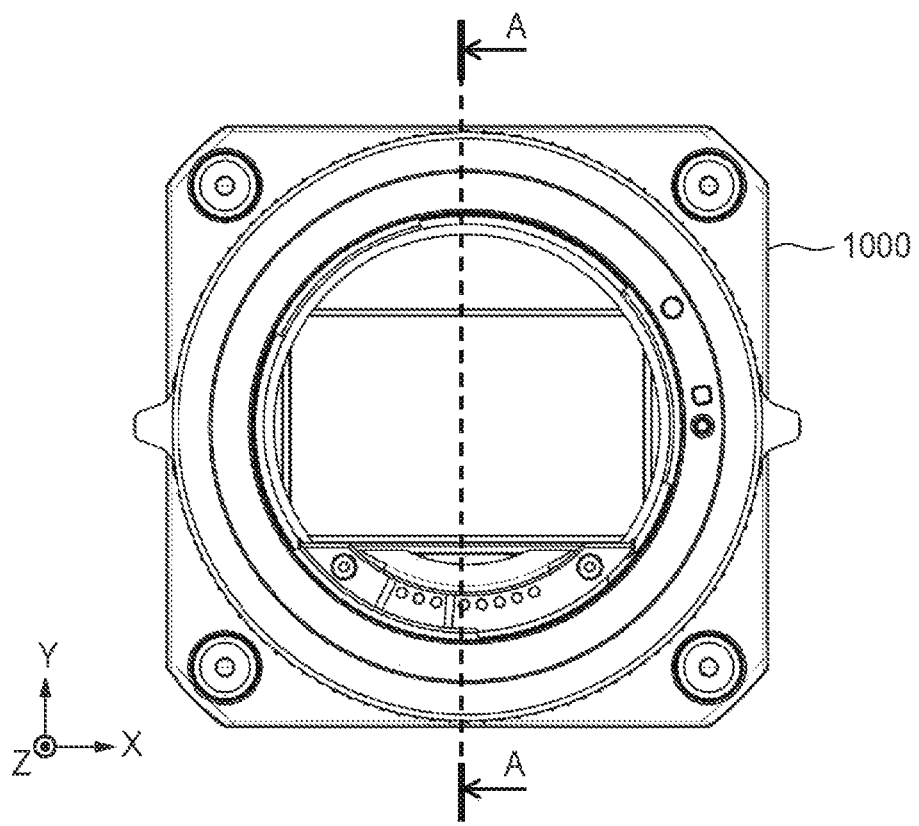
FIG. 33A is a front view showing the image pickup apparatus.
Figure 33B:
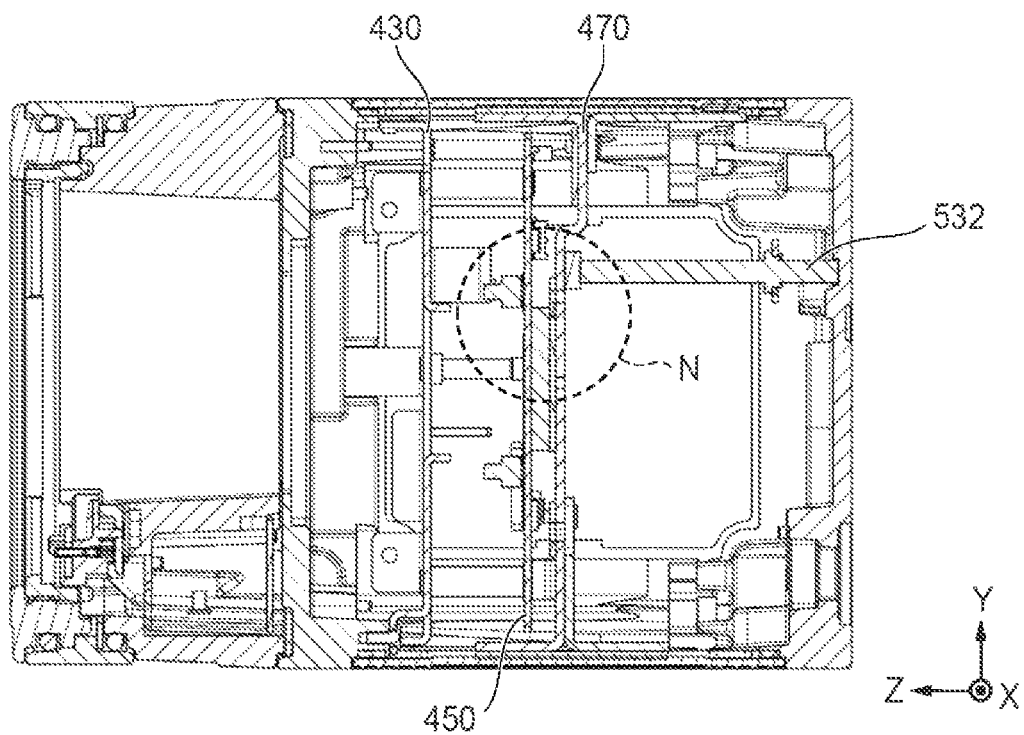
FIG. 33B is a sectional view taken along a line A-A in FIG. 33A.
Figure 34A:
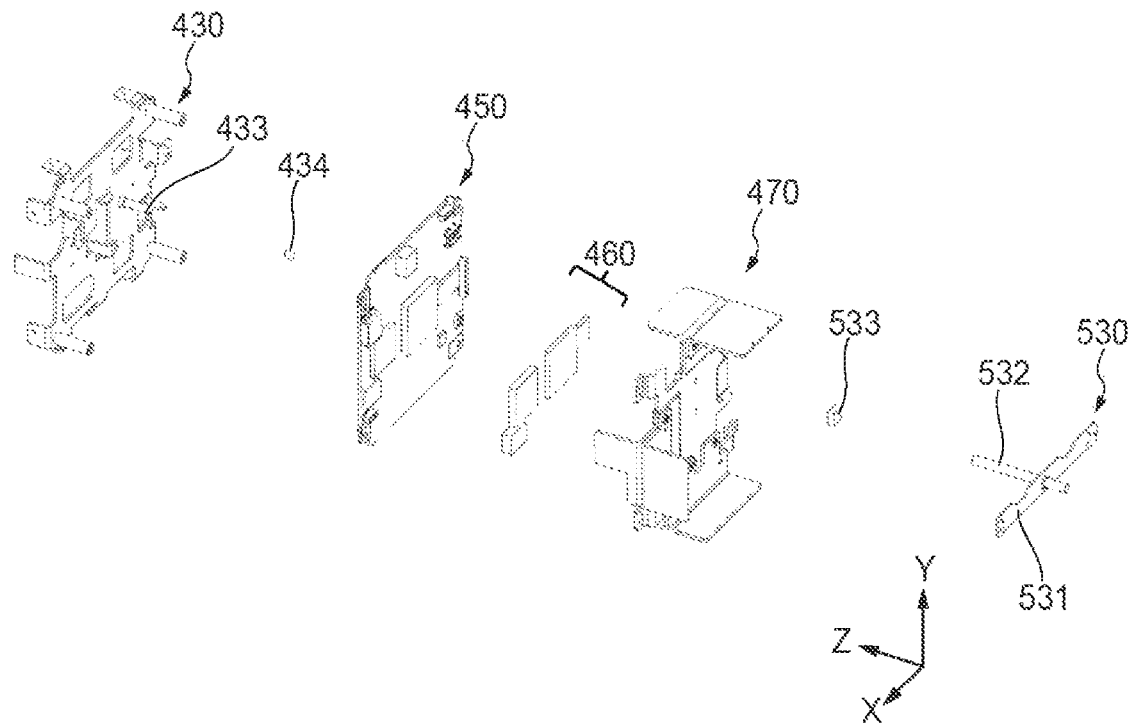
FIG. 34A is an exploded perspective view showing a part group related to a shock resistant structure of the main substrate and FIG. 34B is an enlarged view showing a section N in FIG. 33B.
Figure 34B:
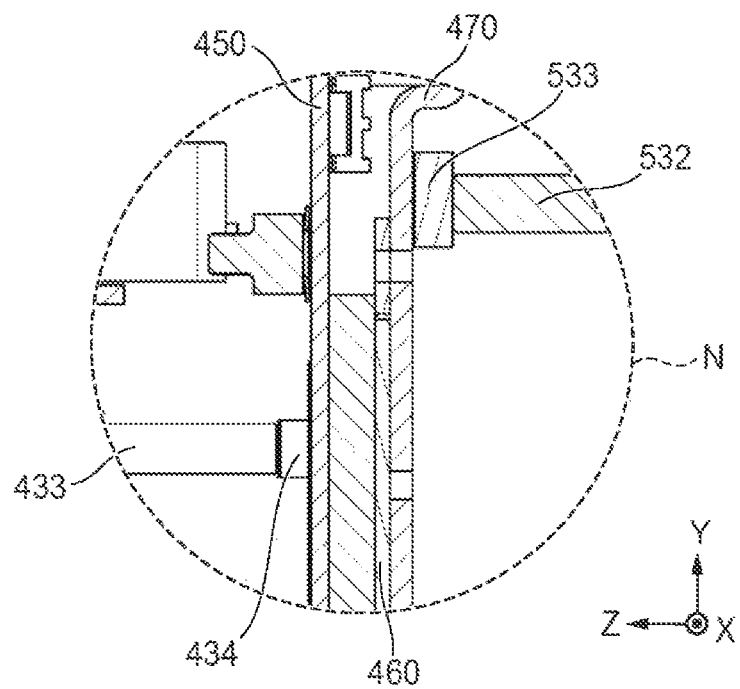

FIG. 33A is a front view showing the image pickup apparatus 1000. FIG. 33B is a sectional view taken along a line A-A in FIG. 33A. It should be noted that the components that do not participate in the shock resistant structure of the main substrate 450 are omitted in FIG. 33B. FIG. 34A is an exploded perspective view showing a component group related to the shock resistant structure of the main substrate 450. FIG. 34B is an enlarged view showing a section N shown in FIG. 33B. Basic components of the shock resistant structure of the main substrate 450 are the substrate holder 430, main substrate 450, heat dissipation rubbers 460, heat sink unit 470, and pillar unit 530.

As mentioned above, the first pillar 433 is provided in the substrate holder 430 of the front module 400, and the second pillar 532 is provided in the pillar unit 530 of the rear module 500. Moreover, the heat dissipation rubbers 460 are clamped between the main substrate 450 and the heat sink unit 470. The first pillar 433 is extended to the main substrate 450 in the −Z-direction and the second pillar 532 is extended to the main substrate 450 in the +Z direction. The first pillar 433 and second pillar 532 are arranged so as interpose the approximately central part of the main substrate 450. The elastic member 434 is provided between the first pillar 433 and the main substrate 450, and an elastic member 533 is provided between the second pillar 532 and the heat sink unit 470. Furthermore, the main substrate 450 is fixed to the substrate support members 431a through 431d of the substrate holder 430 at four corners with screws (see FIG. 19).

Accordingly, the main substrate 450 is energized by the first pillar 433 and elastic member 434 in the −Z-direction and is energized by the second pillar 532, elastic member 533, heat sink unit 470, and heat dissipation rubbers 460 in the +Z-direction. This enables reduction of deformation of the main substrate 450 when the impact in the Z-direction is applied to the image pickup apparatus 1000.

Next, configurations of extension modules will be described. Various kinds of extension modules that are attachable to and detachable from the upper opening H1, lower opening H2, right opening H3, and left opening H4 of the image pickup apparatus 1000 will be described. It should be noted that an extension module means a module that adds a predetermined function to the basic configuration of the image pickup apparatus 1000 depending on a user's usage.

Figure 35A:
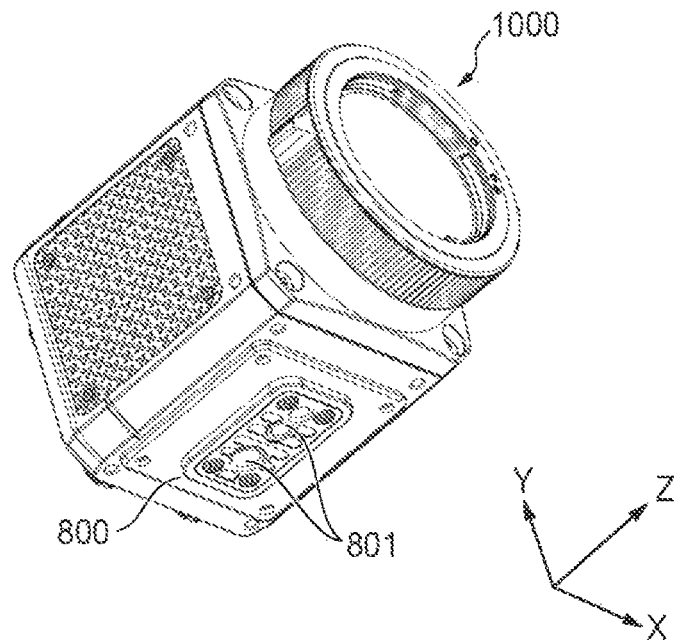
FIG. 35A is a perspective view showing a state where a fixing module is attached to the image pickup apparatus and FIG. 35B is a perspective view describing an attachment method.
Figure 35B:
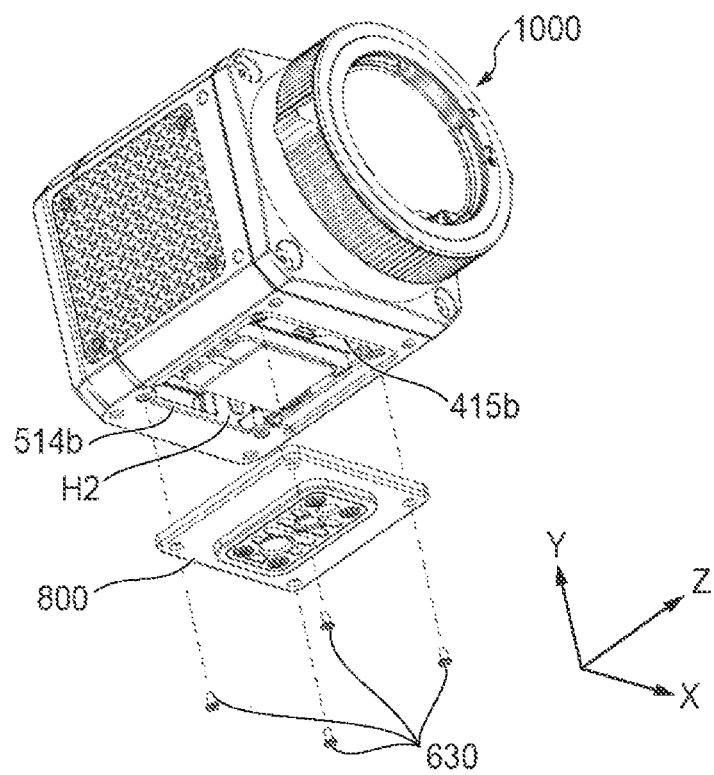

FIG. 35A is a perspective view showing a state where a fixing module 800 is attached to the lower opening H2 of the image pickup apparatus 1000. FIG. 35B is an exploded perspective view describing a method for attaching the fixing module 800 to the image pickup apparatus 1000. The fixing module 800 is an extension module used when the image pickup apparatus 1000 is attached to a tripod or a rig in use. The fixing module 800 has tripod internal threads 801 that can be screwed to external threads of a tripod, etc. When the tripod internal thread 801 is screwed to the external thread of the tripod, the image pickup apparatus 1000 is fixed to the tripod.

The fixing module 800 is fitted into the concave portion 415b of the front case 410 and the concave portion 514b of the rear case 510 and is fastened to the front case 410 and rear case 510 with the fixing screw 630 as with the side panels 610a through 610d. That is, the fixing module 800 can be attached in place of one of the side panels 610a through 610d.

Figure 36:
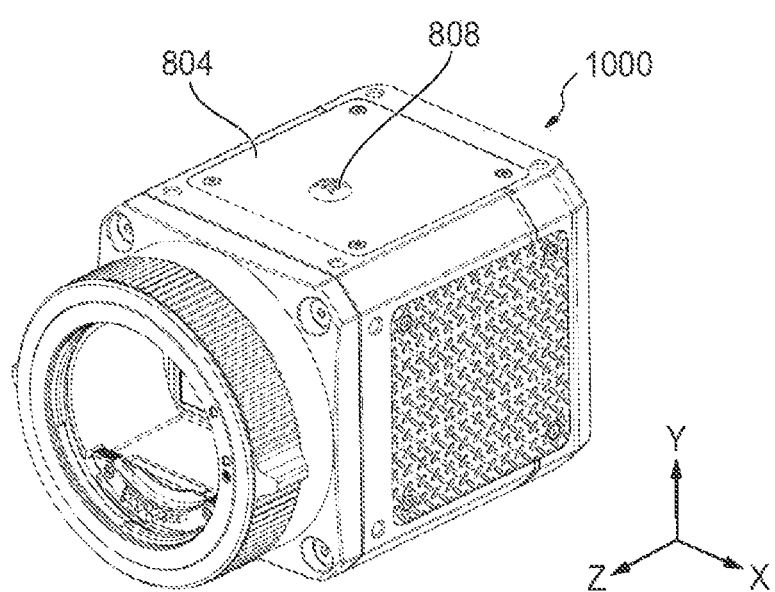
FIG. 36 is a perspective view showing a state where a microphone module is attached to the image pickup apparatus.
Figure 37A:
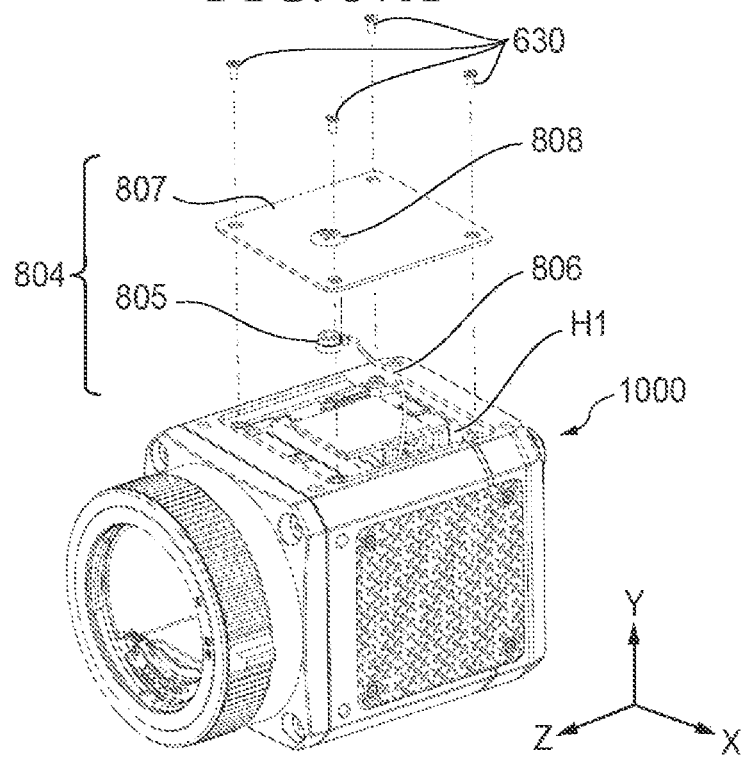
FIG. 37A and FIG. 37B are perspective views describing a method for attaching the microphone module to the image pickup apparatus.
Figure 37B:
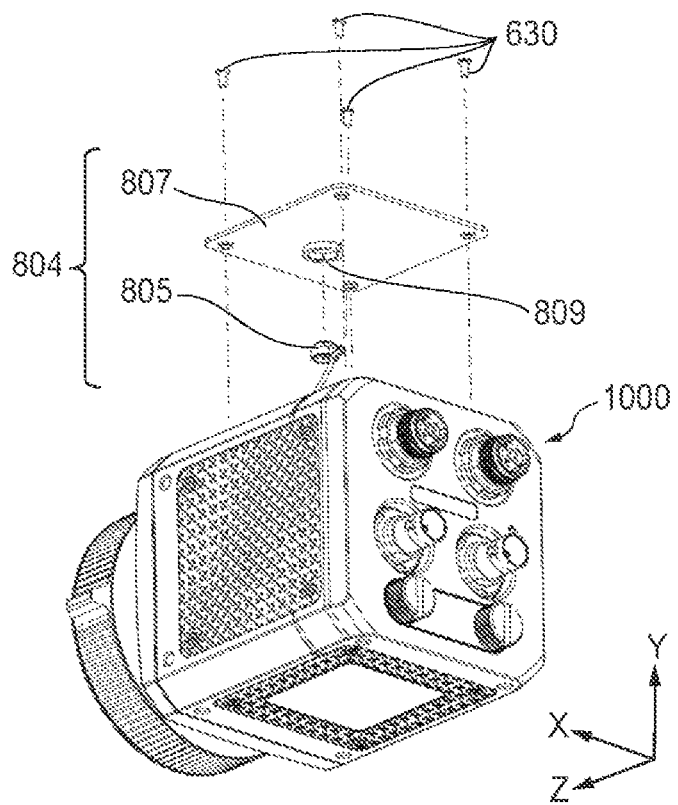

FIG. 36 is a perspective view showing a state where a microphone module 804 is attached to the upper opening H1 of the image pickup apparatus 1000. FIG. 37A and FIG. 37B are a front-side exploded perspective view and a back-side exploded perspective view describing a method for attaching the microphone module 804 to the image pickup apparatus 1000. The microphone module 804 can be attached to the image pickup apparatus 1000 as with the fixing module 800.

The microphone module 804 is an extension module that mainly consists of a microphone 805 that collects sound of an external sound source and a microphone panel 807 that has a microphone hole 808. A positioning hole 809 is provided on the inner surface of the microphone panel 807 at the position corresponding to the microphone hole 808. The microphone 805 is fitted in the positioning hole 809 and is held. The microphone 805 is electrically connected to the main substrate 450 through a cable 806. The microphone 805 converts the collected sound into an audio signal (analog signal). a predetermined circuit implemented in the main substrate 450 applies gain control to the audio signal so that the level is controlled to a predetermined level and converts the controlled audio signal into audio data that is a digital signal. The generated audio data is output to an external device through the third interface connector 560 together with image data etc.

Figure 38:
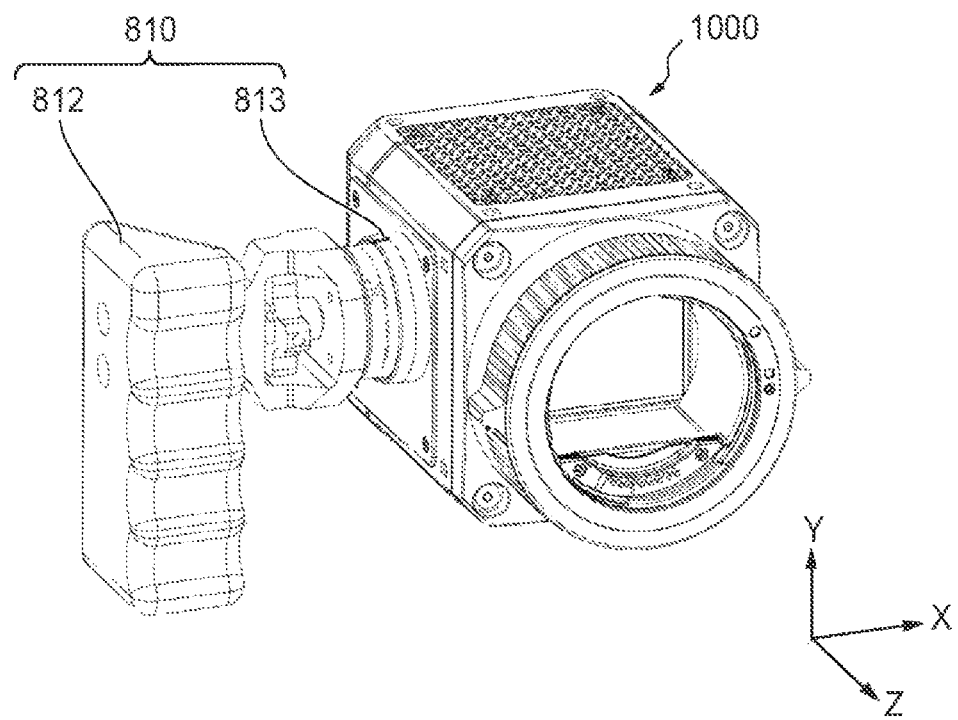
FIG. 38 is a perspective view showing a state where a grip module is attached to the image pickup apparatus.

FIG. 38 is a perspective view showing a state where a grip module 810 is attached to the left opening H4 of the image pickup apparatus 1000. The grip module 810 is an extension module used when a user picks up an image while gripping the image pickup apparatus 1000. The grip module 810 is provided with a grip part 812 and a grip holder 813. The grip part 812 is a part that a user grips in a state where the image pickup apparatus 1000 is equipped with the grip module 810. The grip holder 813 can be attached to the image pickup apparatus 1000 as with the fixing module 800.

Figure 39A:
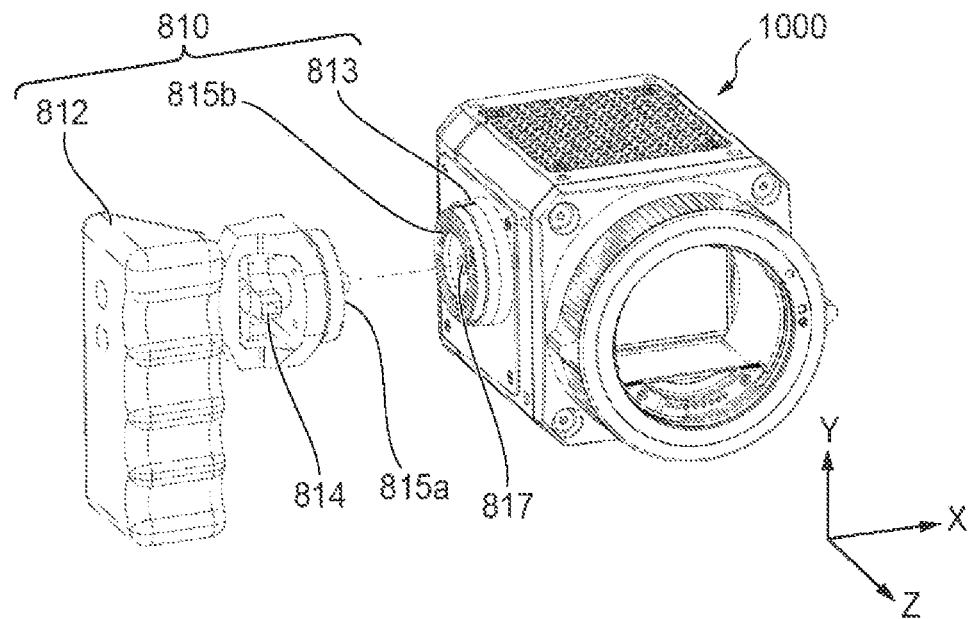
FIG. 39A and FIG. 39B are perspective views describing a method for attaching a grip part to image pickup apparatus.
Figure 39B:
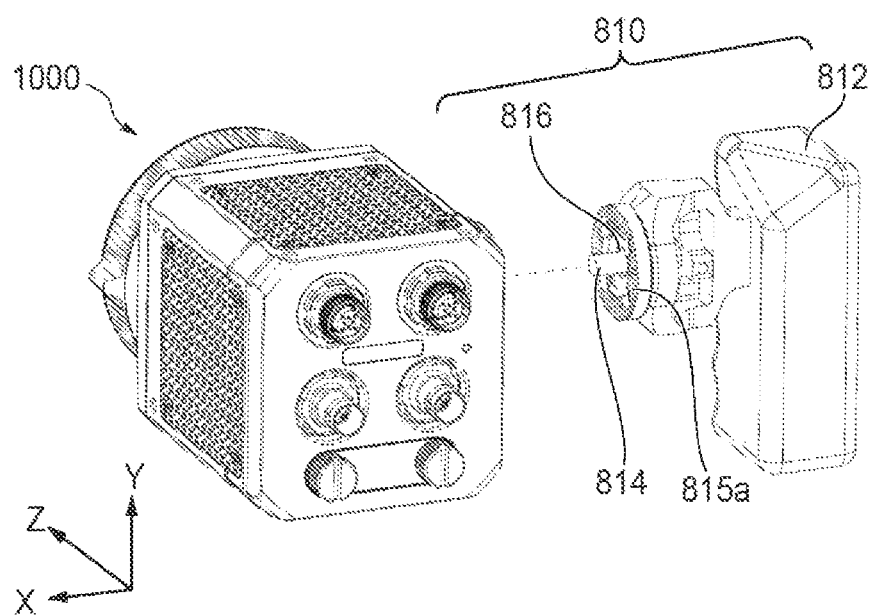

FIG. 39A and FIG. 39B are a front-side perspective view and a back-side perspective view describing a method for attaching the grip part 812 to the grip holder 813. A through hole 816 and a rosette 815a are provided in an attachment surface of the grip part 812. A fastening bolt 814 is provided through the through hole 816. An internal thread 817 and a rosette 815b are provided in an attachment surface of the grip holder 813. It should be noted that a rosette is a disk-like seat that has depressions and projections that extend in radial directions and are formed in a uniform phase in a circumferential direction. When a pair of rosettes are faced mutually and the depressions and projections of one rosette mesh with the depressions and projections of the other rosette, the relative rotation in the circumferential direction becomes impossible.

The rosette 815a and the rosette 815b can change the phase in a unit of a concavo-convex pitch and can be meshed. The grip part 812 is fixed to the grip holder 813 (the image pickup apparatus 1000) in a state where the rotation to the grip holder 813 is regulated, when the fastening bolt 814 is tightened (is screwed to the internal thread 817) in the state where the rosette 815a and the rosette 815b are engaged in a predetermined phase. That is, a user is able to fix the grip part 812 strongly at a desired angle to the image pickup apparatus 1000. It should be noted that the grip part 812 has hollows corresponding to shapes of fingers so that a user may easily grip. Moreover, in a basic mode of the grip module 810, the grip module 810 is attached to the left opening H4 and the longitudinal direction of the grip part 812 becomes parallel to the vertical direction (Y-direction) of the image pickup apparatus 1000.

Figure 40:
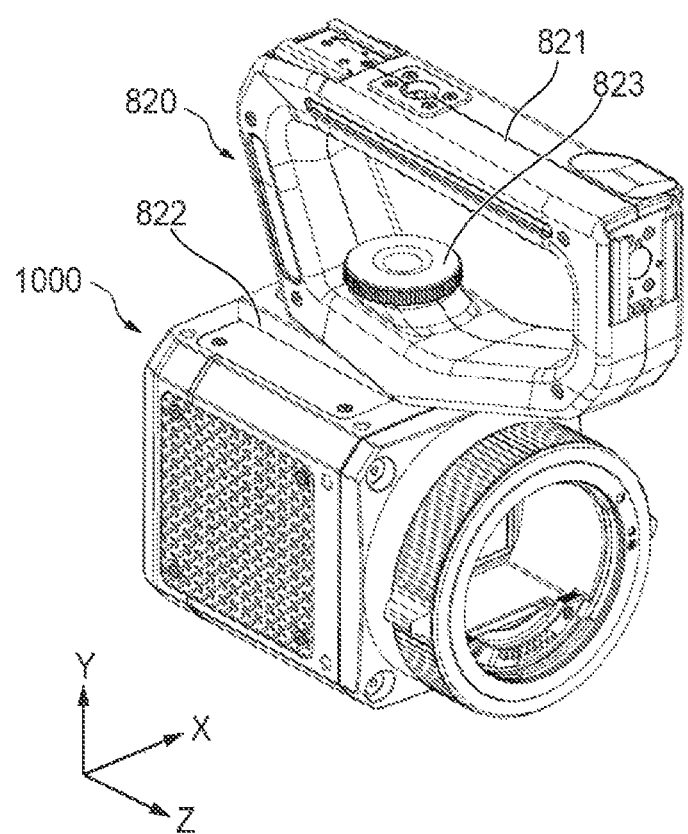
FIG. 40 is a perspective view showing a state where a handle module is attached to the image pickup apparatus.

FIG. 40 is a perspective view showing a state where a handle module 820 is attached to the upper opening H1 of the image pickup apparatus 1000. The handle module 820 is an extension module used when a user picks up an image while holding the image pickup apparatus 1000 or when a user carries the image pickup apparatus 1000 to another location. The handle module 820 is provided with a handle 821 and a handle attachment part 822. The handle 821 is a part that a user grips, when the handle module 820 is attached to the image pickup apparatus 1000. The handle 821 is formed annularly. The handle attachment part 822 can be attached to the image pickup apparatus 1000 as with the fixing module 800.

Figure 41A:
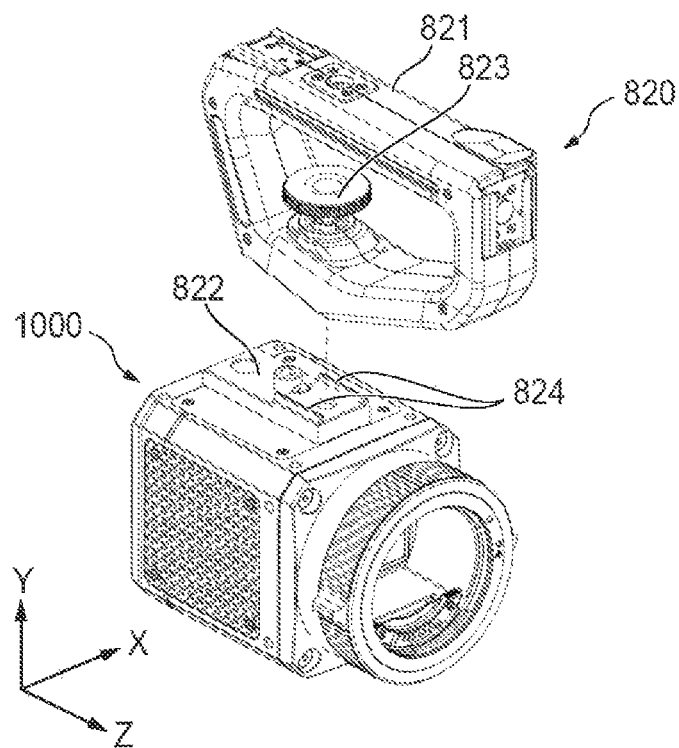
FIG. 41A and FIG. 41B are perspective views describing a method for attaching a handle part to the image pickup apparatus.
Figure 41B:
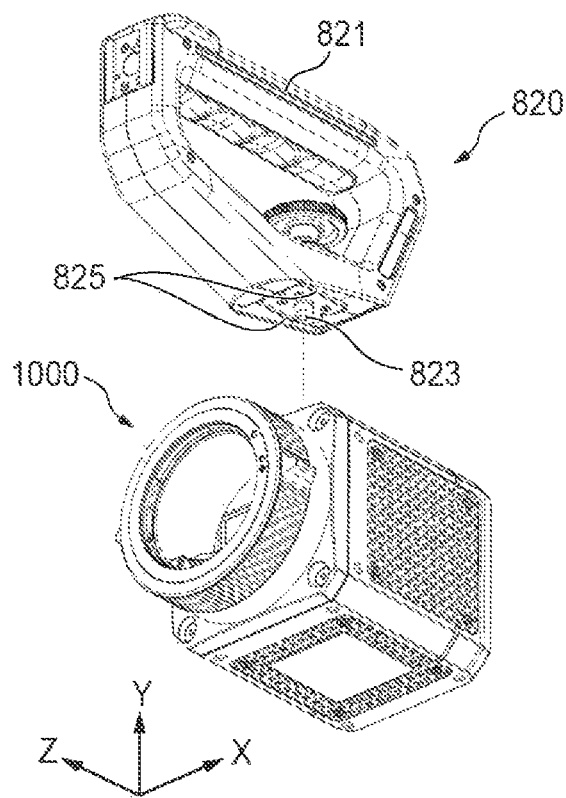

FIG. 41A and FIG. 41B are a front-side perspective view and a back-side perspective view describing a method for attaching the handle 821 to the handle attachment part 822 that has been attached to the image pickup apparatus 1000. The handle attachment part 822 has a pair of convex parts 824 lying in the Z-direction. The handle 821 has a pair of concave portions 825 into which the pair of convex parts 824 are fitted in the Y-direction. When the handle 821 is attached to the handle attachment part 822, the convex parts 824 are fitted into the concave portions 825, and a fastening bolt 823 is tightened. Thereby, the handle 821 is fixed to the handle attachment part 822 in a state where movements in all the X-, Y-, and Z-directions are regulated. In a basic mode of the handle module 820, the handle attachment part 822 is attached to the upper opening H1 of the image pickup apparatus 1000 and the longitudinal direction of the handle 821 becomes approximately parallel to the Z-direction.

Figure 42A:
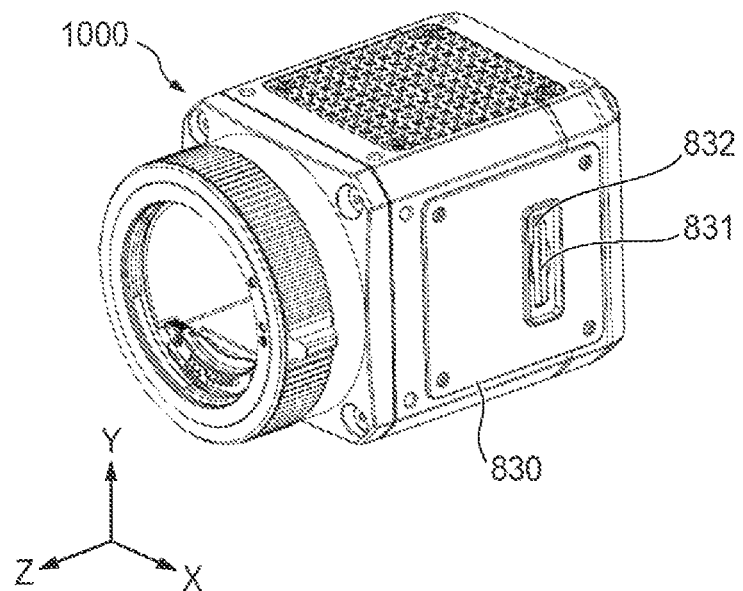
FIG. 42A and FIG. 42B are perspective views showing a state where a recording module is attached to the image pickup apparatus.

FIG. 42A is a perspective view showing a state where a recording module 830 is attached to the right opening H3 of the image pickup apparatus 1000. The recording module 830 is an extension module for recording various data, such as image data and audio data, in connection with an image picked up by the image pickup apparatus 1000. The recording module 830 can be attached to the image pickup apparatus 1000 as with the fixing module 800. The recording module 830 has a recording medium slot 832 in which a memory medium 831 is stored. The recording medium slot 832 is electrically connected to the main substrate 450.

Figure 42B:
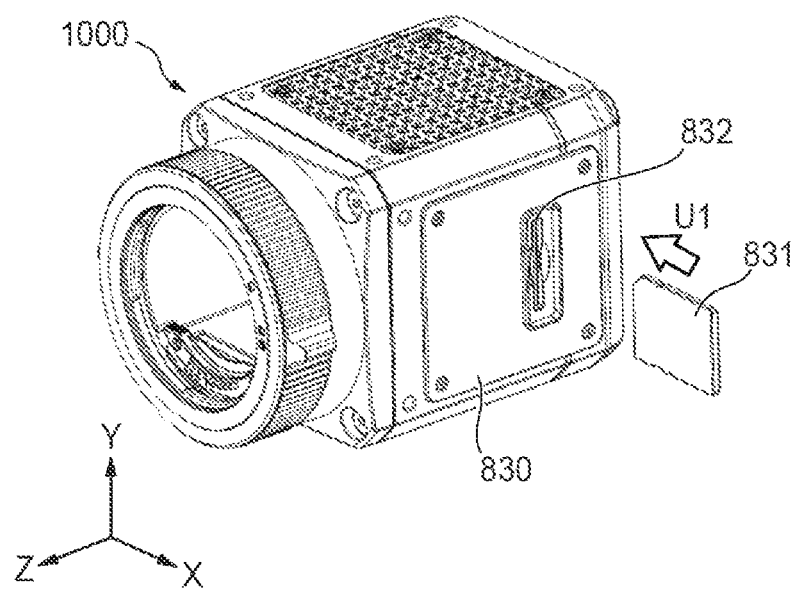

FIG. 42B is a perspective view describing a method for inserting the recording medium 831 to the recording medium slot 832. The recording medium 831 is inserted into the recording medium slot 832 in a direction of an arrow U1. Although the recording module 830 that store the single recording medium 831 is disclosed, the recording module 830 may be configured to store a plurality of recording media. The mechanism for holding and releasing the recording medium 831 is not limited.

Figure 43:
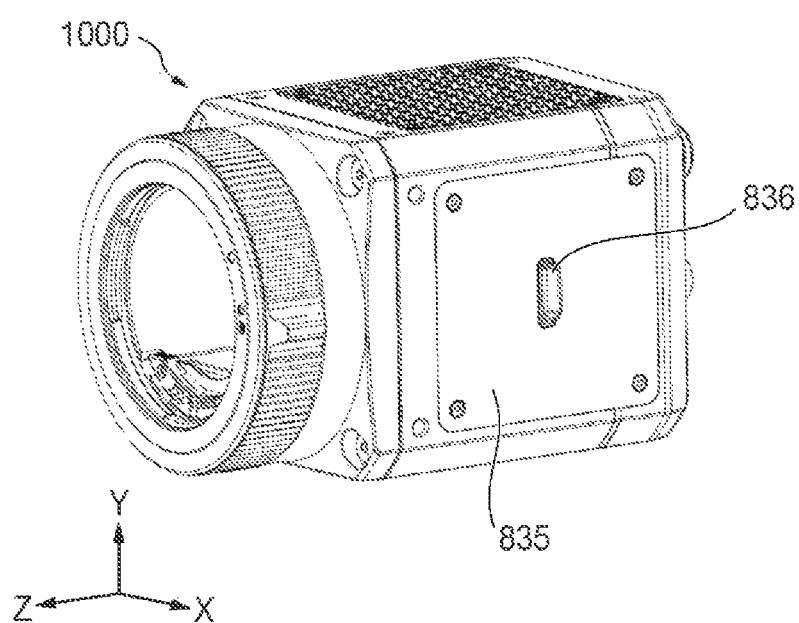
FIG. 43 is a perspective view showing a state where an extension terminal module is attached to the image pickup apparatus.

FIG. 43 is a perspective view showing a state where an extension terminal module 835 is attached to the right opening H3 of the image pickup apparatus 1000. The extension terminal module 835 has an extension terminal 836. The extension terminal 836 is electrically connected to the main substrate 450. The extension terminal 836 is an HDMI terminal that is used for connection with an external device like a display device, for example. It should be noted that the extension terminal 836 is not limited to the HDMI terminal. Another terminal, such as a USB terminal, may be employed. Moreover, the number of the extension terminals 836 may be plural, and the terminals of different types may be provided in such a case.

Figure 44A:
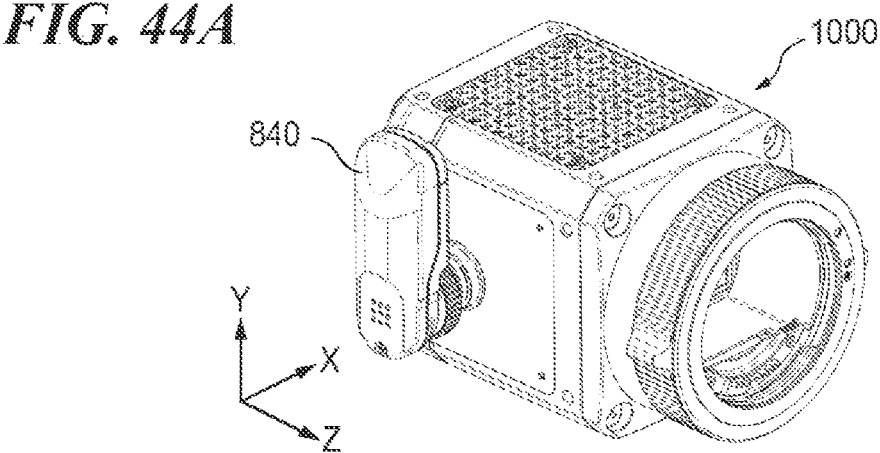
FIG. 44A is a perspective view showing a state where a wireless module is attached to the image pickup apparatus.

FIG. 44A is a perspective view showing a state where a wireless module 840 is attached to the left opening H4 of the image pickup apparatus 1000. The wireless module 840 is provided with a wireless communication unit 841 and a wireless-module attachment part 842. The wireless-module attachment part 842 can be attached to the image pickup apparatus 1000 as with the fixing module 800.

Figure 44B:
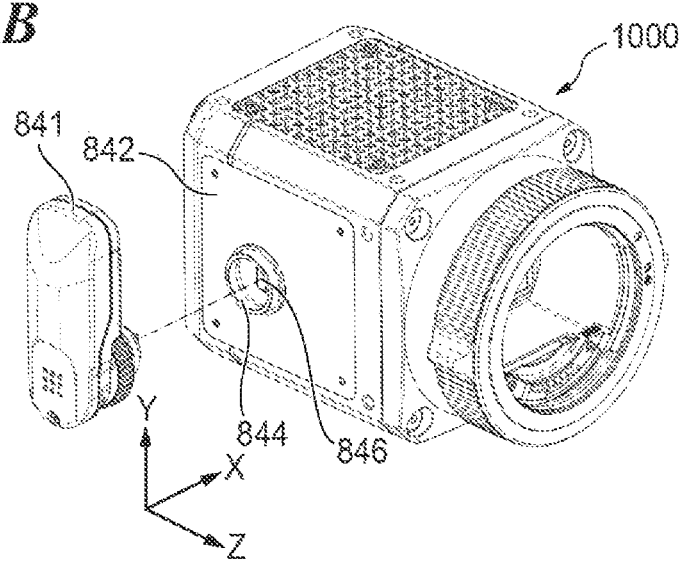
FIG. 44B and FIG. 44C are perspective views describing a method for attaching a wireless communication unit to the image pickup apparatus.
Figure 44C:
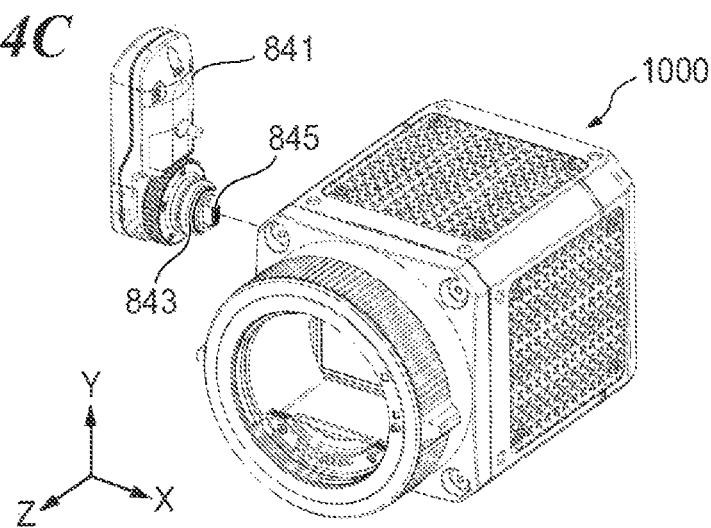

FIG. 44B and FIG. 44C are front-side perspective views describing a method for attaching the wireless communication unit 841 to the wireless-module attachment part 842 that has been attached to the image pickup apparatus 1000. FIG. 44B and FIG. 44C show the image pickup apparatus 1000 viewed from different directions.

The wireless communication unit 841 has a communication-unit engagement part 843, the wireless-module attachment part 842 has an attachment-part engagement part 844, and the wireless communication unit 841 is attached to the wireless-module attachment part 842 by engaging these engagement parts. At this time, an attachment-part connector 846 of the wireless-module attachment part 842 and a communication-unit connector 845 of the wireless communication unit 841 are connected, and the attachment-part connector 846 is electrically connected to the main substrate 450. When the wireless module 840 is attached to the image pickup apparatus 1000, the wireless communication unit 841 can wirelessly transmit image data and audio data in connection with an image picked up by the image pickup apparatus 1000 to an external device.

Figure 45:
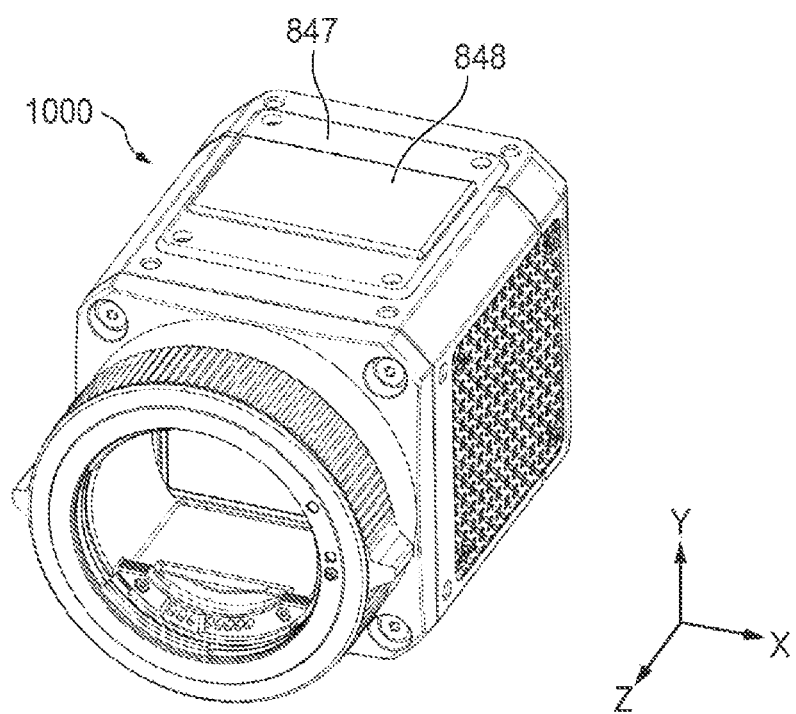
FIG. 45 is a perspective view showing a state where a display module is attached to the image pickup apparatus.

FIG. 45 is a front-side perspective view showing a state where a display module 847 is attached to the upper opening H1 of the image pickup apparatus 1000. The display module 847 is an extension module for checking an image picked up by the image pickup apparatus 1000, for inputting various settings of the image pickup apparatus 1000, and for checking an input. Accordingly, the display module 847 is provided with a display panel 848. The display panel 848 is electrically connected to the main substrate 450. Although the display panel 848 is rigidly fixed to the display module 847 in this embodiment, the display panel 848 may be configured so that the orientation to the image pickup apparatus 1000 can be changed.

Figure 46A:
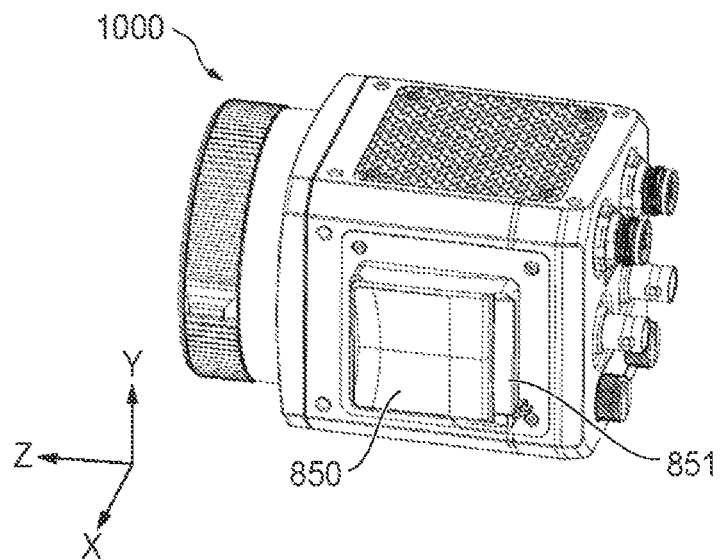
FIG. 46A and FIG. 46B are perspective views showing a state where a battery module is attached to the image pickup apparatus.
Figure 46B:
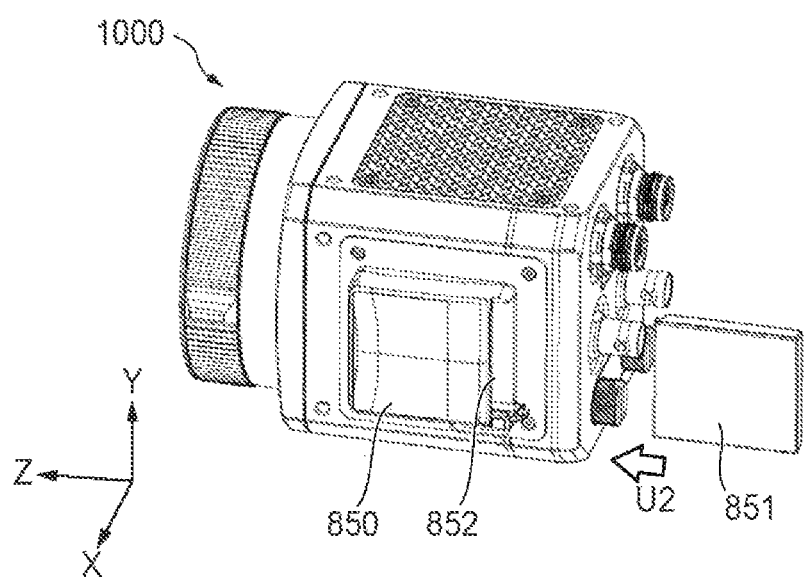

FIG. 46A is a perspective view showing a state where a battery module 850 is attached to the right opening H3 of the image pickup apparatus 1000. FIG. 46B is a perspective view showing a state where a battery 851 is detached from the battery module 850.

The image pickup apparatus 1000 is basically used in a state where electric power is supplied from an external power source through the first interface connector 540. In the meantime, a use status that needs power supply from the battery 851 is estimated. The extension module used in this case is the battery module 850. The battery module 850 has a battery chamber 852 that stores the battery 851. The battery chamber 852 is electrically connected to the interface substrate 520. The battery 851 can be inserted into the battery chamber 852 in the direction of an arrow U2 in FIG. 46B. In the state where the battery 851 is stored in the battery chamber 852, electric power is supplied to the image pickup apparatus 1000 from the battery 851.

Figure 47:
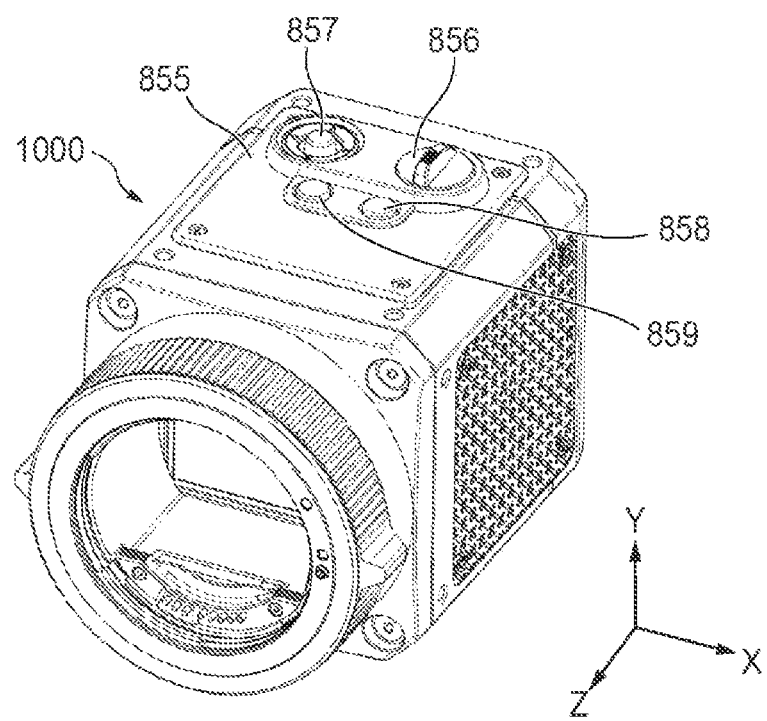
FIG. 47 is a perspective view showing a state where an operation module is attached to the image pickup apparatus.

FIG. 47 is a front-side perspective view showing a state where an operation module 855 is attached to the upper opening H1 of the image pickup apparatus 1000. The operation module 855 is an extension module operated by a user and gives various kinds of a user's instructions to the image pickup apparatus 1000. The operation module 855 is provided with a power switch 856, a cross key 857 for adjusting white balance etc., a REC button 858, a main-body operation button 859, and a switch substrate (not shown) as operation units in this embodiment. The switch substrate is electrically connected to the main substrate 450 and transmits signals corresponding to input operations to the main substrate. The above-mentioned button group of the operation module 855 is one example. Another operation member like an iris dial may be provided in place of a member of the button group or in addition to the button group.

Figure 48:
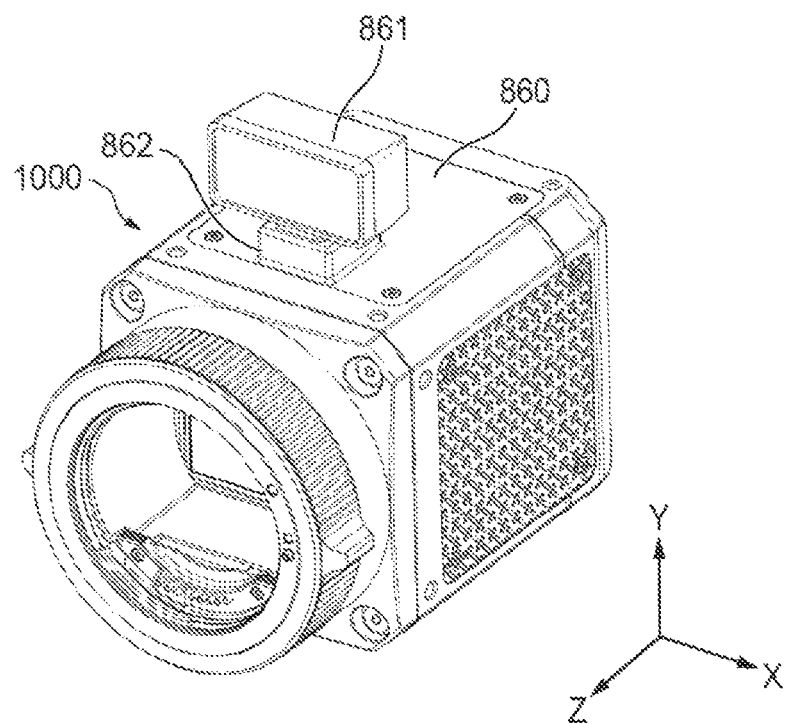
FIG. 48 is a perspective view showing a state where a lighting module is attached to the image pickup apparatus.

FIG. 48 is a front-side perspective view showing a state where a lighting module 860 is attached to the upper opening H1 of the image pickup apparatus 1000. The lighting module 860 is an extension module used when image-pickup environment of the image pickup apparatus 1000 is low illumination or when an object is intentionally illuminated and is picked up. The lighting module 860 is provided with a lighting unit 861 that has a light source like an LED and a light attachment part 862. Electric power is supplied to the lighting module 860 through the main substrate 450 of the image pickup apparatus 1000 or is supplied from an external power source (not shown). When the lighting module 860 is configured to store a battery inside the module, the power supply to the lighting unit 861 from the battery is available.

Figure 49A:
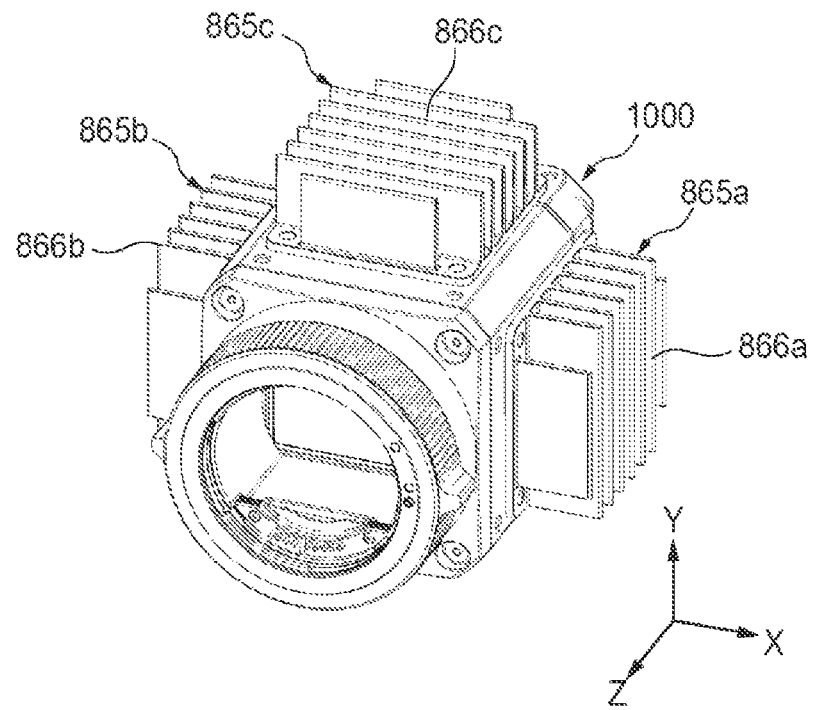
FIG. 49A and FIG. 49B are a perspective view and a front view showing a state where a heat sink module is attached to the image pickup apparatus.
Figure 49B:
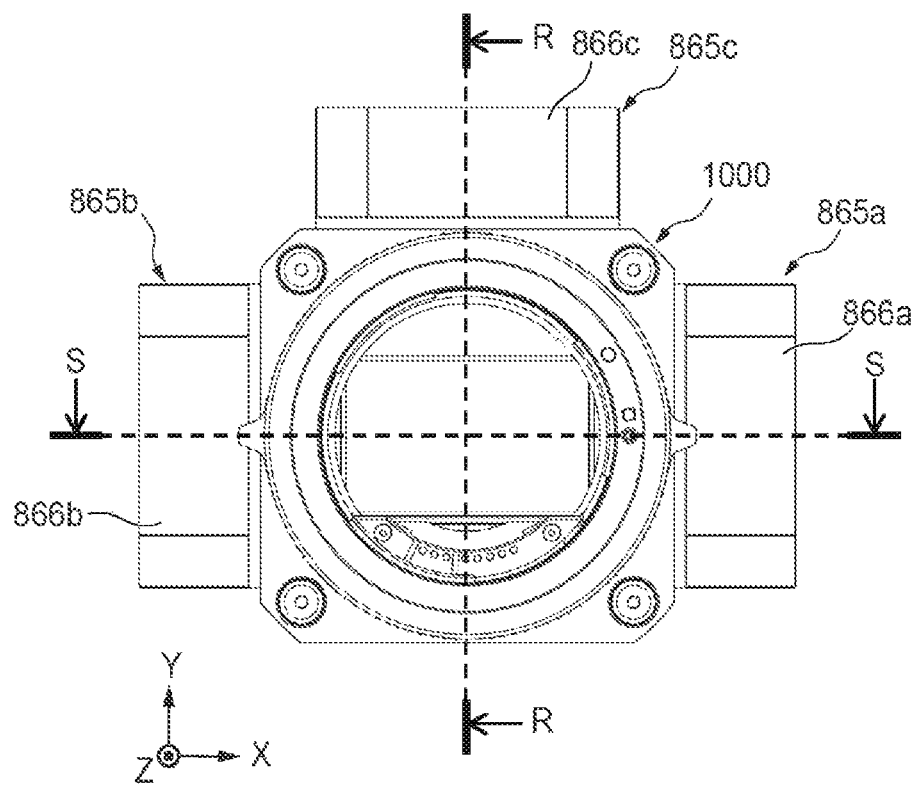

FIG. 49A is a front-side perspective view showing a state where heat sink modules 865c, 865a, and 865b are respectively attached to the upper opening H1, the right opening H3, and the left opening H4 of the image pickup apparatus 1000. FIG. 49B is a front view showing the configuration in FIG. 49A. The heat sink modules 865a through 865c are extension modules used when more efficient heat radiation is needed by enlarging surface area of the exterior of the image pickup apparatus 1000. The heat sink modules 865a, 865b, and 865c respectively have heat dissipation fins 866a, heat dissipation fins 866b, and heat dissipation fins 866c. The heat dissipation fins 866a through 866c are arranged being approximately parallel to the XY plane. The heat dissipation fins 866a through 866c are made from metal of which heat conductivity is large, such as aluminum alloy, for example. The size and shape of the heat dissipation fins 866a through 866c are not limited to what is shown in FIG. 49A and FIG. 49B.

Figure 50A:
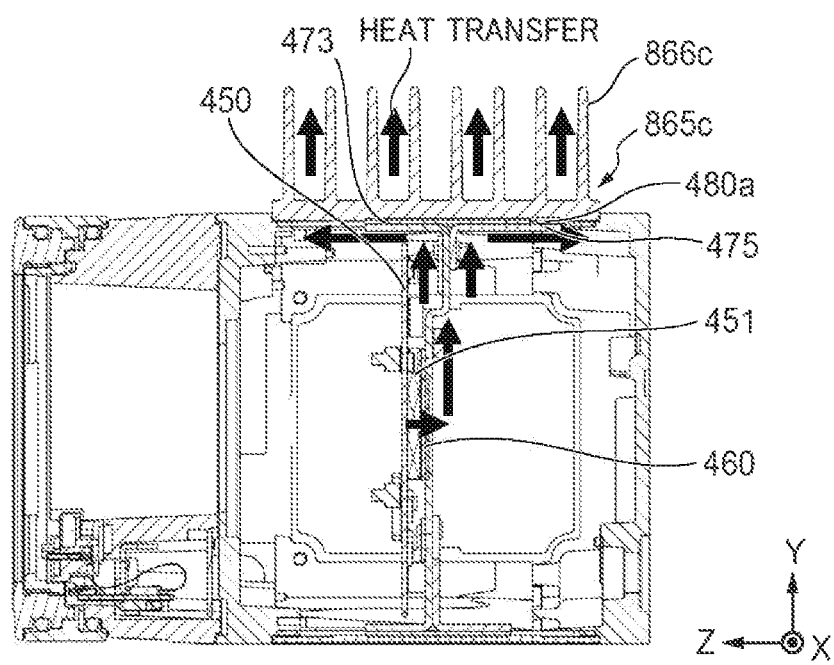
FIG. 50A and FIG. 50B are sectional views respectively taken along lines R-R and S-S in FIG. 49B.
Figure 50B:
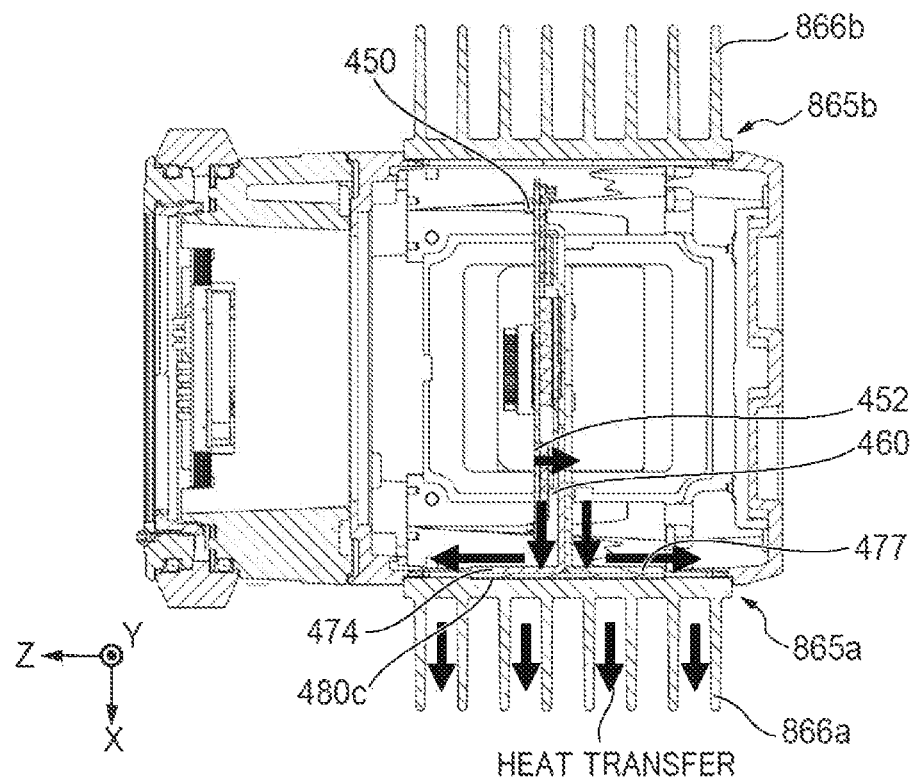

FIG. 50A and FIG. 50B are sectional views respectively taken along lines R-R and S-S in FIG. 49B. FIG. 50A and FIG. 50B show only the components related to heat dissipation in the image pickup apparatus 1000. Heat transfer paths are indicated by arrows.

The heat generated by the heat generating elements implemented in the main substrate 450 is transferred to the heat sink modules 865a and 865c, which constitute the exterior, through the heat dissipation rubbers 460, the heat sink unit 470, and the heat dissipation rubbers 480a through 480d, and is radiated to the outside air from the heat dissipation fins 866a and 866c. The heat generated by the second heat generating element 452 is transferred to the heat dissipation fins 866a through the second main heat-sink metal plate 474 and the third auxiliary heat-sink metal plate 477 and is radiated from the heat dissipation fins 866a to the outside air. Moreover, the heat generated by the first heat generating element 451 is transferred to the heat dissipation fins 866c through the first main heat-sink metal plate 473 and the first auxiliary heat-sink metal plate 475 and is radiated from the heat dissipation fins 866c to the outside air. The heat dissipation fins 866b play the role that radiates the heat transferred to the exterior by enlarging the exterior surface area of the image pickup apparatus 1000. Although the example that attaches the heat sink modules to the three surface among the four (upper, lower, right, and left) surfaces of the image pickup apparatus 1000 is shown, the number and attached surfaces of the heat sink modules are not limited to the above example. The heat sink modules may be attached to arbitrary surfaces.

Figure 51A:
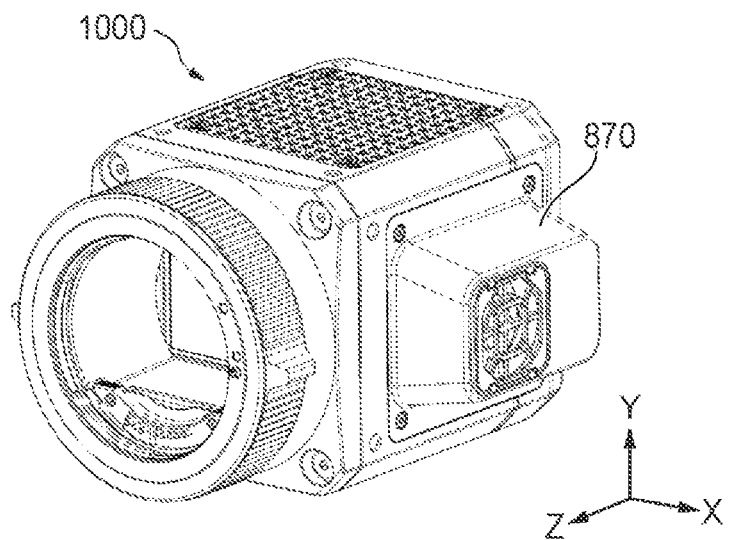
FIG. 51A and FIG. 51B are perspective views showing a first state where a cooling fan module and a vent module are attached to the image pickup apparatus.
Figure 51B:
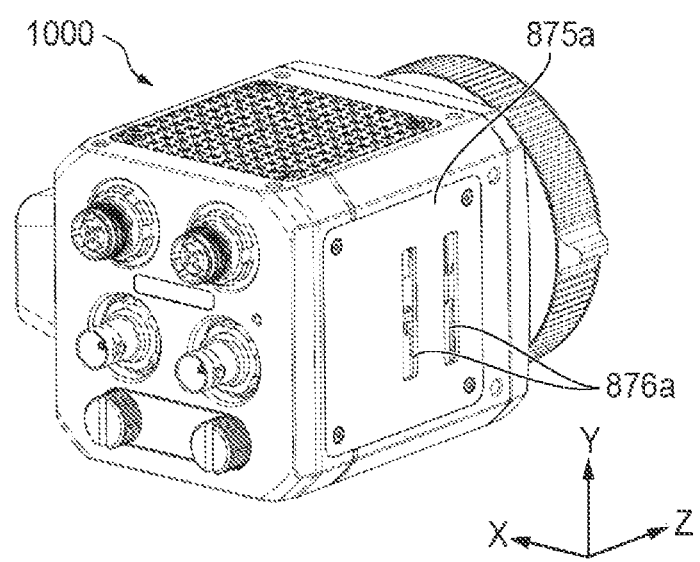
Figure 52A:
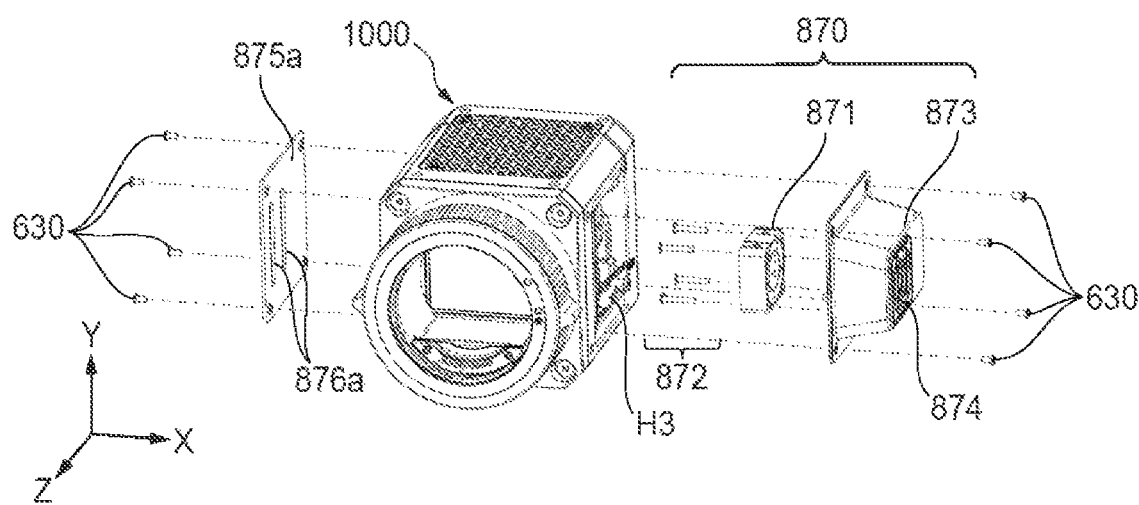
FIG. 52A and FIG. 52B are exploded perspective views showing the cooling fan module and the vent module.
Figure 52B:
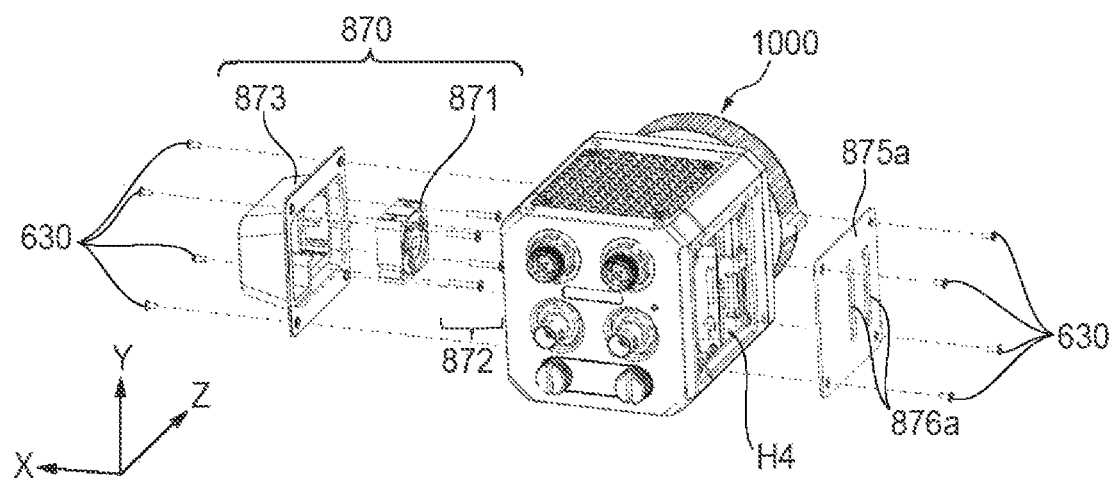

FIG. 51A and FIG. 51B are a front-side perspective view and a rear-side perspective view showing a state where a cooling fan module 870 is attached to the right opening H3 of the image pickup apparatus 1000 and a vent module 875a is attached to the left opening H4. FIG. 52A and FIG. 52B are a front-side exploded perspective view and a rear-side exploded perspective view describing a method for attaching the cooling fan module 870 and the vent module 875a to the image pickup apparatus. The cooling fan module 870 and the vent module 875a are extension modules for performing forced air cooling of the inside of the image pickup apparatus 1000. When the image pickup apparatus 1000 is equipped with the cooling fan module 870 and the vent module 875a, the heat dissipation rubber and the heat sink unit 470 are removed in order securing air flow paths.

The cooling fan module 870 is provided with a cooling fan 871 for cooling the heat generating elements arranged inside the image pickup apparatus 1000. The cooling fan 871 is fixed to a cooling fan cover 873, which has an opening 874, with fixing screws 872. Moreover, the cooling fan 871 is electrically connected with the main substrate 450 and receives supply of power source from the main substrate 450.

The vent module 875a is provided with vents 876a each of which is an approximate rectangle. Although the vent module 875a equipped with the two vents 876a is shown in this example, the number of the vents 876a is not limited to this. The number may be one or more. Moreover, when the vent module 875a is attached to the left opening H4, the longitudinal direction of the vents 876a becomes approximately parallel to the Y-direction. The shape of the vents 876a is not limited to the approximate rectangle. Air flows inside the image pickup apparatus 1000 through the vents 876a inhaled by driving the cooling fan 871 cools the heat generating elements on the main substrate 450 through the heat sink unit 470 and is exhausted from the opening 874.

FIG. 53A is a top view showing the state (the state in FIG. 51A) where the cooling fan module 870 is attached to the right opening H3 of the image pickup apparatus 1000 and the vent module 875a is attached to the left opening H4. FIG. 53B is a sectional view taken along a line T-T shown in FIG. 53A. The air flow in the image pickup apparatus 1000 is shown by arrows in FIG. 53B.

The air inhaled inside the image pickup apparatus 1000 from the vents 876a of the vent module 875a provided in the left surface of the image pickup apparatus 1000 mainly cools the first heat generating element 451 on the main substrate 450. Then, the air warmed by cooling the first heat generating element 451 is exhausted to the outside from the opening 874 of the cooling fan 871 provided in the right surface of the image pickup apparatus 1000 by the cooling fan 871.

Figure 54A:
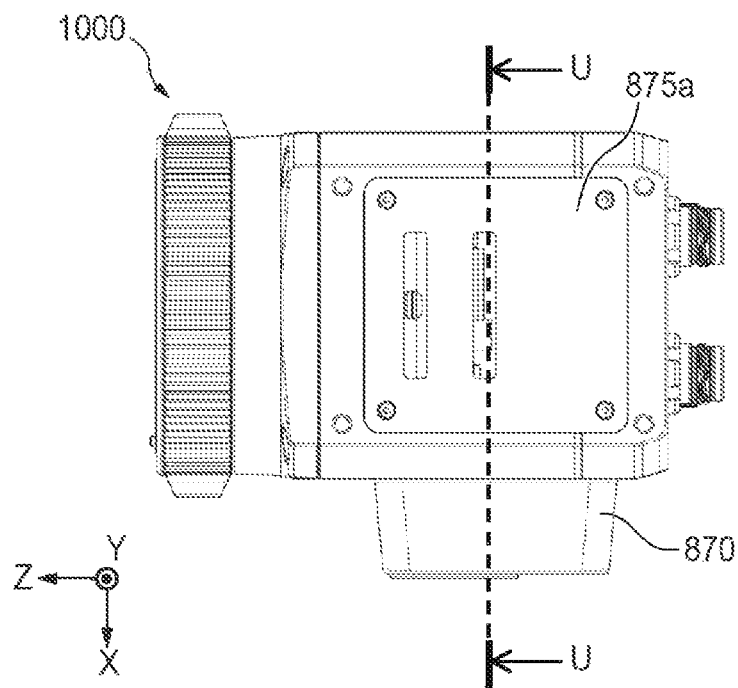
FIG. 54A is a top view showing a second state where the cooling fan module and the vent module are attached to the image pickup apparatus.
Figure 54B:
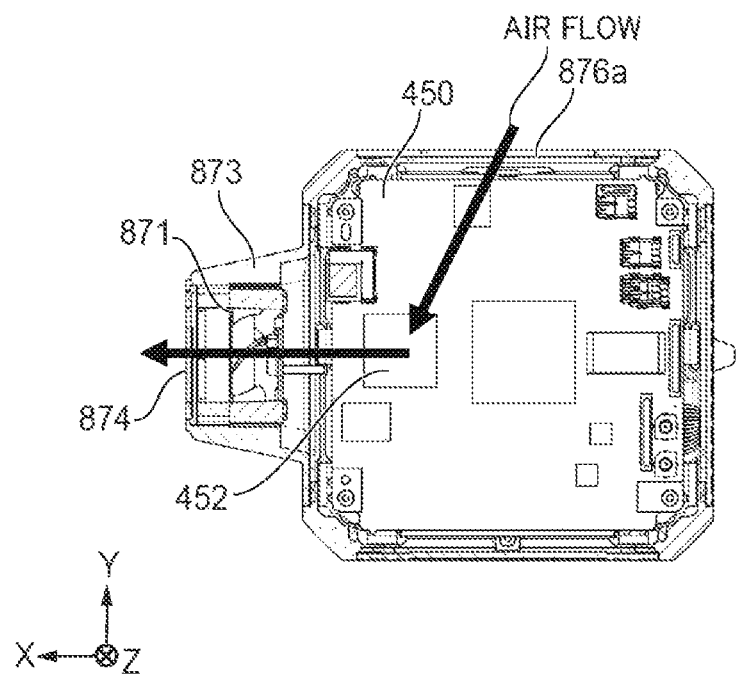
FIG. 54B is a sectional view taken along a line U-U in FIG. 54A

FIG. 54A is a top view showing a state where the cooling fan module 870 is attached to the right opening H3 of the image pickup apparatus 1000 and the vent module 875a is attached to the upper opening H1. FIG. 54B is a sectional view taken along a line U-U shown in FIG. 54A. The air flow in the image pickup apparatus 1000 is shown by arrows in FIG. 54B.

The air inhaled inside the image pickup apparatus 1000 from the vents 876a of the vent module 875a provided in the upper surface of the image pickup apparatus 1000 mainly cools the second heat generating element 452 on the main substrate 450. Then, the air warmed by cooling the second heat generating element 452 is exhausted to the outside from the opening 874 of the cooling fan 871 provided in the right surface of the image pickup apparatus 1000 by the cooling fan 871.

Figure 55A:
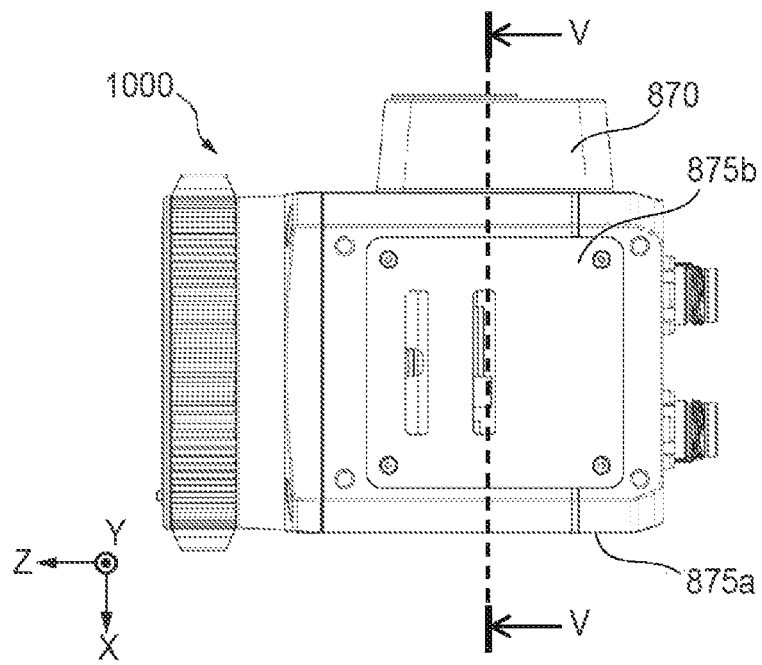
FIG. 55A is a top view showing a third state where the cooling fan module and the vent module are attached to the image pickup apparatus.
Figure 55B:
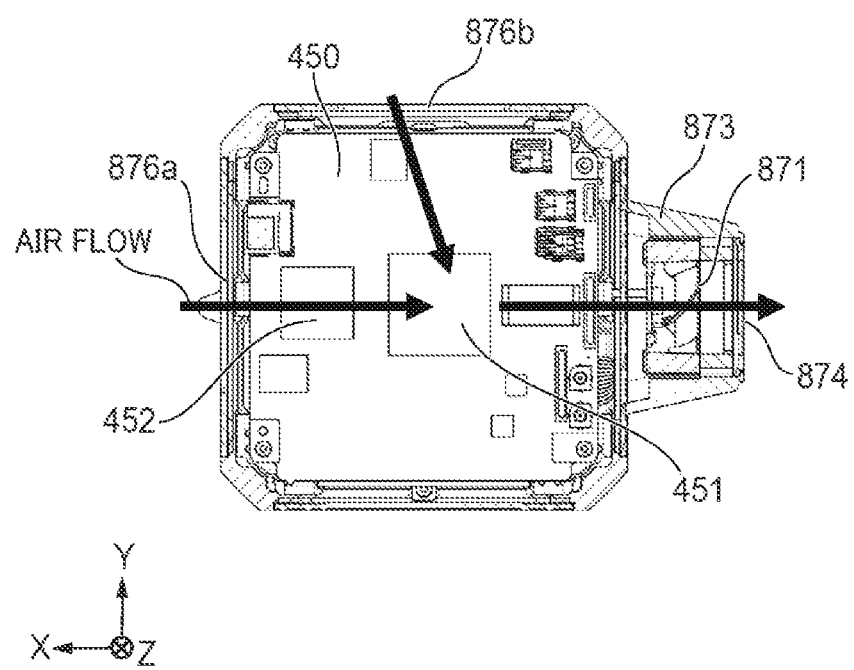
FIG. 55B is a sectional view taken along a line V-V in FIG. 55A

FIG. 55A is a top view showing a state where the cooling fan module 870 is attached to the left opening H4 of the image pickup apparatus 1000 and the vent modules 875a and 875b are respectively attached to the right opening H3 and the upper opening H1. FIG. 55B is a sectional view taken along a line V-V shown in FIG. 55A. The air flow in the image pickup apparatus 1000 is shown by arrows in FIG. 55B.

The air inhaled inside the image pickup apparatus 1000 from the vents 876b of the vent module 875b provided in the upper surface of the image pickup apparatus 1000 mainly cools the first heat generating element 451 on the main substrate 450. Moreover, the air inhaled inside the image pickup apparatus 1000 from the vents 876a of the vent module 875a provided in the right surface of the image pickup apparatus 1000 mainly cools the second heat generating element 452 and the first heat generating element 451 on the main substrate 450. Then, the air warmed by cooling the first heat generating element 451 and the second heat generating element 452 is exhausted to the outside from the opening 874 of the cooling fan 871 provided in the left surface of the image pickup apparatus 1000 by the cooling fan 871.

Although the example that attaches one cooling fan module 870 and one vent module 875a or two vent modules 875a and 875b to the image pickup apparatus 1000 has been described, these modules may be attached to arbitrary surfaces among the four (upper, lower, right, and left) surfaces. Accordingly, an efficient radiation path can be set up according to the use status of the image pickup apparatus 1000. For example, when the heat generation amount of the first heat generating element 451 on the main substrate 450 is large, the radiation path shown in FIG. 54A and FIG. 54B will be selected. When the heat generation amount of the second heat generating element 452 is large, the radiation path shown in FIG. 53A and FIG. 53B will be selected. The selection of the radiation path enables efficient cooling.

Moreover, the number of the cooling fan module 870 is not limited to one. Two cooling fan modules may be attached. Moreover, when there is a third heat generating elements other than first heat generating element 451 and second heat generating element 452, a configuration that efficiently cools the third heat generating element may be employed.

Furthermore, the intake direction and exhaust direction by the cooling fan module 870 and the vent module 875a (875b) can be selected according to the use status of the image pickup apparatus 1000. For example, a situation where various kinds of extension module are attached to the four (upper, lower, right, and left) surfaces of the image pickup apparatus 1000 is estimated as mentioned above. For example, when the grip module 810 is attached to the left opening H4 of the image pickup apparatus 1000 as shown in FIG. 38A, the left surface cannot be used for air intake and air exhaust of the forced air cooling. In such a case, the cooling fan module 870 and the vent modules 875a and 875b can be attached to the upper surface, lower surface, and right surface to which the grip module 810 is not attached. The air intake and exhaust direction may be inverted depending on the arrangement of the heat generating elements. In such a case, air is inhaled from the opening 874 of the cooling fan module 870 and is exhausted from the vents 876a (876b) of the vent module 875a (875b).

Figure 56:
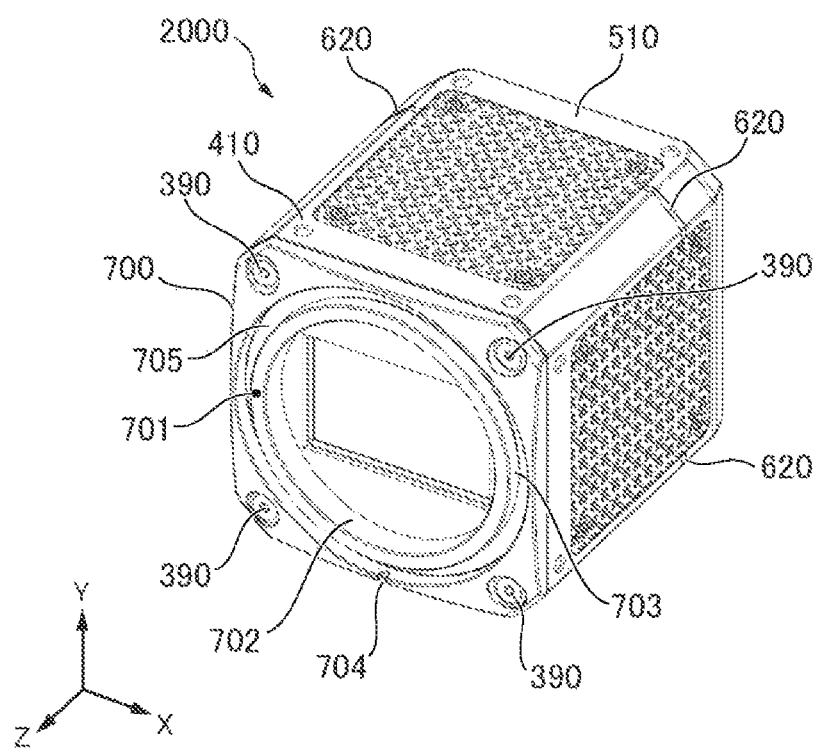
FIG. 56 is a perspective view showing an image pickup apparatus according to a second embodiment.

Next, a second embodiment will be described. FIG. 56 is a perspective view showing an image pickup apparatus 2000 according to the second embodiment. It should be noted that components of the image pickup apparatus 2000 that are identical to the components of the image pickup apparatus 1000 according to the first embodiment are denoted by the same reference numerals and the same component name, and common descriptions will be omitted. Although the image pickup apparatus 1000 is provided with the first mount module 300, the image pickup apparatus 2000 is provided with a second mount module 700, and the image pickup apparatus 2000 differs from the image pickup apparatus 1000 only at this point. Accordingly, hereinafter, the second mount module 700 is mainly described.

Figure 57A:
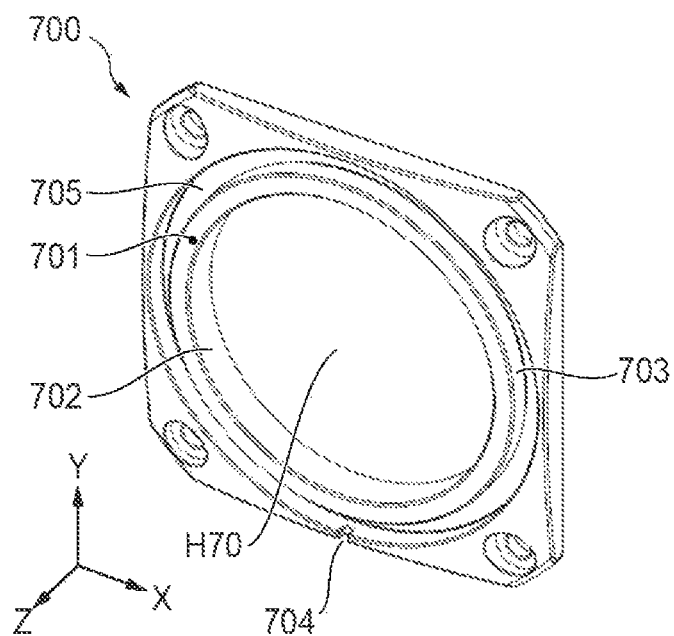
FIG. 57A and FIG. 57B are perspective views showing a second mount module of the image pickup apparatus in FIG. 56.
Figure 57B:
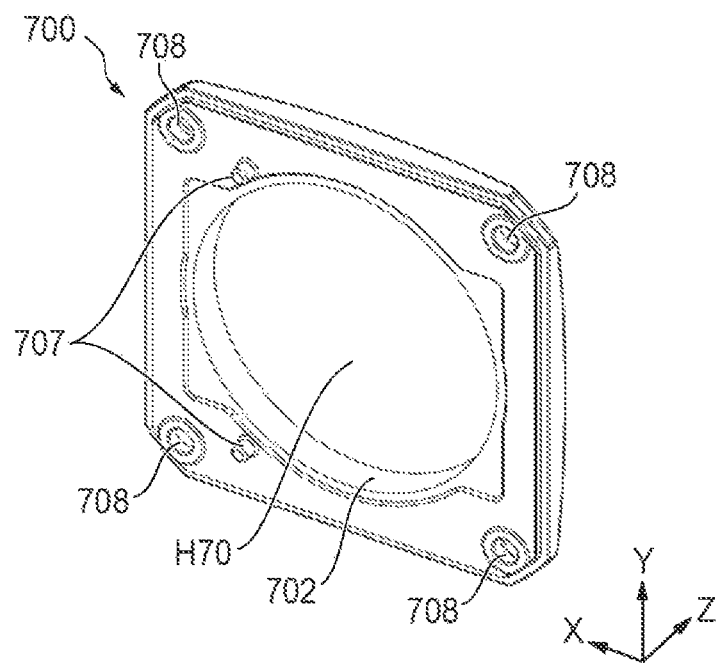

FIG. 57A and FIG. 57B are a front-side perspective view and a back-side perspective view showing the second mount module 700. The second mount module 700 is provided with a circular opening H70 that guides incident light from a lens (not shown), and a groove 705 that is formed outside the opening H70 and is concentric with the opening H70. Moreover, the second mount module 700 is provided with a body-side mount surface 701 between the opening H70 and the groove 705. The body-side mount surface 701 is concentric with the opening H70 and is projected to the front side (+Z side).

An inner thread 702 is provided in an inner side surface of the body-side mount surface 701, and an outer thread 703 is provided in an outer side surface of the body-side mount surface 701. The inner thread 702 is an internal thread to which a second lens barrel 750 (see FIG. 58A) is attachable. Moreover, the outer thread 703 is an external thread to which accessories, such as a mount converter 720 (see FIG. 61A) and a lens cover 730 (see FIG. 59), are attachable. A cutout 704 is provided in a lower part of a front surface of the second mount module 700.

Two positioning bosses 707 prolonged to the back side (in the −Z-direction) are provided in a back surface of the second mount module 700 as with the first mount module 300. When the two positioning bosses 707 are inserted into the two positioning holes 411 provided in the front surface of the front case 410, the second mount module 700 is positioned to the front case 410.

Moreover, screw insertion holes 708 of which center axes are parallel to the Z-direction are respectively provided in four corners of the second mount module 700 in the XY plane. In the state where the positioning to the front case 410 is completed as mentioned above, four fixing screws 390 are respectively inserted into the four screw insertion holes 708 from the front side of the second mount module 700 and are fastened. In this way, the second mount module 700 is fixed to the front case 410 as shown in FIG. 56. It should be noted that the body-side mount surface 701 becomes parallel to the image sensor 425 in the state where the second mount module 700 is attached to the front module 400.

Figure 58A:
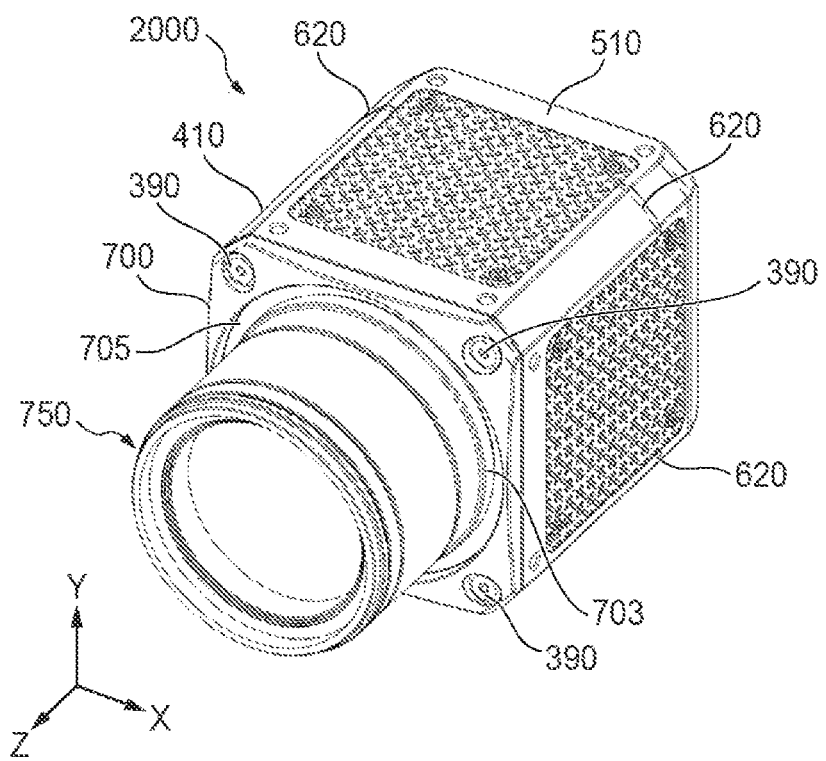
FIG. 58A is a perspective view showing a state where a second interchangeable lens is attached to the image pickup apparatus.
Figure 58B:
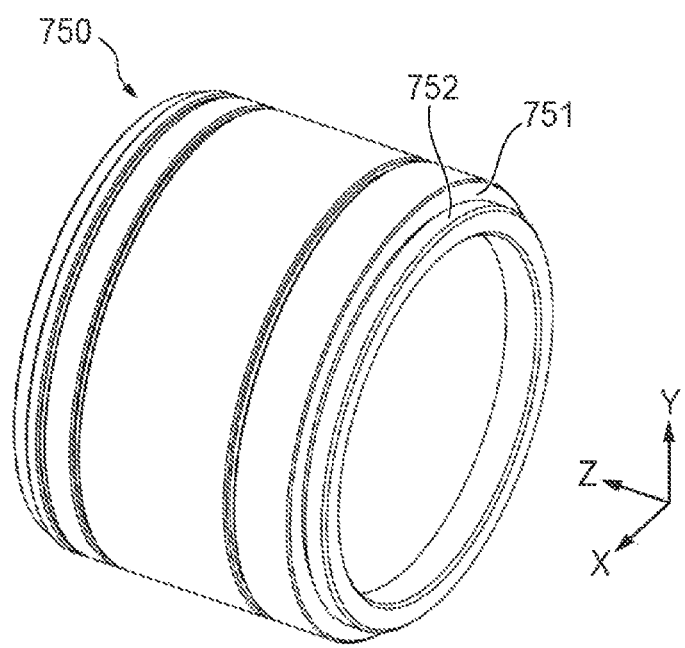
FIG. 58B is a perspective view showing the second interchangeable lens.

FIG. 58A is a front-side perspective view showing a state where the second lens barrel 750 is attached to the image pickup apparatus 2000. FIG. 58B is a back-side perspective view showing the second lens barrel 750. A lens-side mount surface 751 and a lens-side external thread 752 of the same nominal diameter as the inner thread 702 of the second mount module 700 are provided in the rear end (back side) of the second lens barrel 750. The second lens barrel 750 is fixed to the second mount module 700 in a state where the lens-side external thread 752 is screwed to the inner thread 702 of the second mount module 700 and where the lens-side mount surface 751 abuts to the body-side mount surface 701.

When the second lens barrel 750 is attached to the image pickup apparatus 2000, water may infiltrate into the inside of the image pickup apparatus 2000 through a minute gap between the lens-side mount surface 751 and the body-side mount surface 701 or a minute gap between the components of the second lens barrel 750. In order to cope with this issue, the lens cover 730 is attachable to the second mount module 700 in the state where the second lens barrel 750 has been attached.

Figure 59:
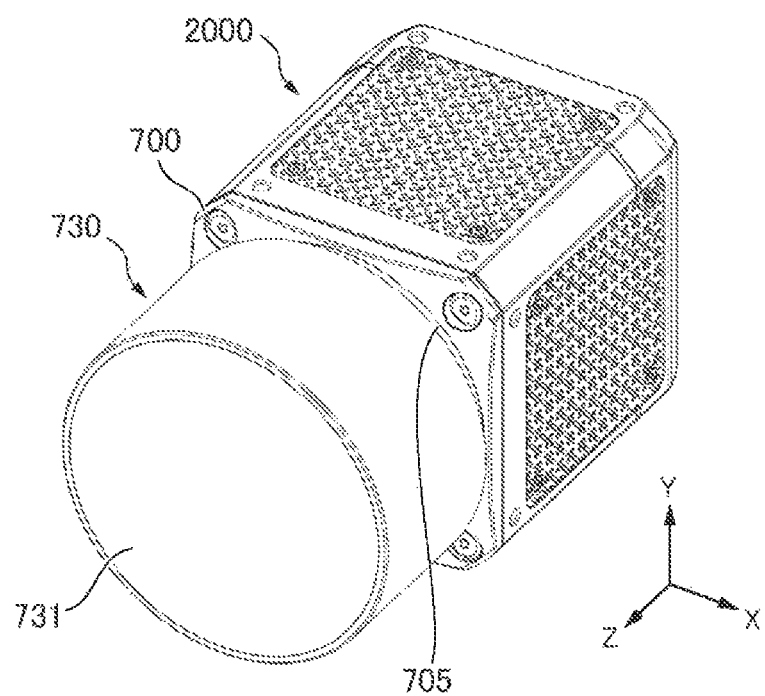
FIG. 59 is a perspective view showing a state where a lens cover is attached to the image pickup apparatus.
Figure 60A:
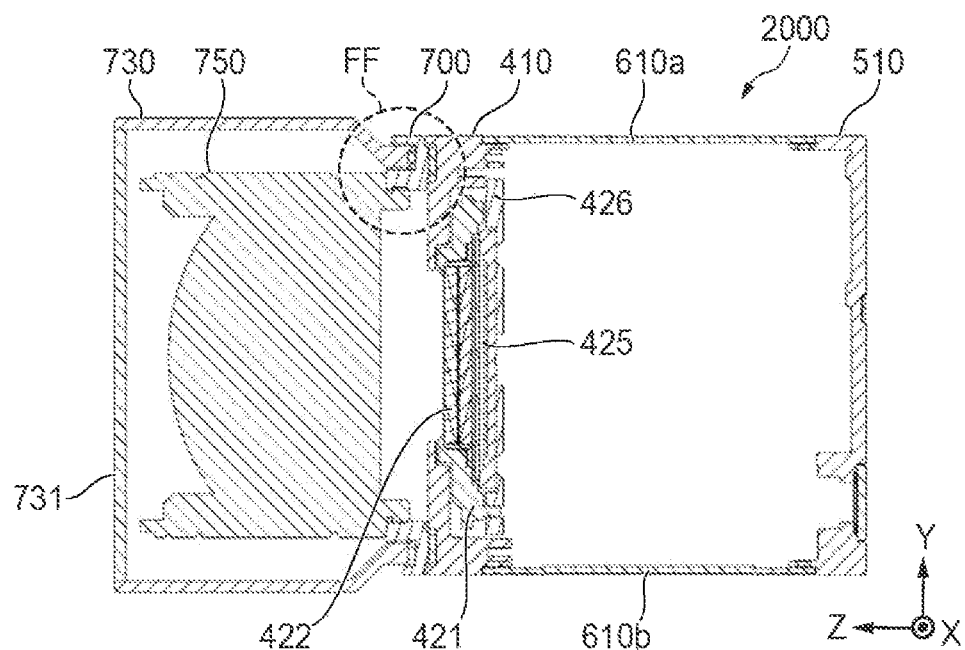
FIG. 60A is a sectional view showing a state where the second interchangeable lens and the lens cover are attached to the image pickup apparatus.
Figure 60B:
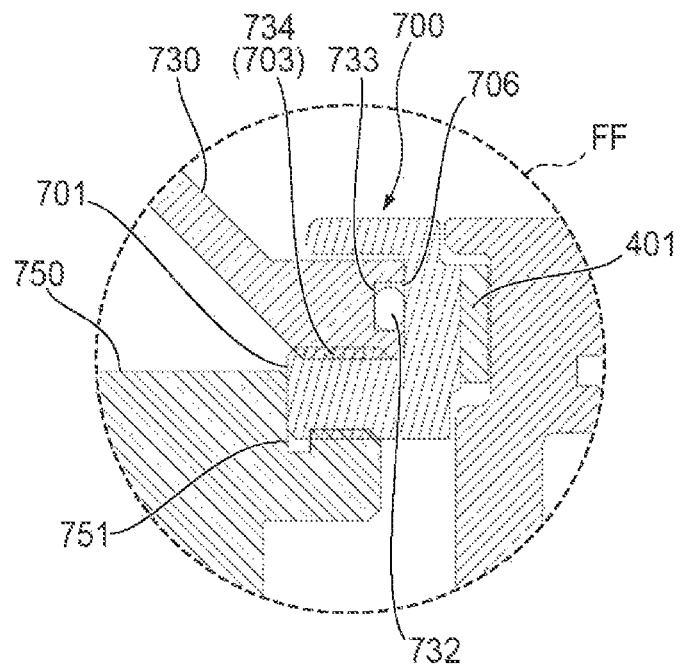
FIG. 60B is a partial enlargement view showing a section FF in FIG. 60A.

FIG. 59 is a front-side perspective view showing the state where the second lens barrel 750 and the lens cover 730 are attached to the image pickup apparatus 2000. FIG. 60A is a sectional view in the YZ plane including the optical axis showing the state where the second lens barrel 750 and the lens cover 730 are attached to the image pickup apparatus 2000. FIG. 60B is an enlarged view showing a section FF shown in FIG. 60A. It should be noted that FIG. 59 does not show the second lens barrel 750 that is inside the lens cover 730. Moreover, FIG. 60A does not show the components inside the image pickup apparatus 2000. The section FF in FIG. 60A shows the structure near the groove 705 of the second mount module 700.

The lens cover 730 has an approximately cylindrical shape that is larger than the outside diameter of the second lens barrel 750. The lens cover 730 is attached to the second mount module 700 so as to cover the second lens barrel 750 attached to the second mount module 700. The front surface of the cylindrical part that constitutes the side surface of the lens cover 730 is sealed by a transparent front glass 731 that allows transmission of incident light. Accordingly, infiltration of water to the inside from the front surface of the lens cover 730 is prevented.

Moreover, a cover-side internal thread 734 that can be screwed to the outer thread 703 of the second mount module 700 is provided in an inner wall of the rear end of the lens cover 730. The lens cover 730 is attached to the second mount module 700 by screwing the cover-side internal thread 734 to the outside thread 703.

A circular engaging groove 733 is provided in a rear end face of the lens cover 730, and an O ring 732 is fitted in the engaging groove 733. Accordingly, when the lens cover 730 is attached to the second mount module 700, the O ring 732 is held in a state compressed in the Z-direction between the engaging groove 733 and an accessory contact surface 706 provided in the groove 705 of the second mount module 700. In this way, the O ring 732 prevents occurrence of a gap between the lens cover 730 and the attachment part of the second mount module 700. Accordingly, infiltration of water to the inside from the connection part between the rear end of the lens cover 730 and the second mount module 700 can be prevented. Although the O ring 732 is used as the sealing member in this example, a rubber sheet can be also used by shaping it into an annular form.

Incidentally, the second mount module 700 is shorter than the first mount module 300 in the Z-direction. Accordingly, a lens barrel of which flange back is long like the first lens barrel 200 cannot be directly attached. A lens barrel of which flange back is long can be attached by extending the flange back by attaching a mount converter of a predetermined length to the second mount module 700. Specifically, a mount converter having an external thread that can be screwed to the inner thread 702 of the second mount module 700 is attached.

In the meantime, since such a mount converter is attached to the second mount module 700 by a rotational operation, there is a possibility that a phase to the second mount module 700 does not settle when fixed. If the phase of the mount converter to the second mount module 700 does not settle, performance of a lens barrel may not be utilized because the phase of the lens barrel attached to the mount converter to the image sensor 425 is not settled.

Figure 61A:
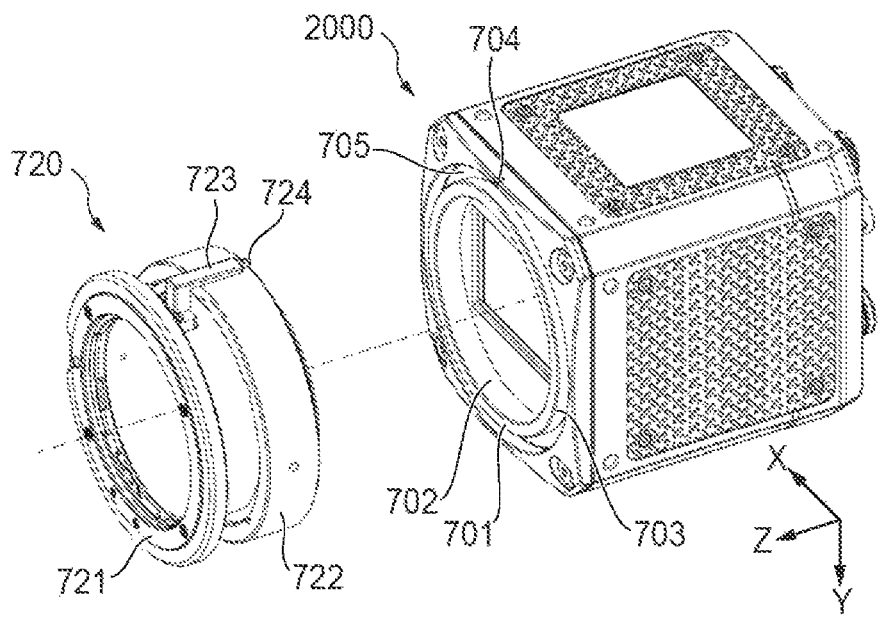
FIG. 61A and FIG. 61B are perspective views showing a positional relationship between the image pickup apparatus and a mount converter before attachment.
Figure 61B:
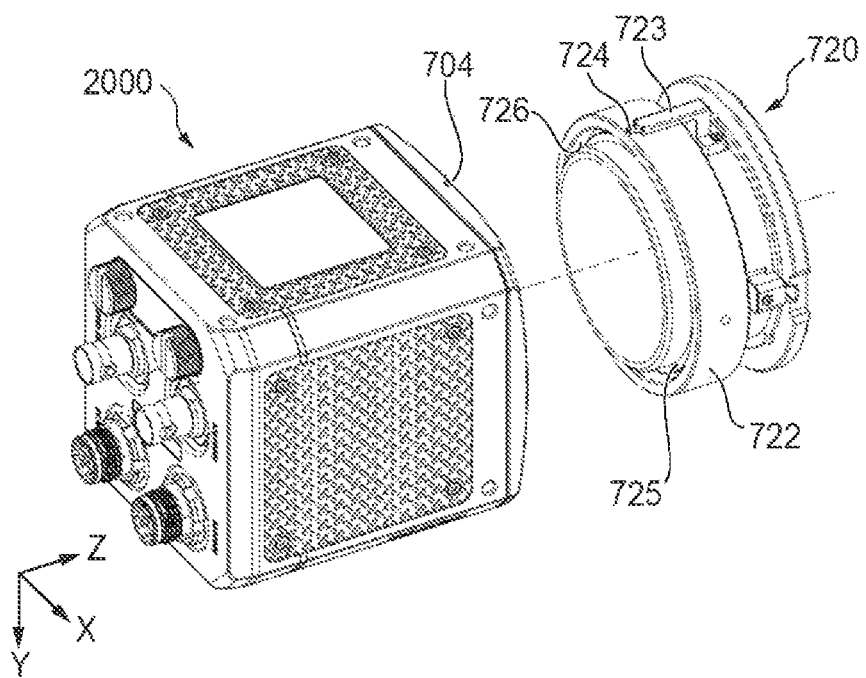

A mount converter that solves the above issue will be described hereinafter. FIG. 61A and FIG. 61B are a front-side perspective view and a back-side perspective view showing a positional relationship between the image pickup apparatus 2000 and a mount converter 720 before attachment. It should be noted that FIG. 61A and FIG. 61B show a state where the lower side of the image pickup apparatus 2000 is turned upward.

The mount converter 720 has a configuration that enables attachment with a suitable phase when attached to the second mount module 700. The mount converter 720 is provided with a front mount member 721 in the front side and a rear mount surface 725 in the back side. The front side mount member 721 is provided with a well-known bayonet type lens mount.

Moreover, the mount converter 720 is provided with a positioning member 723 and a lock ring 722. A positioning convex part 724 prolonged to the back side (−Z side) is provided in the front end of the positioning member 723. The positioning convex part 724 of the mount converter 720 is engaged with the cutout 704 of the second mount module 700 when attached to the second mount module 700. This prevents a phase deviation of the mount converter 720 to the second mount module 700.

Moreover, a lock thread 726 that can be screwed to the outer thread 703 of the second mount module 700 is formed in the inner wall of the lock ring 722 as shown in FIG. 61B. By rotating the lock ring 722 in a state where the positioning convex part 724 is inserted into the cutout 704, the lock thread 726 is screwed to the outer thread 703 of the second mount module 700. In this way, the mount converter 720 can be attached to the second mount module 700.

Figure 62A:
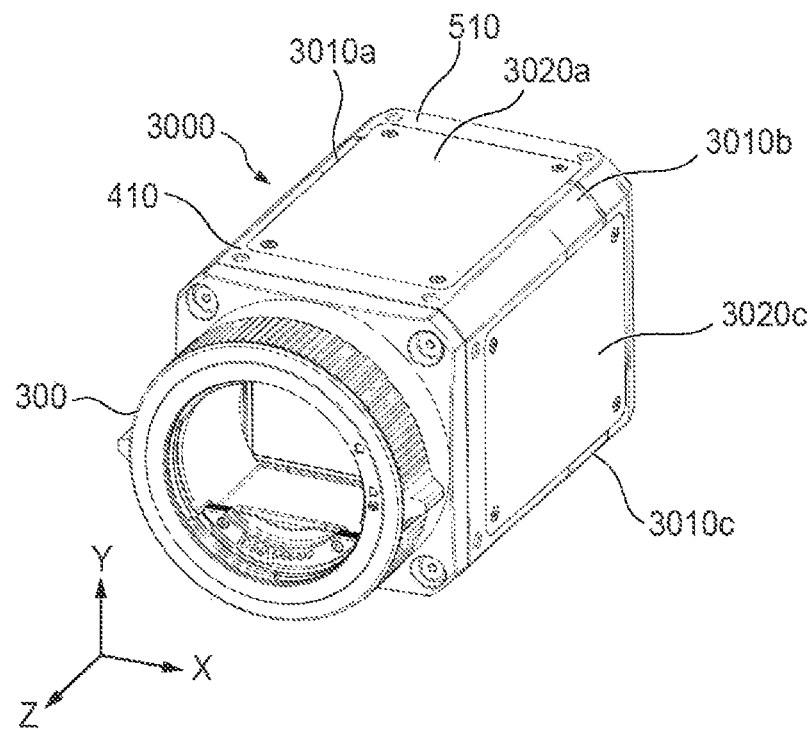
FIG. 62A and FIG. 62B are perspective views showing an image pickup apparatus according to a third embodiment.
Figure 62B:
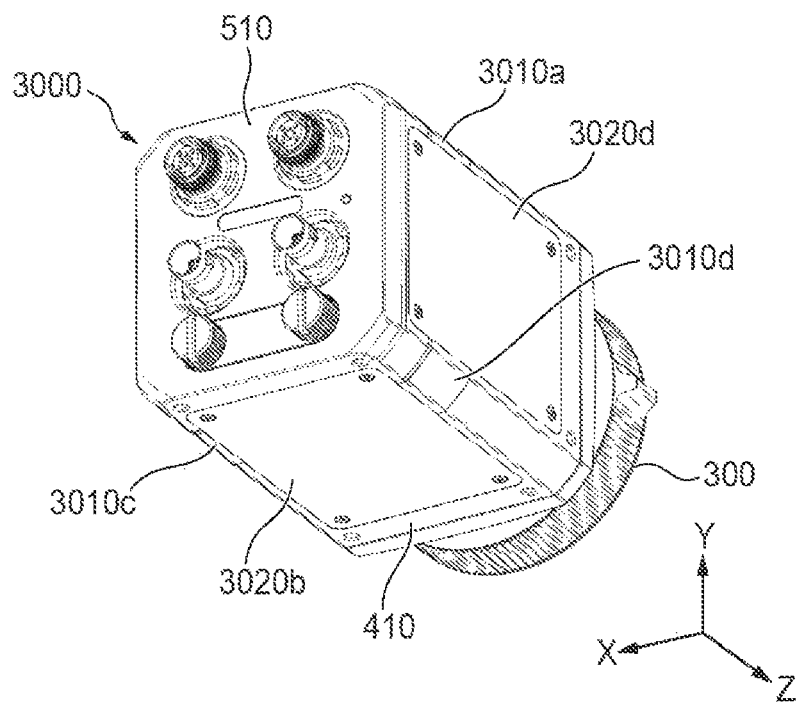
Figure 63:
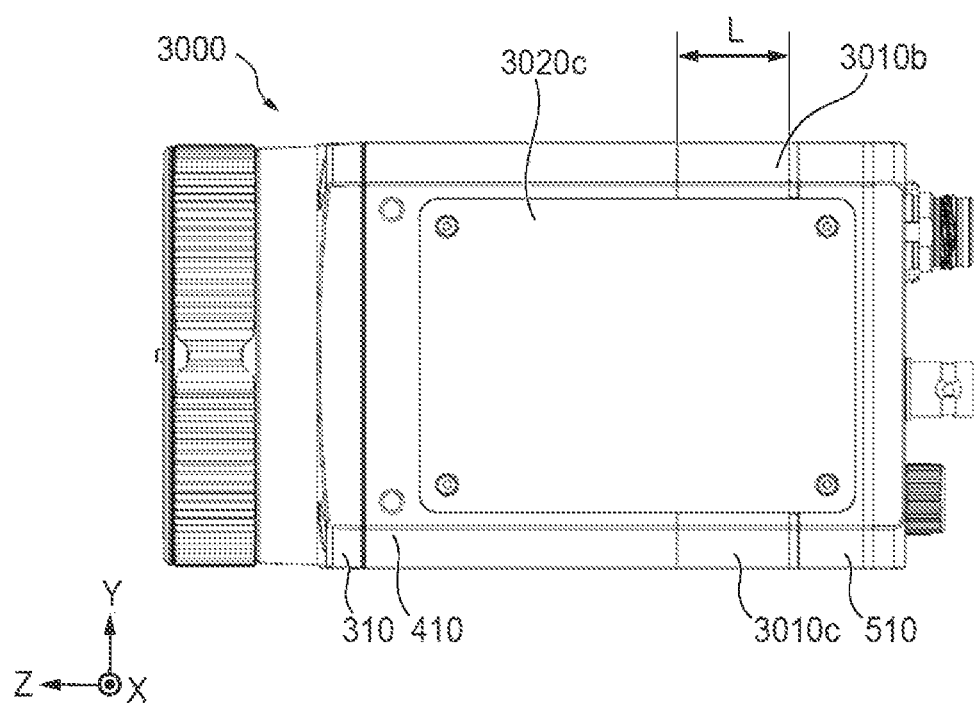
FIG. 63 is a side view showing the image pickup apparatus in FIG. 62A.

Next, a third embodiment will be described. FIG. 62A and FIG. 62B are a front-side perspective view and a back-side perspective view showing an image pickup apparatus 3000 according to the third embodiment. FIG. 63 is a side view showing the image pickup apparatus 3000. It should be noted that components of the image pickup apparatus 3000 that are identical to the components of the image pickup apparatus 1000 according to the first embodiment are denoted by the same reference numerals and the same component name, and common descriptions will be omitted.

A first point in which the image pickup apparatus 3000 is different from the image pickup apparatus 1000 is that intermediate parts 3010a, 3010b, 3010c, and 3010d are respectively inserted between the arms 413a, 413b, 413c, and 413d of the front case 410 and the arms 512a, 512b, 512c, and 512d of the rear case 510. A second point in which the image pickup apparatus 3000 is different from the image pickup apparatus 1000 is that the side panels 610a, 610b, 610c, and 610d are exchanged into side panels 3020a, 3020b, 3020c, and 3020d in connection with the above-mentioned first point. The intermediate parts 3010a through 3010d play roles that extend the arms 413a through 413d of the front case 410 by a length L in the Z-direction. Accordingly, sectional shapes in the XY plane of the intermediate parts 3010a through 3010d are approximately identical to that of the arms 413a through 413d as mentioned later.

Figure 64A:
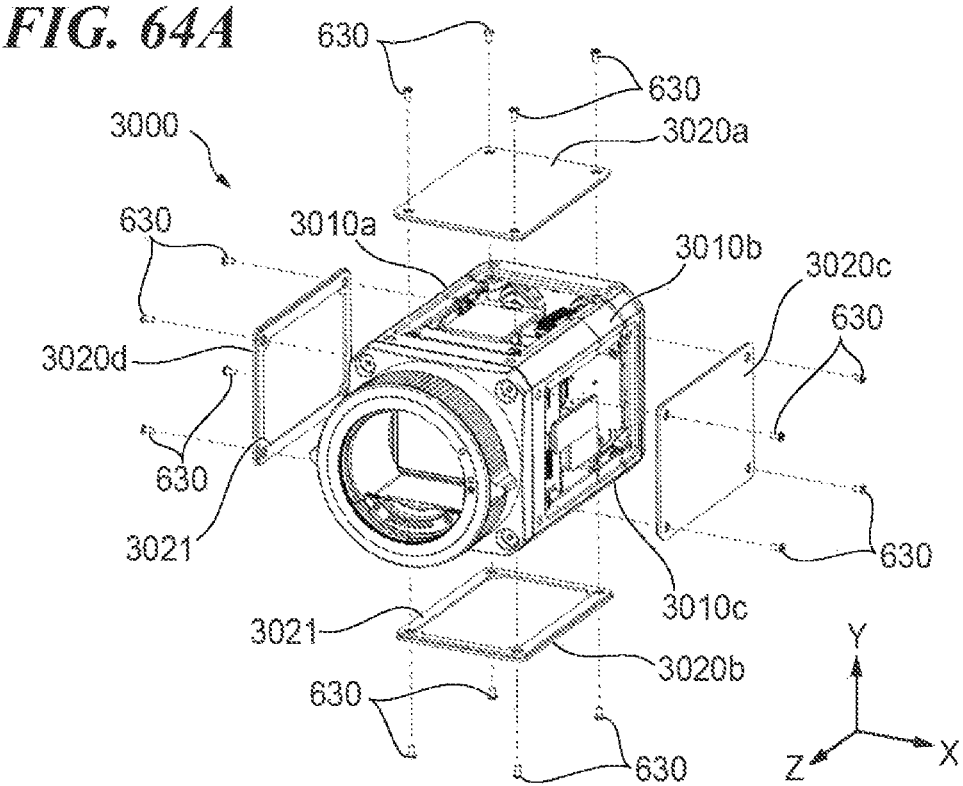
FIG. 64A and FIG. 64B are perspective views describing a method for attaching side panels to the image pickup apparatus.
Figure 64B:
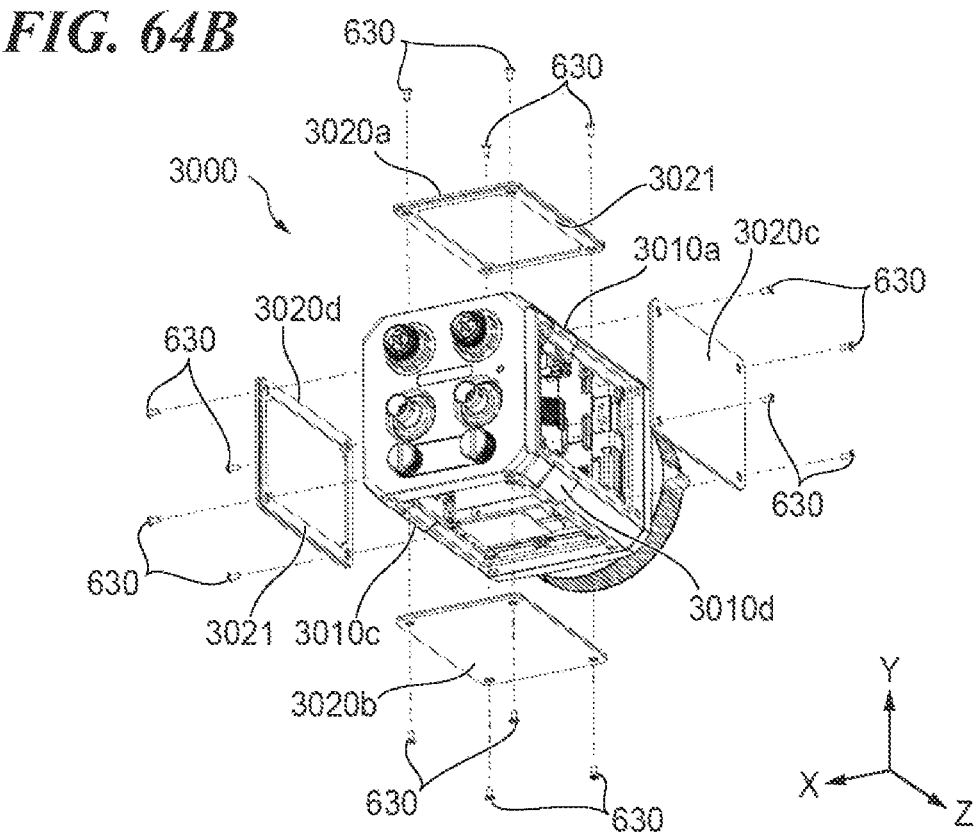

FIG. 64A and FIG. 64B are perspective views describing a method for attaching side panels 3020a through 3020d to the image pickup apparatus 3000. The side panels 3020a through 3020d are approximately rectangular and are equivalent to shapes obtained by extending the side panels 610a through 610d by the length L of the intermediate parts 3010a through 3010d shown in FIG. 63 in the Z-direction (optical axis direction). As with the side panels 610a through 610d, the side panels 3020a through 3020d are fastened to the front case 410 and rear case 510 with the fixing screws 630 so as to connect the front case 410, the intermediate parts 3010a through 3010d, and the rear case 510. In this way, the side panels 3020a through 3020d form the external appearance of the four surfaces (upper, lower, right, and left surfaces) of the image pickup apparatus 3000.

Panel sealing members 3021 are pasted also on the side panels 3020a through 3020d in the same way as pasting the panel sealing members 611 on the side panels 610a through 610d. The panel sealing members 3021 have approximately square framed shapes and are equivalent to shapes obtained by extending the panel sealing member 611 by the length L in the Z-direction. The panel sealing members 3021 are respectively pushed in and fitted in square-frame concave portions in the state pasted on the side panels 3020a through 3020d. It should be noted that the square-frame concave portions of the image pickup apparatus 3000 are also equivalent to shapes obtained by extending the square-frame concave portions 640 by the length L in the Z-direction.

Figure 65A:
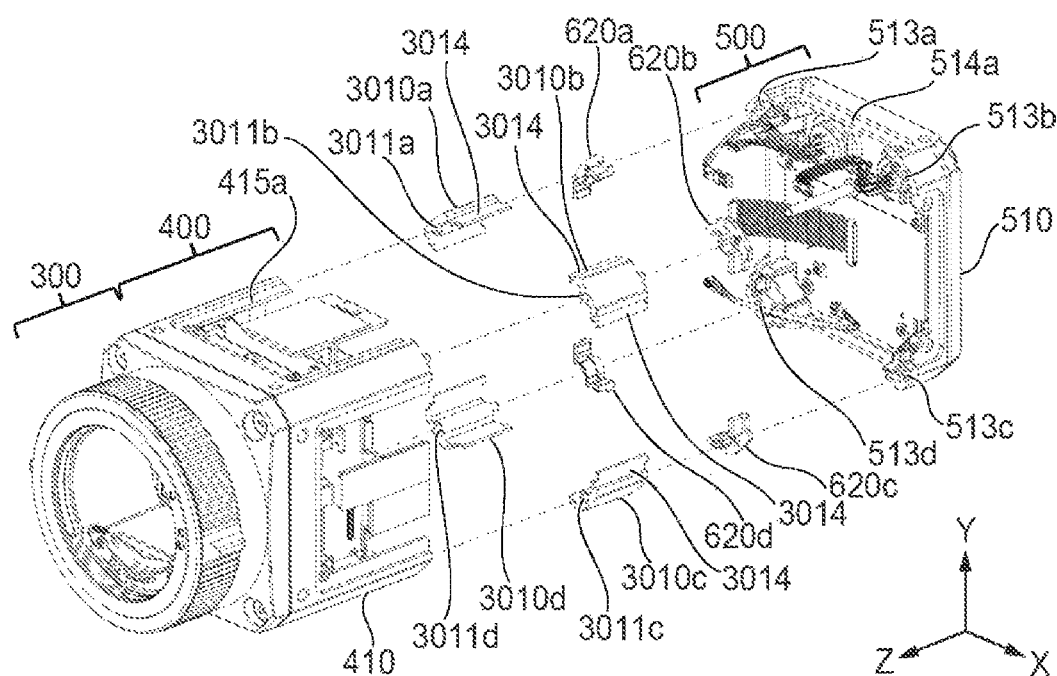
FIG. 65A and FIG. 65B are exploded perspective views showing the image pickup apparatus.
Figure 65B:
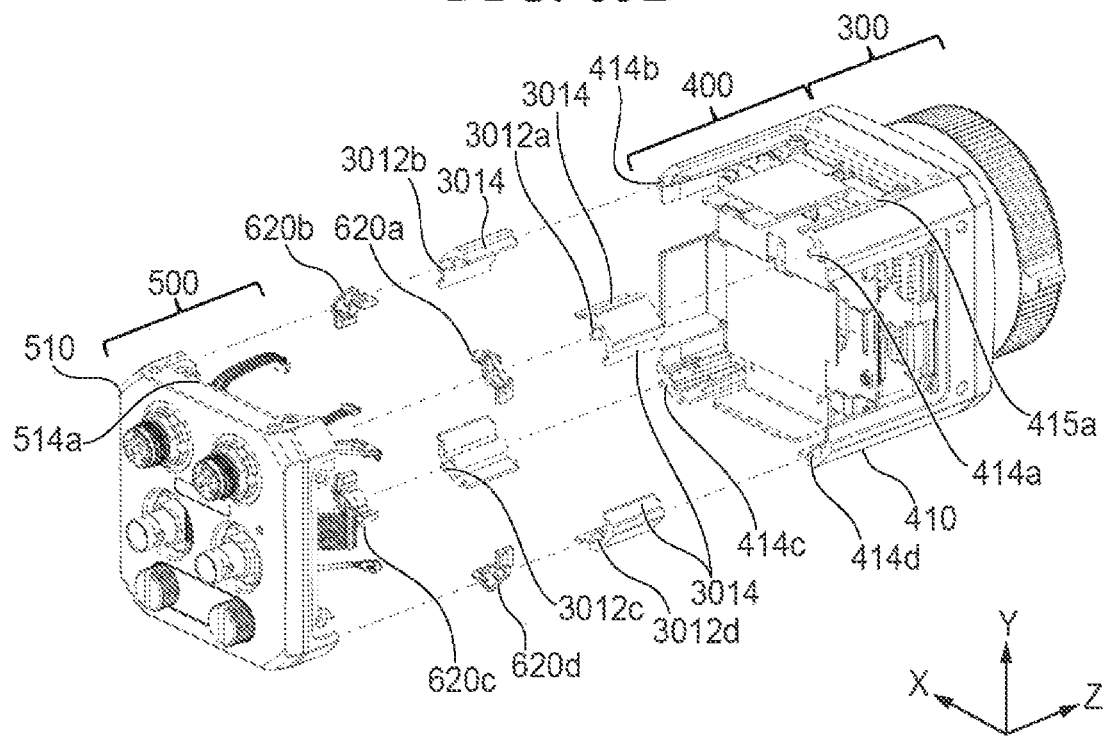

Next, the entire configuration of the image pickup apparatus 3000 will be described. FIG. 65A and FIG. 65B are a front-side exploded perspective view and a back-side exploded perspective view showing a state where the side panels 3020a through 3020d are detached from the image pickup apparatus 3000. The image pickup apparatus 3000 is provided with the first mount module 300, the front module 400, the intermediate parts 3010a through 3010d, the sealing members 620a through 620d, and the rear module 500. It should be noted that the sealing members 620a through 620d may be additionally arranged between the front case 410 and the intermediate parts 3010a through 3010d in order to improve the waterproof function.

The intermediate parts 3010a, 3010b, 3010c, and 3010d are respectively provided with positioning holes (positioning sections to the front case) 3011a, 3011b, 3011c, and 3011d and positioning bosses (positioning sections to the rear case) 3012a, 3012b, 3012c, and 3012d. For example, when the intermediate part 3010a is arranged between the front case 410 and the rear case 510, the positioning boss 414a of the front case 410 is fitted into the positioning hole 3011a and the positioning boss 3012a is fitted into the positioning hole 513a of the rear case 510. Thereby, the intermediate parts 3010a is positioned between the front case 410 and the rear case 510. The intermediate parts 3010b through 3010d are positioned as with the intermediate part 3010a.

Moreover, the intermediate parts 3010a through 3010d have concave portions 3014 that form the same planes of the concave portions 415a through 415d of the front case 410 and the concave portions 514a through 514d of the rear case 510, respectively. This enables attachment and detachment of the side panels 3020a through 3020d and secures the waterproof function.

In the above description, the intermediate parts 3010a through 3010d have the sectional shapes that are identical to that of the arms 413a through 413d of the front case 410 in the XY plane and extend the body frame of the image pickup apparatus 3000 in the Z-direction. However, the shapes of the intermediate parts are not restricted to the above shapes. Moreover, although the intermediate parts are separately arranged at the arms 413a through 413d of the front case 410 or the arms 512a through 512d of the rear case 510, the arrangement is not restricted to the above arrangement. For example, the intermediate parts 3010a and 3010b may be connected in the X-direction, or the intermediate parts 3010a through 3010d may be connected so as to form an annular shape.

In this way, the image pickup apparatus 3000 is configured by extending the body frame by a desired length in the Z-direction using the intermediate parts 3010a through 3010d if needed, without changing the basic configuration of the image pickup apparatus 1000. That is, the specification (performance) of the image pickup apparatus 1000 is easily changed according to a user's demand by storing a unit substrate for extending a function of the image pickup apparatus, 1000 into the inside of the body frame, for example. It should be noted that a cooling fan and a radiation module may be stored into the body frame.

Figure 66A:
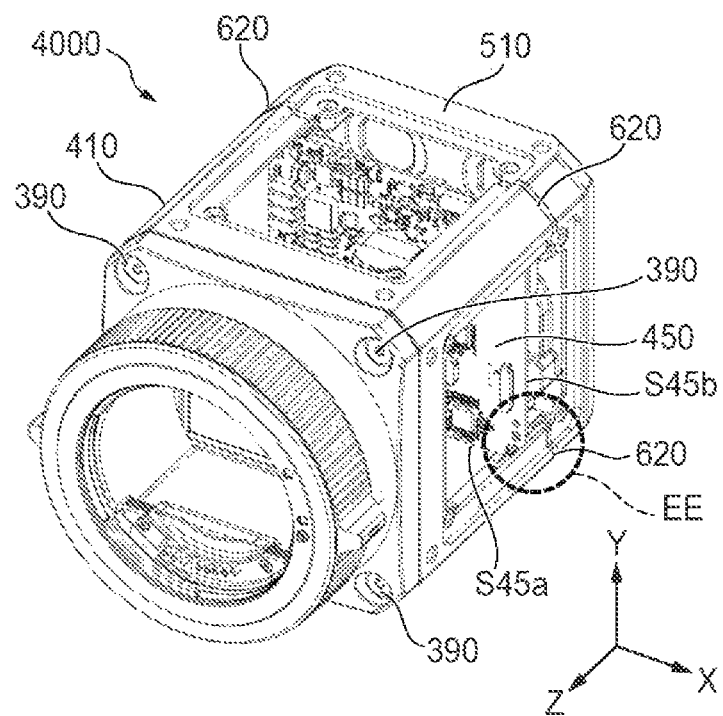
FIG. 66A is a front-side perspective view showing an image pickup apparatus according to a fourth embodiment.
Figure 66B:
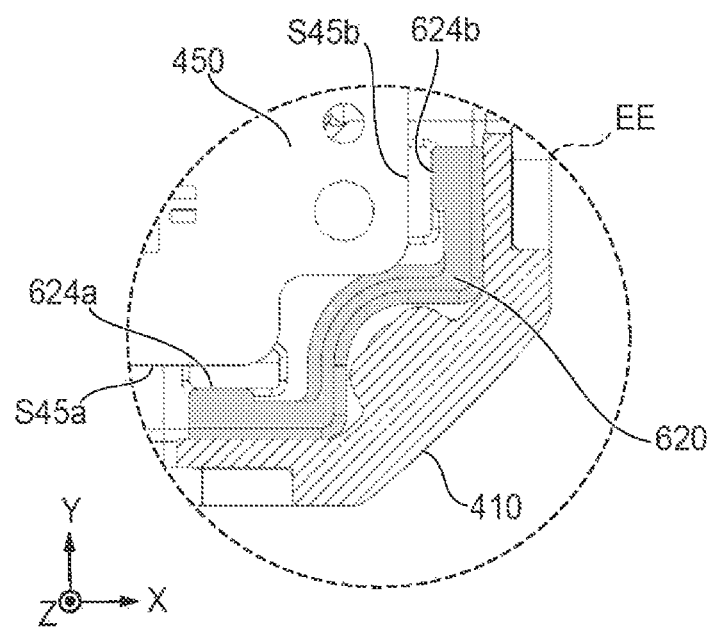
FIG. 66B is an expanded sectional view showing a section EE in FIG. 66A.

Next, a fourth embodiment will be described. FIG. 66A is a front-side perspective view showing an image pickup apparatus 4000 according to the fourth embodiment in a state where side panels are detached. FIG. 66B is an XY sectional view (a section in a plane parallel to the XY plane) expanding and showing a section EE shown in FIG. 66A. The image pickup apparatus 4000 differs from the image pickup apparatus 1000 only in positional relationship between the main substrate 450 and the sealing member 620. Accordingly, components of the image pickup apparatus 4000 that are identical to the components of the image pickup apparatus 1000 according to the first embodiment are denoted by the same reference numerals and the same component name, and common descriptions will be omitted.

Although the image pickup apparatus 1000 achieves the waterproof structure using the sealing members 620, the image pickup apparatus 4000 improves the impact resistance of the main substrate 450 by arranging the sealing members 620 around the main substrate 450.

In more detail, the four sealing members 620 are arranged so as to cover the four corners of the approximately rectangular main substrate 450 in the image pickup apparatus 4000. As shown in FIG. 66B, the second support parts 624a and 624b of the sealing member 620 respectively cover right and lower side parts S45a and S45b of the main substrate 450. Thereby, when external force, such as impact, acts on the image pickup apparatus 4000, the side parts S45a and S45b of the main substrate 450 contact the second support parts 624a and 624b of the sealing member 620 that has cushioning property before colliding to the high-rigidity components of the inside. Accordingly, since the sealing members 620 absorb external force, the external force applied to the main substrate 450 becomes small, which reduces damage (breakage) of the main substrate 450. Although only the lower right section EE of the body frame has been described, the upper right section, the upper left section, and the lower left section are constituted similarly, and their descriptions are omitted.

Although the present invention has been described in detail on the basis of the suitable embodiment, the scope of the present invention is not limited to the specific embodiment. The present invention includes various configurations that do not deviate from the gist of the present invention. Furthermore, the embodiments mentioned above show examples of the present invention, and it is possible to combine the embodiments suitably.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-174795, filed Oct. 16, 2020, which is hereby incorporated by reference herein in its entirety.

What is claimed is:

1. An image pickup apparatus comprising:
a front case that forms an apparatus appearance;
a rear case that forms the apparatus appearance with the front case; and
a plurality of panel members,
wherein at least one of the front case and the rear case has a plurality of arms that extend in a direction approximately parallel to an optical axis of the image pickup apparatus and that are united with at least one of the front case and the rear case,
wherein the front case and the rear case are connected through the plurality of arms, and
wherein the plurality of panel members are fixed to the front case and the rear case so as to cover a plurality of openings formed by the front case, the rear case, and the plurality of arms in a state where the front case and the rear case are connected through the arms.

2. The image pickup apparatus according to claim 1, wherein the rear case is provided with an interface.

3. The image pickup apparatus according to claim 1, wherein positioning sections for positioning the front case and the rear case are provided in front ends of the arms.

4. The image pickup apparatus according to claim 1, wherein shapes of the arms appeared to the apparatus appearance are arc shapes inscribed in a circle around the optical axis when viewed in the direction of the optical axis.

5. The image pickup apparatus according to claim 1, wherein the openings are formed in surfaces in a same shape, and
wherein the openings of the surfaces are covered with the panel members that have a same shape.

6. The image pickup apparatus according to claim 1, further comprising a sealing member arranged between the front case and the rear case.

7. The image pickup apparatus according to claim 1, further comprising a first substrate and a second substrate that are arranged inside the front case and that are approximately parallel to an image pickup surface of an image sensor, and
wherein the image sensor is implemented in one of the first substrate and the second substrate.

8. The image pickup apparatus according to claim 7, wherein the first substrate comprises a main rigid part, auxiliary rigid parts, and flexible parts that connect the main rigid part and the auxiliary rigid parts,
wherein the auxiliary rigid parts are electrically connected to the second substrate in a state where the auxiliary rigid parts at least partially overlap with the main rigid part when viewed in the direction parallel to the optical axis by bending the flexible parts and where the auxiliary parts are arranged in approximately parallel to the main rigid part.

9. The image pickup apparatus according to claim 8, wherein the first substrate is formed so that the auxiliary rigid parts and the flexible parts will be arranged symmetrically by interposing the main rigid part.

10. The image pickup apparatus according to claim 8, wherein first B-to-B connectors are respectively implemented in the auxiliary rigid parts,
wherein second B-to-B connectors are arranged in a same surface of the second substrate, and
wherein the first B-to-B connectors are electrically connected to the second B-to-B connectors, respectively.

11. The image pickup apparatus according to claim 8, further comprising:
a frame member that is arranged between the main rigid part and the auxiliary rigid parts and that holds the auxiliary rigid parts; and
an elastic member that is arranged between the auxiliary rigid parts and the frame member.

12. The image pickup apparatus according to claim 1, further comprising at least one extension module that is attachable so as to cover at least one of the openings,
wherein the extension module is fixed by fastening to the front case and the rear case.

13. The image pickup apparatus according to claim 12, wherein the openings are formed in at least two places, and
wherein the extension module that cover one of the openings is a cooling fan module that has a cooling fan and the extension module that covers the other opening is a vent module that has a vent.

14. The image pickup apparatus according to claim 13, wherein the openings are formed in at least three places, and
wherein the cooling fan module and at least one vent module are arbitrary attached to the openings formed in the at least three places.

15. The image pickup apparatus according to claim 12, wherein the extension module is a fixing module that has at least one tripod internal thread.

16. The image pickup apparatus according to claim 12, wherein the extension module is a microphone module that has at least one microphone.

17. The image pickup apparatus according to claim 12, wherein the extension module is a grip module that has a grip part.

18. The image pickup apparatus according to claim 12, wherein the extension module is a handle module that has a handle.

19. The image pickup apparatus according to claim 12, wherein the extension module is a recording module that has at least one recording medium slot.

20. The image pickup apparatus according to claim 12, wherein the extension module is an extension terminal module that has at least one extension terminal.

21. The image pickup apparatus according to claim 12, wherein the extension module is a wireless module that has a wireless communication unit.

22. The image pickup apparatus according to claim 12, wherein the extension module is a display module that has at least one display panel.

23. The image pickup apparatus according to claim 12, wherein the extension module is a battery module that has at least one battery chamber.

24. The image pickup apparatus according to claim 12, wherein the extension module is an operation module that has at least one operation unit.

25. The image pickup apparatus according to claim 12, wherein the extension module is a lighting module that has at least one lighting unit.

26. The image pickup apparatus according to claim 12, wherein the extension module is a heat sink module that has at least one heat dissipation fin.

27. The image pickup apparatus according to claim 1, further comprising intermediate parts that are arranged between the front case and the rear case to extend the arms in a direction parallel to the optical axis so as to extend the image pickup apparatus.

28. The image pickup apparatus according to claim 27, wherein each of the intermediate parts has a positioning section to the front case and a positioning section to the rear case.

29. The image pickup apparatus according to claim 1, wherein the front case has a lens mount.

30. The image pickup apparatus according to claim 1, wherein the arms are provided in both the front case and the rear case, and wherein the arms of the front case are longer than the arms of the rear case.

31. The image pickup apparatus according to claim 1, wherein the panel members are fastened to the front case and the rear case with screws.

* * * * *